(12) United States Patent
Sasaki et al.

(10) Patent No.: US 6,950,279 B2
(45) Date of Patent: Sep. 27, 2005

(54) THIN-FILM MAGNETIC HEAD WITH THIN-FILM COIL OF LOW RESISTANCE

(75) Inventors: Yoshitaka Sasaki, Milpitas, CA (US); Takehiro Kamigama, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 23 days.

(21) Appl. No.: 10/354,066

(22) Filed: Jan. 30, 2003

(65) Prior Publication Data

US 2004/0246620 A1 Dec. 9, 2004

(51) Int. Cl.⁷ .................................................. G11B 5/17
(52) U.S. Cl. ...................................................... 360/123
(58) Field of Search ........................................ 360/123

(56) References Cited

U.S. PATENT DOCUMENTS

| | | | |
|---|---|---|---|
| 5,995,342 A | 11/1999 | Cohen et al. | |
| 6,043,959 A | 3/2000 | Crue et al. | |
| 6,191,916 B1 | 2/2001 | Sasaki | |
| 6,204,997 B1 * | 3/2001 | Sasaki | 360/123 |
| 6,507,455 B1 * | 1/2003 | Kikuiri et al. | 360/123 |
| 2005/0073773 A1 * | 4/2005 | Sasaki et al. | 360/126 |

FOREIGN PATENT DOCUMENTS

JP     A 11-283215     10/1999

* cited by examiner

*Primary Examiner*—A. J. Heinz
(74) *Attorney, Agent, or Firm*—Oliff & Berridge, PLC

(57) ABSTRACT

A thin-film magnetic head comprises a medium facing surface, a bottom pole layer, a top pole layer, a recording gap layer, and a thin-film coil. The bottom pole layer and the top pole layer are coupled to each other via a coupling portion located away from the medium facing surface. The coupling portion has an end face facing toward the medium facing surface. The end face includes a curved surface convex toward the medium facing surface. The thin-film coil has a conductive layer of three turns disposed around the coupling portion. The first turn of the conductive layer from an inner side thereof includes a portion disposed between the end face of the coupling portion and the medium facing surface. This portion has a minimum width of the conductive layer at a position on a virtual line connecting the end face of the coupling portion and the medium facing surface in the shortest distance, and increases in width with distance from the virtual line.

20 Claims, 37 Drawing Sheets

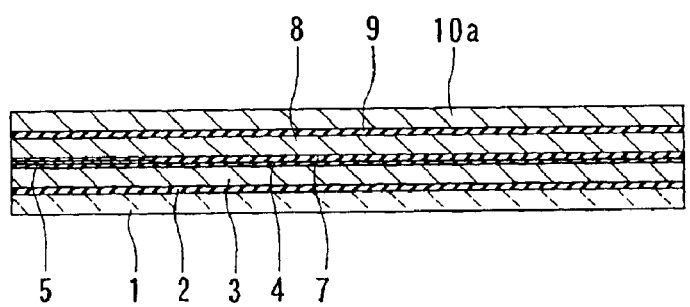
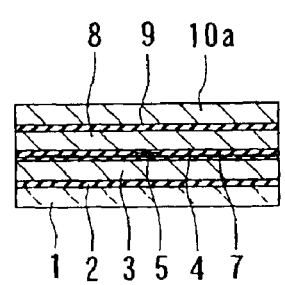
FIG. 1A
FIG. 1B
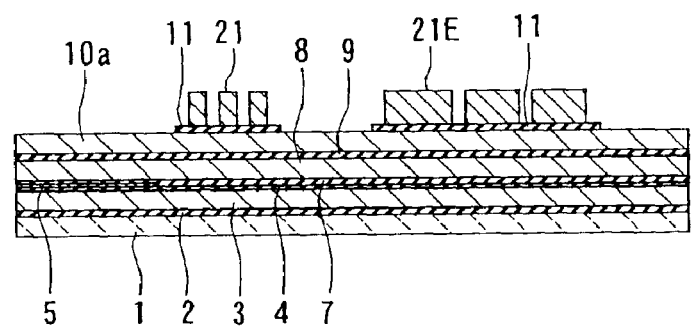
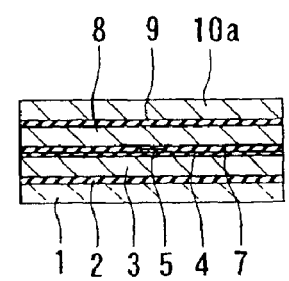
FIG. 2A
FIG. 2B

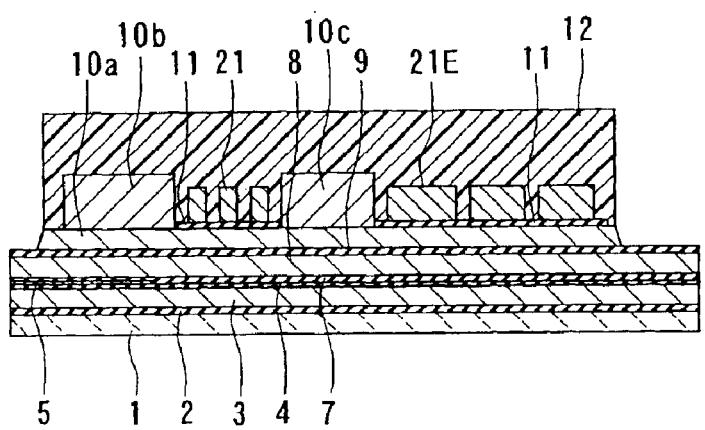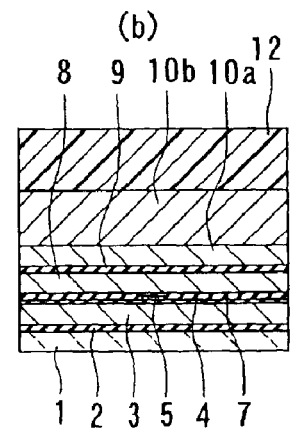
FIG. 3A  FIG. 3B
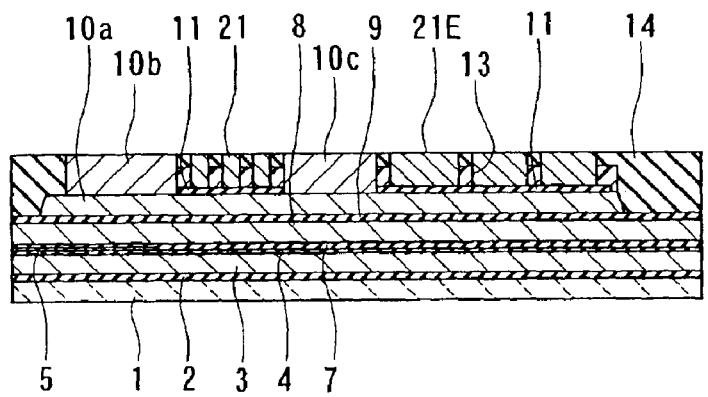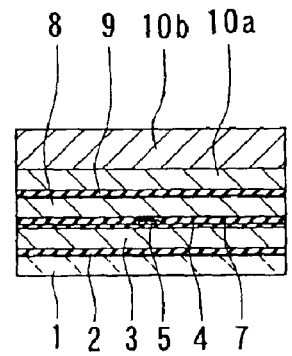
FIG. 4A  FIG. 4B

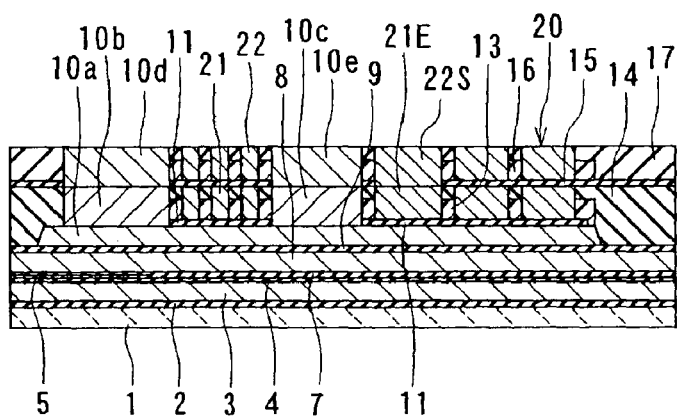 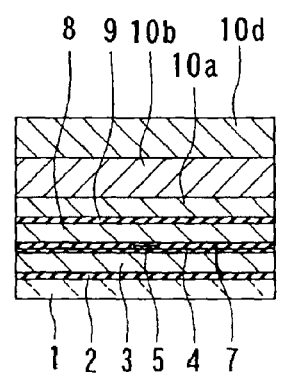
FIG. 7A  FIG. 7B
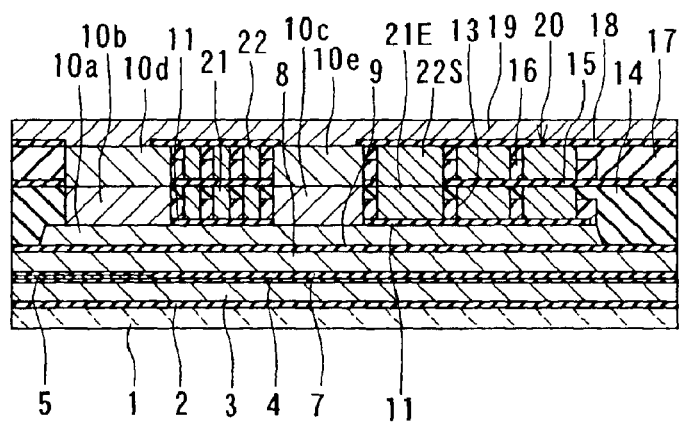 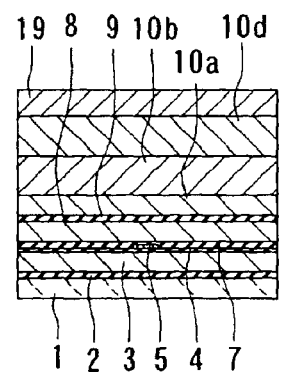
FIG. 8A  FIG. 8B

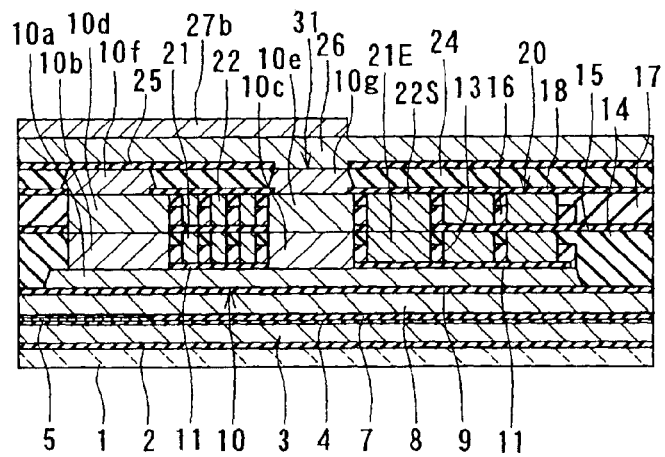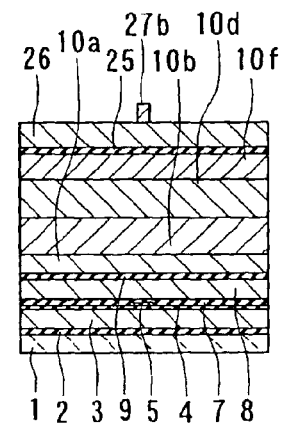
FIG. 11A  FIG. 11B
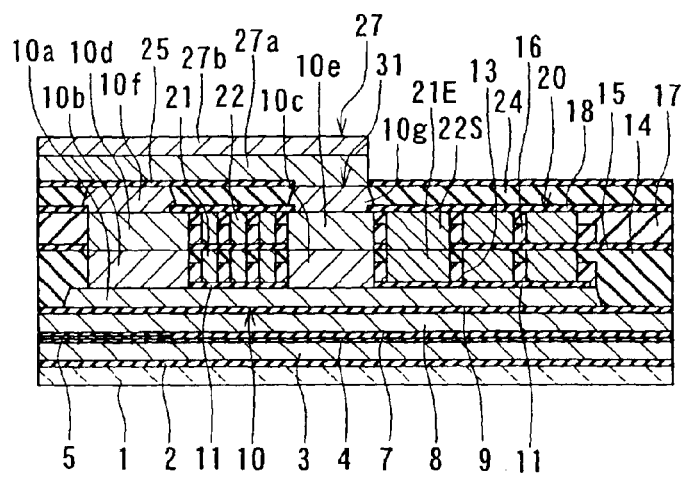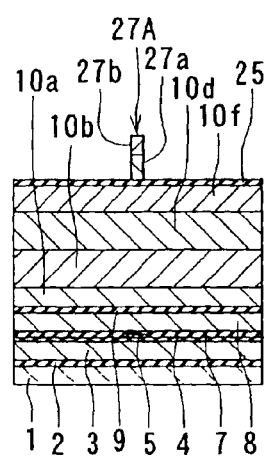
FIG. 12A  FIG. 12B

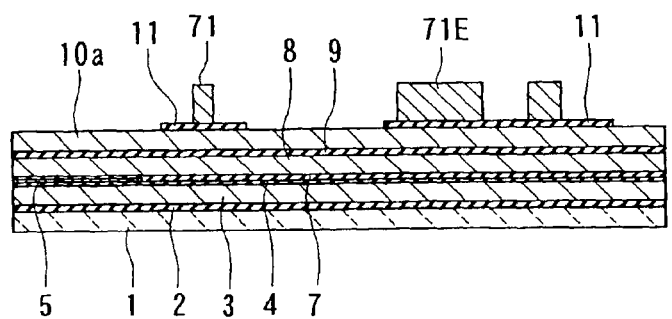
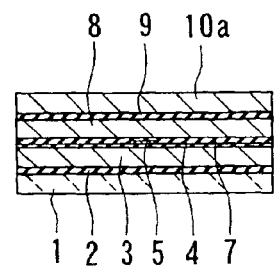
FIG. 30A
FIG. 30B
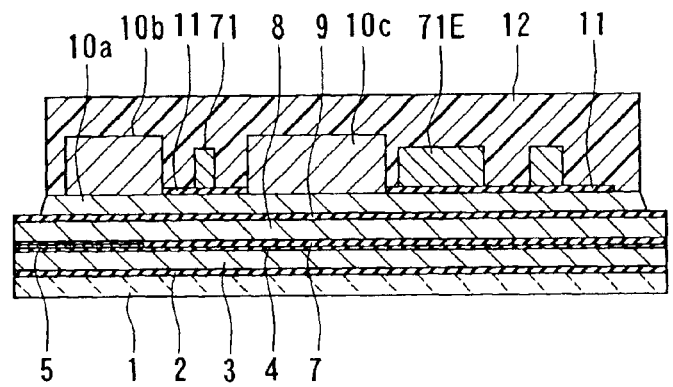
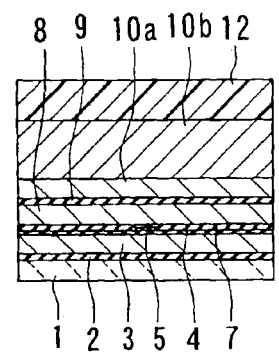
FIG. 31A
FIG. 31B

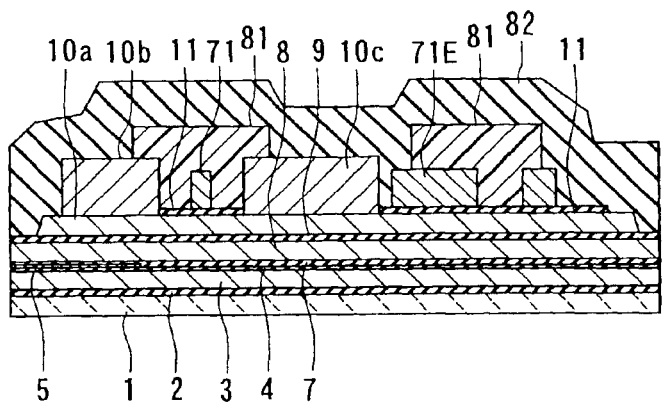 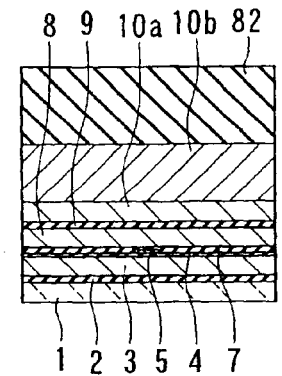
FIG. 32A    FIG. 32B
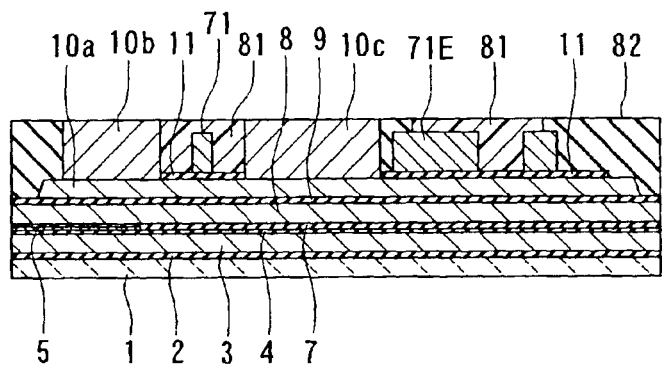 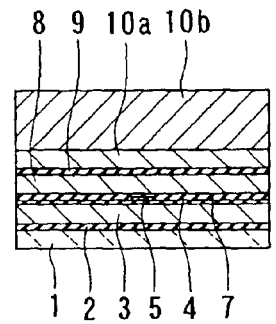
FIG. 33A    FIG. 33B

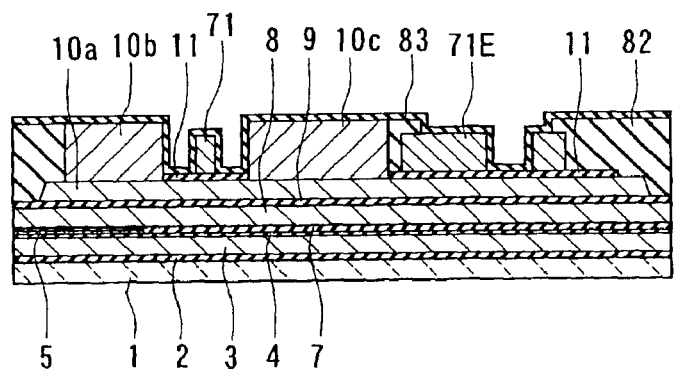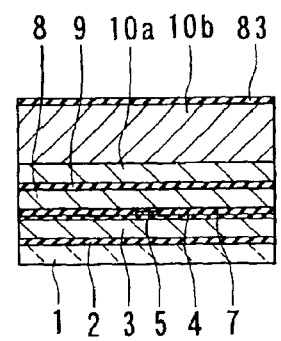
FIG. 34A   FIG. 34B
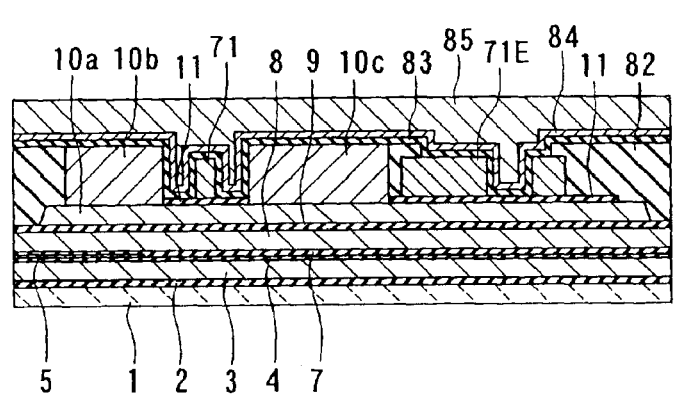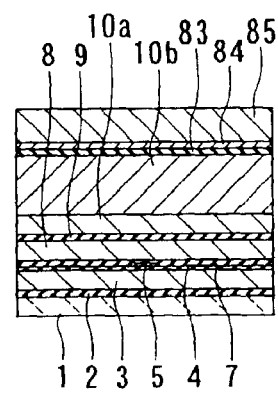
FIG. 35A   FIG. 35B

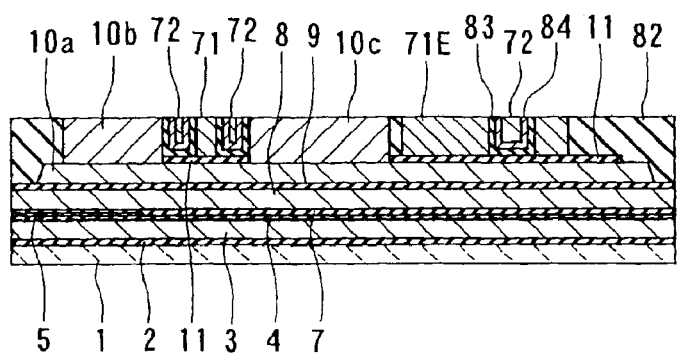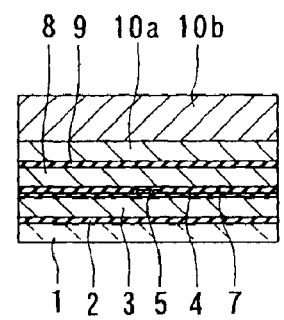
FIG. 36A  FIG. 36B
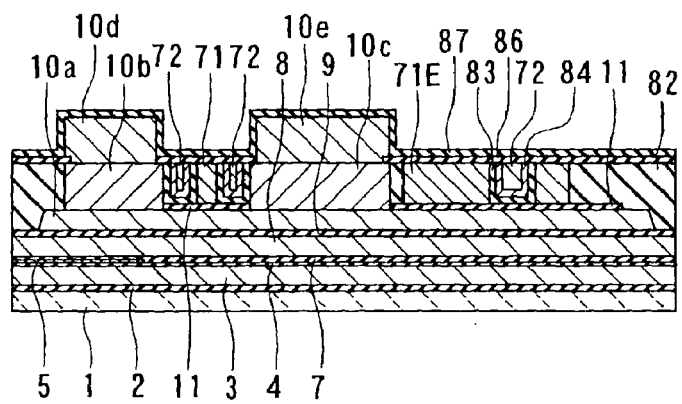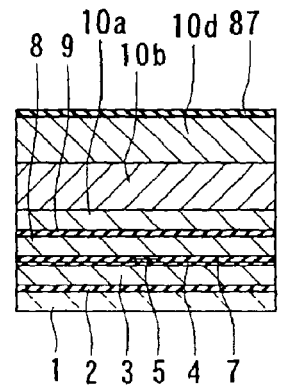
FIG. 37A  FIG. 37B

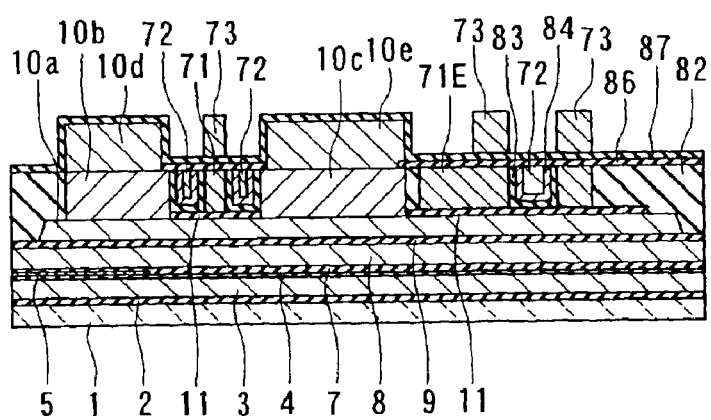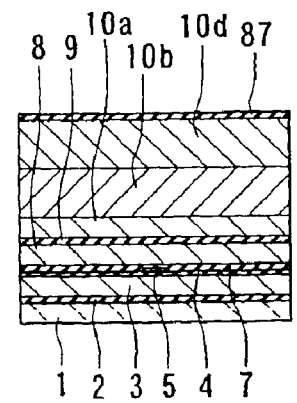
FIG. 38A  FIG. 38B
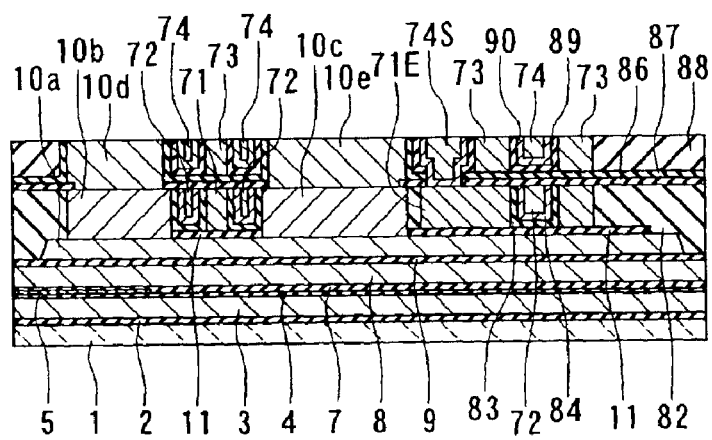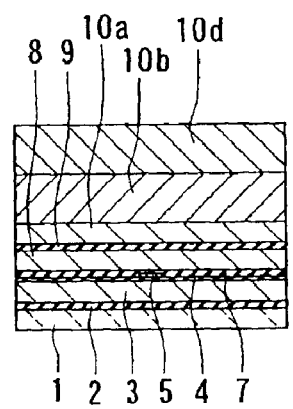
FIG. 39A  FIG. 39B

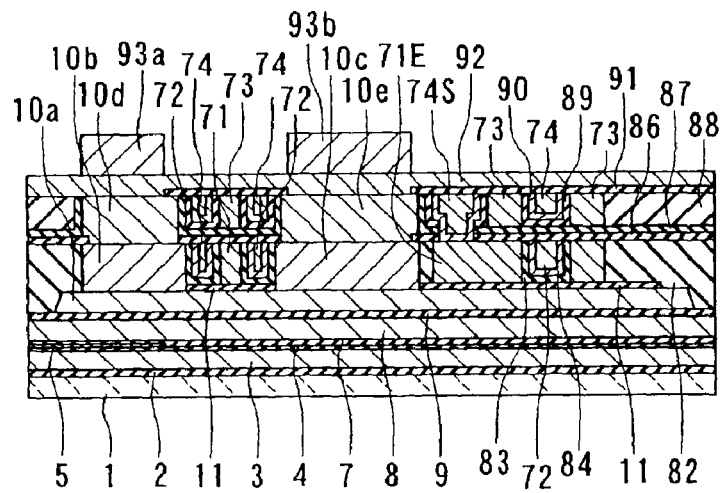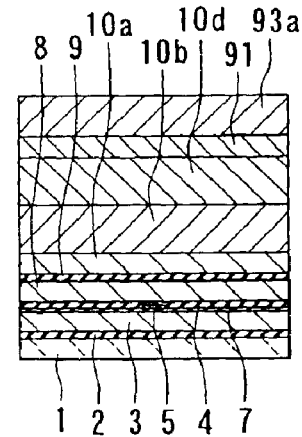
FIG. 40A
FIG. 40B
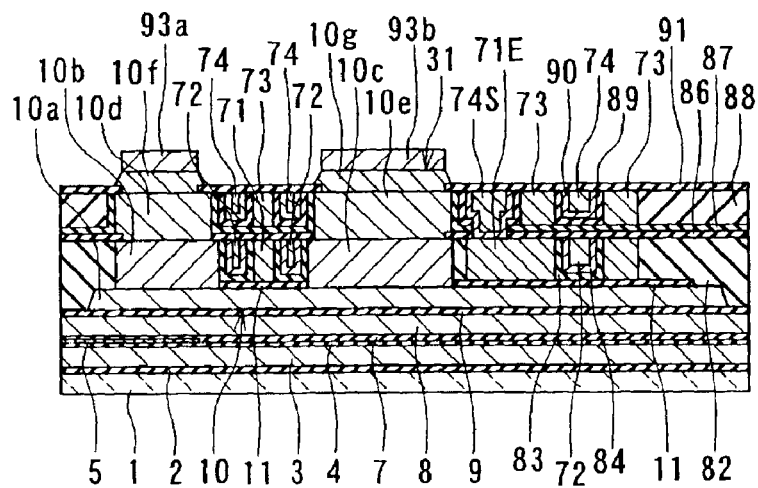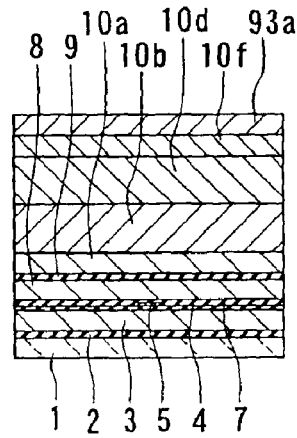
FIG. 41A
FIG. 41B

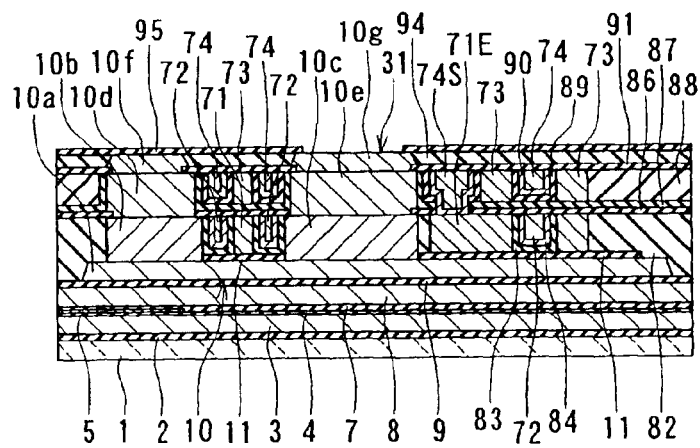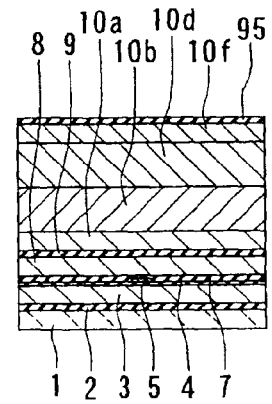
FIG. 42A                FIG. 42B
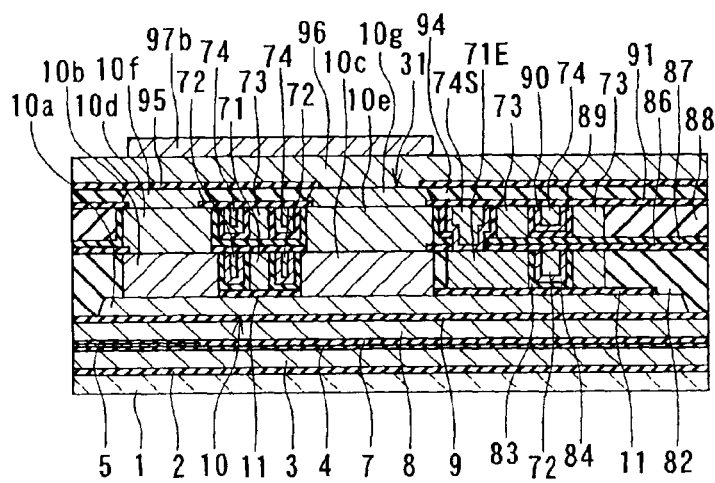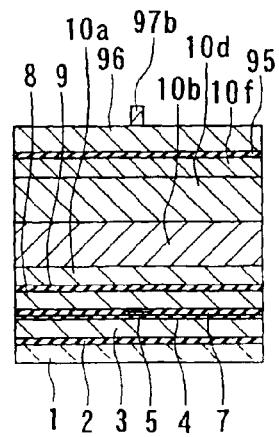
FIG. 43A                FIG. 43B

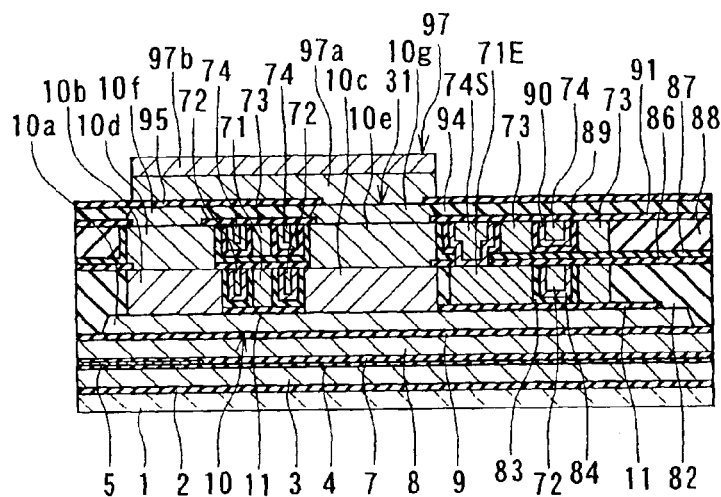
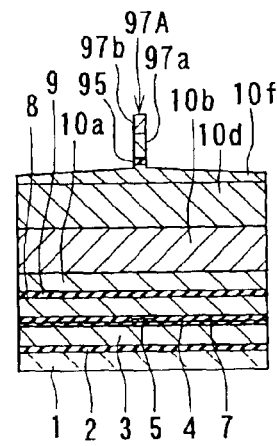
FIG. 44A          FIG. 44B
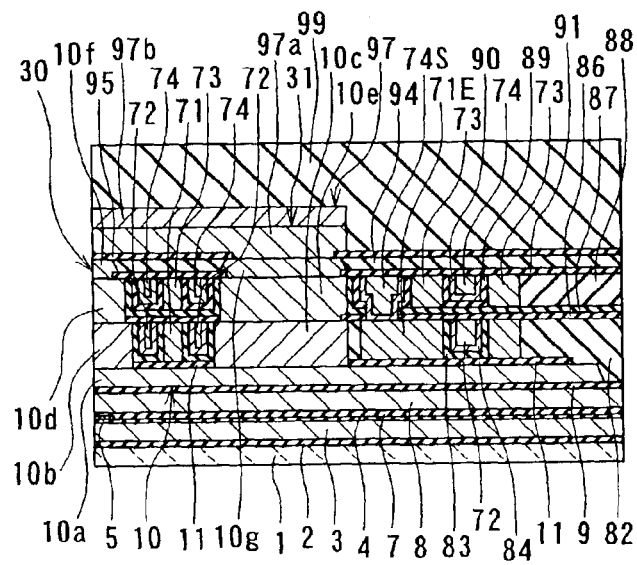
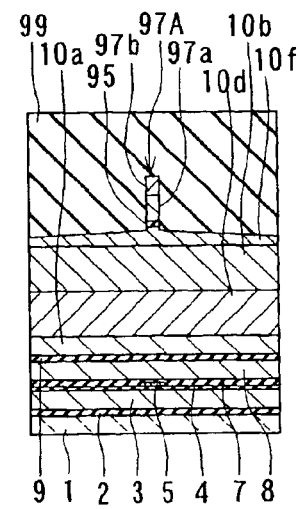
FIG. 45A          FIG. 45B

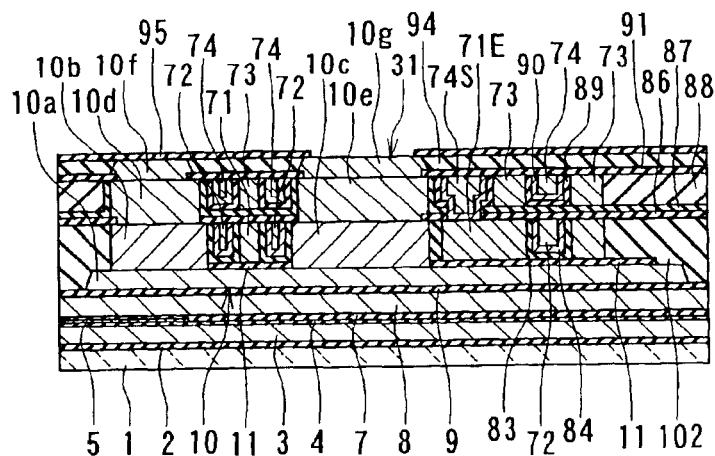
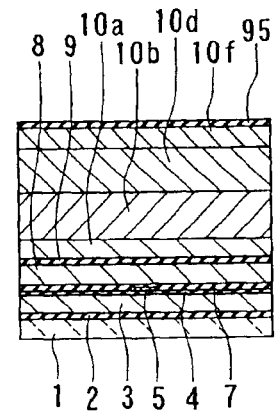
FIG. 59A
FIG. 59B
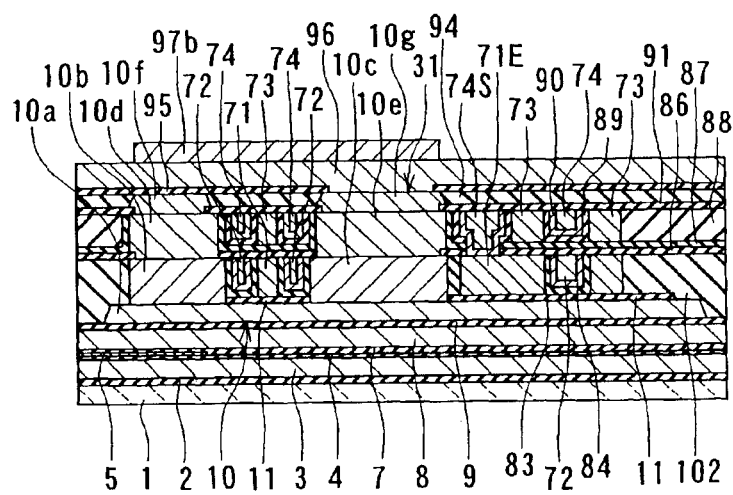
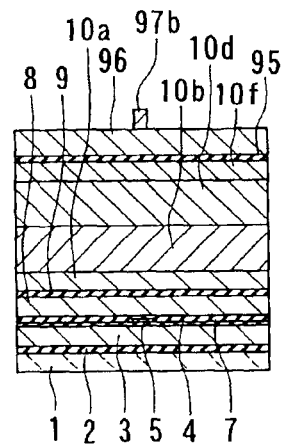
FIG. 60A
FIG. 60B

THIN-FILM MAGNETIC HEAD WITH THIN-FILM COIL OF LOW RESISTANCE

BACKGROUND OF THE INVENTION

1. Field of the Invention

The present invention relates to a thin-film magnetic head having at least an induction-type electromagnetic transducer, and a method of manufacturing same.

2. Description of the Related Art

Recent years have seen significant improvements in the areal recording density of hard disk drives. In particular, areal recording densities of latest hard disk drives reach 80 to 100 GB/platter and are even on a pace to exceed that level. Thin-film magnetic heads are required of improved performance accordingly.

Among the thin-film magnetic heads, widely used are composite thin-film magnetic heads made of a layered structure including a recording head having an induction-type electromagnetic transducer for writing and a reproducing head having a magnetoresistive element (that may be hereinafter called an MR element) for reading.

In general, a recording head incorporates: a medium facing surface (air bearing surface) that faces toward a recording medium; a bottom pole layer and a top pole layer that are magnetically coupled to each other and include magnetic pole portions opposed to each other and located in regions of the pole layers on a side of the medium facing surface; a recording gap layer provided between the magnetic pole portions of the top and bottom pole layers; and a thin-film coil at least part of which is disposed between the top and bottom pole layers and insulated from the top and bottom pole layers. In the typical recording head, the bottom pole layer and the top pole layer are magnetically coupled to each other via a coupling portion which is located away from the medium facing surface. The thin-film coil has the shape of a flat spiral, and is disposed around the coupling portion.

Higher track densities on a recording medium are essential to enhancing the recording density among the performances of a recording head. To achieve this, it is required to implement a recording head of a narrow track structure in which the track width, that is, the width of the two magnetic pole portions opposed to each other on a side of the medium facing surface, with the recording gap layer disposed in between, is reduced down to microns or the order of submicron. Semiconductor process techniques are utilized to achieve such a structure.

As the track width decreases, it becomes harder to generate a high-density magnetic flux between the two magnetic pole portions that are opposed to each other with the recording gap layer in between. On that account, it is desirable that the magnetic pole portions be made of a magnetic material having a higher saturation flux density.

When the frequency of the recording signal is raised to increase the recording density, recording heads require an improvement in the speed of change of flux, or equivalently, a reduction in flux rise time. The recording heads also require less degradation in such recording characteristics as an overwrite property and non-linear transition shift at high frequency bands. For improved recording characteristics at high frequency bands, the magnetic path length is preferably made smaller. The magnetic path length is determined chiefly by the length of a portion of the bottom or top pole layer, the portion lying between the coupling portion and the medium facing surface (referred to as yoke length in the present application). A reduction in yoke length is effective at reducing the magnetic path length. The yoke length is effectively reduced by decreasing the winding pitch of the thin-film coil, or the pitch of a portion of the winding which lies between the coupling portion and the medium facing surface, in particular.

One of known techniques for decreasing the winding pitch of a thin-film coil is to form a recess in the bottom pole layer so as to place the thin-film coil in the recess (see the specification of U.S. Pat. No. 6,043,959).

According to the method of manufacturing a thin-film magnetic head described in U.S. Pat. No. 6,043,959, the bottom pole layer, the top pole layer, and the thin-film coil are formed through the following steps. Initially, the bottom pole layer patterned into a predetermined shape is formed. A recording gap layer and a magnetic layer are then formed on the bottom pole layer in succession. Part of the magnetic layer is coupled to the bottom pole layer. Then, a mask is formed to cover portions of the magnetic layer where to form the magnetic pole portion of the top pole layer and where to form the coupling portion. The magnetic layer, the recording gap layer and the bottom pole layer are etched by using this mask. Consequently, the magnetic layer after the etching makes a pole portion layer that is to be the magnetic pole portion of the top pole layer, and a coupling layer that is to be the coupling portion. The above-mentioned etching also forms a trim structure, in which the magnetic pole portion of the top pole layer, the recording gap layer, and part of the bottom pole layer make vertical, self-aligned sidewalls. The etching also provides the bottom pole layer with a recess in which the thin-film coil is to be placed. An insulating film is then formed all over, and thereafter, the thin-film coil is formed by plating on the insulating film inside the recess. Then, a thick insulating layer is formed all over and the top surface of this insulating layer is flattened to expose the pole portion layer and the coupling layer of the top pole layer. On the flattened surface, a yoke portion layer of the top pole layer is formed so that the pole portion layer and the coupling layer are coupled to each other.

In the thin-film magnetic head described in U.S. Pat. No. 6,043,959, an end of the coupling portion closer to the medium facing surface has a part that extends linearly in parallel with the medium facing surface.

Another known technique for decreasing the winding pitch of the thin-film coil is to arrange the winding of a second coil in a winding gap of a first coil (see the specification of U.S. Pat. No. 6,191,916 B1).

U.S. Pat. No. 5,995,342 describes a planar head having flat coils of three turns. This head has a magnetic core frame which comprises a single bottom pole layer, two plate-shaped struts connected to respective ends of the bottom pole layer, and two top pole layers connected to the respective struts. The struts are shaped like a plate and are arranged perpendicular to the bottom pole layer and the top pole layers. The flat coils are disposed respectively around the struts.

In the thin-film magnetic head described in U.S. Pat. No. 6,043,959, the end of the coupling portion closer to the medium facing surface has the part that extends linearly in parallel with the medium facing surface. In this thin-film magnetic head, the thin-film coil has a plurality of conductor portions (hereinafter referred to as linear conductor portions) arranged between the coupling portion and the medium facing surface. The linear conductor portions extend linearly in parallel with the medium facing surface. To reduce the yoke length of this thin-film magnetic head, the linear conductor portions must be made smaller in width. The longer the linear conductor portions are, the higher the resistance of the entire thin-film coil becomes. The shorter the linear conductor portions, the lower the resistance of the entire thin-film coil.

As described above, thin-film magnetic heads desirably have smaller yoke lengths for the sake of improved recording characteristics at high frequency bands. It is therefore effective to reduce the pitch of the portion of the thin-film coil winding which lies between the coupling portion and the medium facing surface. In conventional thin-film magnetic heads however, a reduction in the above-mentioned pitch can decrease the width of the linear conductor portions and thus increase the resistance of the linear conductor portions. Since the conventional thin-film magnetic heads have linear conductor portions of relatively greater lengths, the resistance of the linear conductor portions occupies a considerable portion of the resistance of the entire thin-film coil, e.g., 60–70%. Under the circumstances, the conventional thin-film magnetic heads have had the problem that the thin-film coil increases in resistance when the yoke length is reduced to improve the recording characteristics at high frequency bands.

For improved recording characteristics of the thin-film magnetic heads, it is also desirable to increase the number of turns of the thin-film coil. Nevertheless, if the yoke length is reduced as described above and the number of turns of the thin-film coil is increased at the same time, the conventional thin-film magnetic heads become yet smaller in the width of the linear conductor portions, which results in further increases in the resistance of the linear conductor portions and the resistance of the entire thin-film coil.

As the resistance of the thin-film coil increases, there arises a problem that the magnetic pole portions can protrude toward the recording medium due to heat occurring from the thin-film coil and thus the magnetic pole portions become more likely to collide with the recording medium.

Thus, in the conventional thin-film magnetic heads it has been unfeasible to reduce the yoke length considerably from the viewpoint of avoiding the problem that occurs from an increase in the resistance of the thin-film coil.

As mentioned above, for the sake of improved recording characteristics of the thin-film magnetic heads, it is also desirable to increase the number of turns of the thin-film coil. In the conventional thin-film magnetic heads, however, the turns of winding of the thin-film coil increase in length of the linear conductor portions as the turns are closer to the outer periphery of the winding. Thus, when the number of turns of the thin-film coil is increased, the thin-film coil becomes greater in resistance as well as in the area which the thin-film coil occupies. The increase in the area makes it difficult to obtain smaller thin-film magnetic heads.

In the conventional thin-film magnetic heads, the width of the linear conductor portions must be reduced for the sake of a smaller yoke length. As the width of the linear conductor portions decreases, however, it becomes difficult to form the linear conductor portions with precision, as will be discussed later.

In general, the thin-film coil is formed by frame plating through the following steps. Initially, a photoresist frame is formed by photolithography. Then, a thin electrode film is formed to cover this frame. With an electric current passed through this electrode film, the thin-film coil is formed by electroplating. When the thin-film coil is to be formed in a recess of the bottom pole layer, the frame must be formed on the uneven bottom pole layer. When the frame is formed by photolithography on such an uneven base, rays of light used for exposure of photolithography are reflected off the electrode film lying on the sidewalls of the recess. The photoresist is exposed to the reflected rays as well. For that reason, it is difficult to form a fine frame precisely on an uneven base by photolithography.

Consequently, for example, if a thin-film coil having a thickness of 1.5 µm or more and having linear conductor portions of 0.3 µm or less in width or 0.5 µm or less in pitch is to be formed in the recess of the bottom pole layer by the existing photolithography techniques, the yield of the thin-film coil becomes extremely low, and therefore it is practically difficult to form such a coil.

The technology described in U.S. Pat. No. 6,191,916 B1 can be used to reduce the spacing between adjoining windings. The thin-film magnetic head described in U.S. Pat. No. 6,191,916 B1, however, has thin-film coils of constant winding widths. In this thin-film magnetic head, the thin-film coils can thus increase in resistance when the winding widths are reduced for the sake of a smaller yoke length.

In the planar head described in U.S. Pat. No. 5,995,342. the flat coils are disposed respectively around the plate-shaped struts. The flat coils each have a plurality of linear conductor portions which extend linearly in parallel with both surfaces of the struts. To reduce the yoke length of this planar head, the linear conductor portions must be reduced in width. Since the linear conductor portions in this planar head are relatively long, there is a problem that a reduction in the yoke length can cause an increase in the resistance of the thin-film coil.

OBJECT AND SUMMARY OF THE INVENTION

It is an object of the invention to provide a thin-film magnetic head which is small in magnetic path length and thus excellent in recording characteristics at high frequency bands and which also has a thin-film coil of small resistance, and a method of manufacturing the same.

A first or second thin-film magnetic head of the invention comprises:

a medium facing surface that faces toward a recording medium;

first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer:

a gap layer interposed between the magnetic pole portion of the first pole layer and the magnetic pole portion of the second pole layer; and a thin-film coil disposed around the coupling portion, at least part of the thin-film coil being interposed between the first and second pole layers and insulated from the first and second pole layers.

In the first thin-film magnetic head of the invention, the coupling portion has an end face facing toward the medium facing surface. The end face includes a curved surface that is convex toward the medium facing surface. The thin-film coil has a flat conductive layer of three turns. The first turn, the second turn, and the third turn of the conductive layer from the inner side include a first portion, a second portion and a third portion, respectively, which lie between the end face of the coupling portion and the medium facing surface.

Of the first, second and third portions at least the first portion has a minimum width of the conductive layer at a position on a virtual line connecting the end face of the coupling portion and the medium facing surface in the shortest distance, and increases in width with distance from the virtual line. Consequently, according to the first thin-film magnetic head of the invention, it is possible to reduce the resistance of the thin-film coil while reducing the magnetic path length.

In the first thin-film magnetic head of the invention, the end face of the coupling portion may have a shape of a part of a cylindrical surface.

In the first thin-film magnetic head of the invention, an inner periphery of the first portion may have a shape of an arc having a first radius of curvature; an outer periphery of the first portion may have a shape of an arc having a second radius of curvature greater than the first radius of curvature; an inner periphery of the second portion may have a shape of an arc having a third radius of curvature greater than the second radius of curvature; and an outer periphery of the second portion may have a shape of an arc having a fourth radius of curvature greater than the third radius of curvature. In this case, an inner periphery of part of the third turn including the third portion may have a shape of an arc having a fifth radius of curvature greater than the fourth radius of curvature; and an outer periphery of the part of the third turn may have a shape of an arc having a sixth radius of curvature greater than the fifth radius of curvature. Alternatively, an inner periphery of part of the third turn including the third portion may have a shape of an arc having a fifth radius of curvature greater than the fourth radius of curvature; and an outer periphery of the part of the third turn may include a linear portion and two arc portions connected to respective ends of the linear portion, the linear portion being located in a predetermined region covering the position on the virtual line, the two arc portions having a sixth radius of curvature greater than the fifth radius of curvature.

In the first thin-film magnetic head of the invention, an inner periphery of the first portion may have a shape of an arc having a first radius of curvature; and an outer periphery of the first portion may have a shape of an arc having a second radius of curvature greater than the first radius of curvature. In this case, an inner periphery of the second portion may have a shape of an arc having a third radius of curvature greater than the second radius of curvature: an outer periphery of the second portion may include a first linear portion and two arc portions connected to respective ends of the first linear portion, the first linear portion being located in a predetermined region covering the position on the virtual line, the two arc portions having a fourth radius of curvature greater than the third radius of curvature; an inner periphery of part of the third turn including the third portion may include a second linear portion and two arc portions connected to respective ends of the second linear portion, the second linear portion being located in a predetermined region covering the position on the virtual line, the arc portions having a fifth radius of curvature greater than the fourth radius of curvature; and an outer periphery of the part of the third turn may include a third linear portion and two arc portions connected to respective ends of the third linear portion, the third linear portion being located in a predetermined region covering the position on the virtual line, the two arc portions having a sixth radius of curvature greater than the fifth radius of curvature. The second linear portion may have a length greater than or equal to that of the first linear portion, and the third linear portion may be longer than the second linear portion.

In the first thin-film magnetic head of the invention. an inner periphery of the first portion may have a shape of an arc having a first radius of curvature: and an outer periphery of the first portion may include a first linear portion and two arc portions connected to respective ends of the first linear portion, the first linear portion being located in a predetermined region covering the position on the virtual line, the two arc portions having a second radius of curvature greater than the first radius of curvature. In this case, an inner periphery of the second portion may include a second linear portion and two arc portions connected to respective ends of the second linear portion, the second linear portion being located in a predetermined region covering the position on the virtual line, the two arc portions having a third radius of curvature greater than the second radius of curvature; and an outer periphery of the second portion may include a third linear portion and two arc portions connected to respective ends of the third linear portion, the third linear portion being located in a predetermined region covering the position on the virtual line, the two arc portions having a fourth radius of curvature greater than the third radius of curvature. In this case, an inner periphery of part of the third turn including the third portion may include a fourth linear portion and two arc portions connected to respective ends of the fourth linear portion, the fourth linear portion being located in a predetermined region covering the position on the virtual line, the arc portions having a fifth radius of curvature greater than the fourth radius of curvature; and an outer periphery of the part of the third turn may include a fifth linear portion and two arc portions connected to respective ends of the fifth linear portion, the fifth linear portion being located in a predetermined region covering the position on the virtual line, the two arc portions having a sixth radius of curvature greater than the fifth radius of curvature. The second linear portion may have a length greater than or equal to that of the first linear portion, the third linear portion may be longer than the second linear portion, the fourth linear portion may have a length greater than or equal to that of the third linear portion, and the fifth linear portion may be longer than the fourth linear portion.

In the first thin-film magnetic head of the invention, the thin-film coil may have two conductive layers that are laminated and electrically connected to each other.

In the first thin-film magnetic head of the invention, the first pole layer may have a first layer opposed to the thin-film coil, a second layer connected to the first layer near the medium facing surface, and a third layer connected to the first layer, the third layer including at least part of the coupling portion, and, part of the conductive layer may be disposed between the second layer and the third layer. In this case, the second pole layer may be a flat layer.

In the second thin-film magnetic head of the invention, the thin-film coil has: a flat first coil of a single turn: a flat second coil of two turns arranged to sandwich the first coil from inner and outer sides thereof; a flat third coil of a single turn located above the first coil and the second coil; and a flat fourth coil of two turns arranged to sandwich the third coil from inner and outer sides thereof. The first coil and the fourth coil are connected in series to constitute a first three-turn coil; the second coil and the third coil are connected in series to constitute a second three-turn coil; and the first three-turn coil and the second three-turn coil are connected in series. Consequently, according to the second thin-film magnetic head of the invention, it is possible to reduce the resistance of the thin-film coil while reducing the magnetic path length.

In the second thin-film magnetic head of the invention, the first pole layer may have a first layer opposed to the thin-film coil, a second layer connected to the first layer near the medium facing surface, and a third layer connected to the first layer, the third layer including part of the coupling portion, and, part of the first coil and part of the second coil may be located between the second layer and the third layer. In this case, the first pole layer may further have a fourth layer connected to the second layer near the medium facing surface, and a fifth layer connected to the third layer, the fifth layer including part of the coupling portion, and, part of the third coil and part of the fourth coil may be located between the fourth layer and the fifth layer.

In the second thin-film magnetic head of the invention, an inner end of the first coil and an inner end of the fourth coil may be connected to each other at a first connecting point; an inner end of the second coil and an inner end of the third coil may be connected to each other at a second connecting point; and the first connecting point and the second connecting point may be located at two respective positions farther from the medium facing surface than the coupling portion is, the positions being adjacent to the coupling portion and of the same distance from the medium facing surface.

In the second thin-film magnetic head of the invention, the coupling portion may have an end face facing toward the medium facing surface, the end face including a curved surface convex toward the medium facing surface. In this case, the first turn and the second turn of the second coil from an inner side thereof may include a first portion and a second portion, respectively, the first and second portions lying between the end face of the coupling portion and the medium facing surface. Of the first portion and the second portion, at least the first portion may have a minimum width of the second coil at a position on a virtual line connecting the end face of the coupling portion and the medium facing surface in the shortest distance, and may increase in width with distance from the virtual line. In this case, the first coil may include a single portion lying between the end face of the coupling portion and the medium facing surface. The portion may have a minimum width of the first coil at the position on the virtual line connecting the end face of the coupling portion and the medium facing surface in the shortest distance, and may increase in width with distance from the virtual line.

In the second thin-film magnetic head of the invention, when the coupling portion has an end face facing toward the medium facing surface and the end face includes a curved surface convex toward the medium facing surface, the first turn and the second turn of the fourth coil from an inner side thereof may include a first portion and a second portion, respectively, the first and second portions lying between the end face of the coupling portion and the medium facing surface. Of the first portion and the second portion, at least the first portion may have a minimum width of the fourth coil at a position on a virtual line connecting the end face of the coupling portion and the medium facing surface in the shortest distance, and may increase in width with distance from the virtual line. In this case, the third coil may include a single portion lying between the end face of the coupling portion and the medium facing surface. The portion may have a minimum width of the third coil at the position on the virtual line connecting the end face of the coupling portion and the medium facing surface in the shortest distance, and may increase in width with distance from the virtual line.

In the second thin-film magnetic head of the invention, the end face of the coupling portion may have a shape of a part of a cylindrical surface.

In the second thin-film magnetic head of the invention, the end face of the coupling portion may be shaped as if portions of two cylindrical surfaces having different radii of curvature are connected to each other at a position on a virtual line connecting the end face of the coupling portion and the medium facing surface in the shortest distance.

A thin-film magnetic head manufactured by a first or second method of manufacturing a thin-film magnetic head of the invention comprises:

a medium facing surface that faces toward a recording medium;

first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil disposed around the coupling portion, at least part of the thin-film coil being interposed between the first and second pole layers and insulated from the first and second pole layers.

The first or second method of manufacturing a thin-film magnetic head of the invention comprises the steps of:

forming the first pole layer;

forming the thin-film coil on the first pole layer;

forming the gap layer on the magnetic pole portion of the first pole layer; and forming the second pole layer on the gap layer and the thin-film coil.

In the first method of manufacturing a thin-film magnetic head of the invention, one of the steps of forming the first pole layer and forming the second pole layer includes the step of forming the coupling portion so that the coupling portion has an end face facing toward the medium facing surface and the end face includes a curved surface convex toward the medium facing surface. The thin-film coil has a flat conductive layer of three turns. The first turn, the second turn, and the third turn of the conductive layer from an inner side thereof include a first portion, a second portion, and a third portion, respectively, the first to third portions lying between the end face of the coupling portion and the medium facing surface. Of the first, second and third portions, at least the first portion has a minimum width of the conductive layer at a position on a virtual line connecting the end face of the coupling portion and the medium facing surface in the shortest distance, and increases in width with distance from the virtual line. Consequently, it is possible to reduce the resistance of the thin-film coil of the thin-film magnetic head while reducing the magnetic path length.

In the first method of manufacturing a thin-film magnetic head of the invention, the step of forming the first pole layer may form a first layer opposed to the thin-film coil, a second layer connected to the first layer near the medium facing surface, and a third layer connected to the first layer, the third layer including at least part of the coupling portion. In the step of forming the thin-film coil, part of the conductive layer may be disposed between the second layer and the third layer.

In the second method of manufacturing a thin-film magnetic head of the invention, one of the steps of forming the first pole layer and forming the second pole layer includes the step of forming the coupling portion: and the step of forming the thin-film coil forms a flat first coil of a single turn; a flat second coil of two turns arranged to sandwich the first coil from inner and outer sides thereof: a flat third coil of a single turn located above the first coil and the second coil: and a flat fourth coil of two turns arranged to sandwich the third coil from inner and outer sides thereof. The first coil and the fourth coil are connected in series to constitute a first three-turn coil; the second coil and the third coil are connected in series to constitute a second three-turn coil; and the first three-turn coil and the second three-turn coil are connected in series. Consequently, it is possible to reduce the resistance of the thin-film coil of the thin-film magnetic head while reducing the magnetic path length.

In the second method of manufacturing a thin-film magnetic head of the invention, the step of forming the first pole layer may form a first layer opposed to the thin-film coil, a second layer connected to the first layer near the medium facing surface, and a third layer connected to the first layer, the third layer including part of the coupling portion. In the step of forming the thin-film coil, part of the first coil and part of the second coil may be disposed between the second layer and the third layer. In this case, the step of forming the first pole layer may further form a fourth layer connected to the second layer near the medium facing surface, and a fifth layer connected to the third layer, the fifth layer including part of the coupling portion. In the step of forming the thin-film coil, part of the third coil and part of the fourth coil may be disposed between the fourth layer and the fifth layer.

In the second method of manufacturing a thin-film magnetic head of the invention, the coupling portion may have an end face facing toward the medium facing surface, the end face including a curved surface convex toward the medium facing surface.

Other and further objects, features and advantages of the invention will appear more fully from the following description.

BRIEF DESCRIPTION OF THE DRAWINGS

FIGS. 1A and 1B are cross sections for illustrating a step in a method of manufacturing a thin-film magnetic head according to a first embodiment of the invention.

FIGS. 2A and 2B are cross sections for illustrating a step that follows FIGS. 1A and 1B.

FIGS. 3A and 3B are cross sections for illustrating a step that follows FIGS. 2A and 2B.

FIGS. 4A and 4B are cross sections for illustrating a step that follows FIGS. 3A and 3B.

FIGS. 7A and 7B are cross sections for illustrating a step that follows FIGS. 6A and 6B.

FIGS. 8A and 8B are cross sections for illustrating a step that follows FIGS. 7A and 7B.

FIGS. 11A and 11B are cross sections for illustrating a step that follows FIGS. 10A and 10B.

FIGS. 12A and 12B are cross sections for illustrating a step that follows FIGS. 11A and 11B.

FIGS. 30A and 30B are cross sections for illustrating a step in a method of manufacturing a thin-film magnetic head according to a second embodiment of the invention.

FIGS. 31A and 31B are cross sections for illustrating a step that follows FIGS. 30A and 30B.

FIGS. 32A and 32B are cross sections for illustrating a step that follows FIGS. 31A and 31B.

FIGS. 33A and 33B are cross sections for illustrating a step that follows FIGS. 32A and 32B.

FIGS. 34A and 34B are cross sections for illustrating a step that follows FIGS. 33A and 33B.

FIGS. 35A and 35B are cross sections for illustrating a step that follows FIGS. 34A and 34B.

FIGS. 36A and 36B are cross sections for illustrating a step that follows FIGS. 35A and 35B.

FIGS. 37A and 37B are cross sections for illustrating a step that follows FIGS. 36A and 36B.

FIGS. 38A and 38B are cross sections for illustrating a step that follows FIGS. 37A and 37B.

FIGS. 39A and 39B are cross sections for illustrating a step that follows FIGS. 38A and 38B.

FIGS. 40A and 40B are cross sections for illustrating a step that follows FIGS. 39A and 39B.

FIGS. 41A and 41B are cross sections for illustrating a step that follows FIGS. 40A and 40B.

FIGS. 42A and 42B are cross sections for illustrating a step that follows FIGS. 41A and 41B.

FIGS. 43A and 43B are cross sections for illustrating a step that follows FIGS. 42A and 42B.

FIGS. 44A and 44B are cross sections for illustrating a step that follows FIGS. 43A and 43B.

FIGS. 45A and 45B are cross sections for illustrating a step that follows FIGS. 44A and 44B.

FIGS. 59A and 59B are cross sections for illustrating a step that follows FIGS. 58A and 58B.

FIGS. 60A and 60B are cross sections for illustrating a step that follows FIGS. 59A and 59B.

DETAILED DESCRIPTION OF THE PREFERRED EMBODIMENTS

Embodiments of the invention will now be described in detail with reference to the accompanying drawings.

[First Embodiment]

Figure 14:
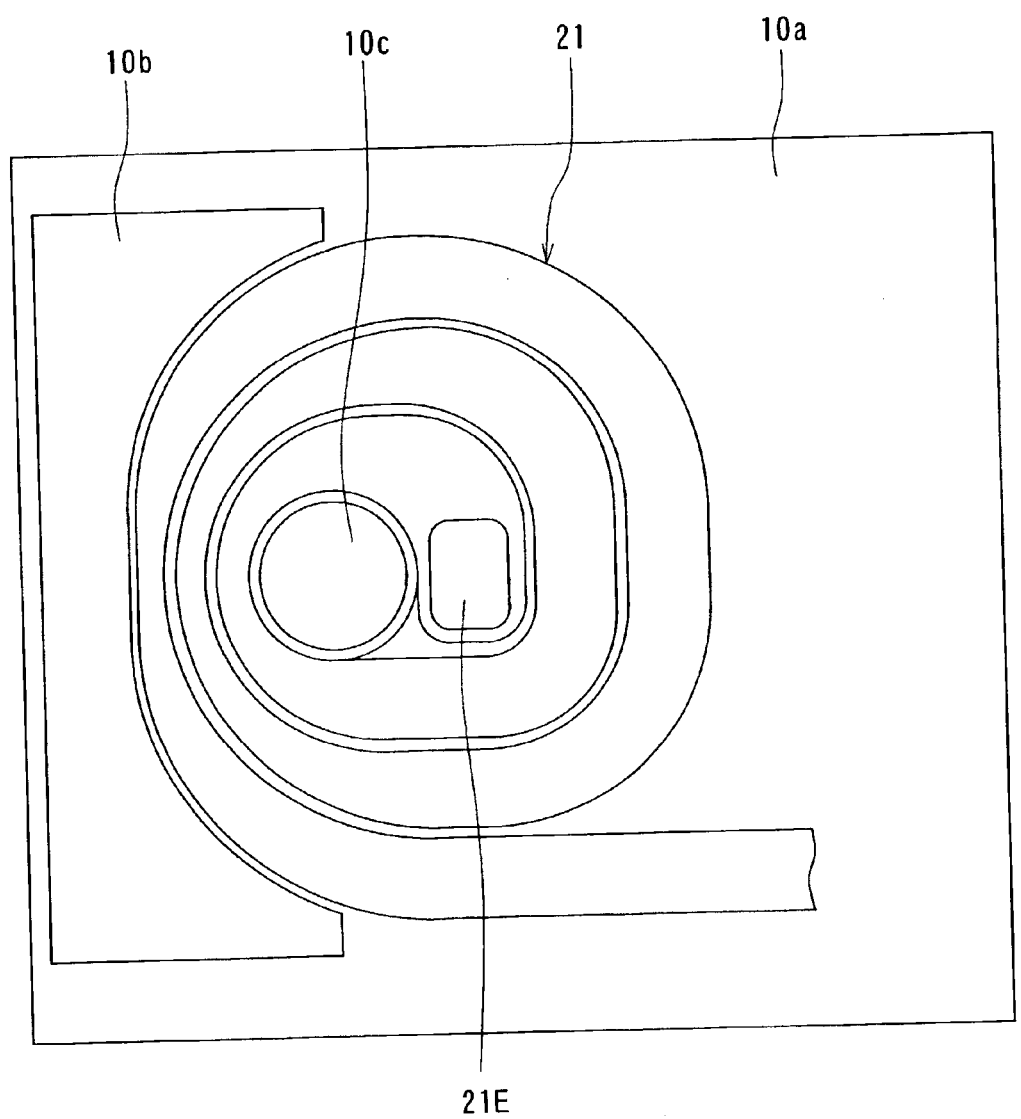
FIG. 14 is a plan view for illustrating a method of forming a thin-film coil in the first embodiment of the invention.
Figure 15:
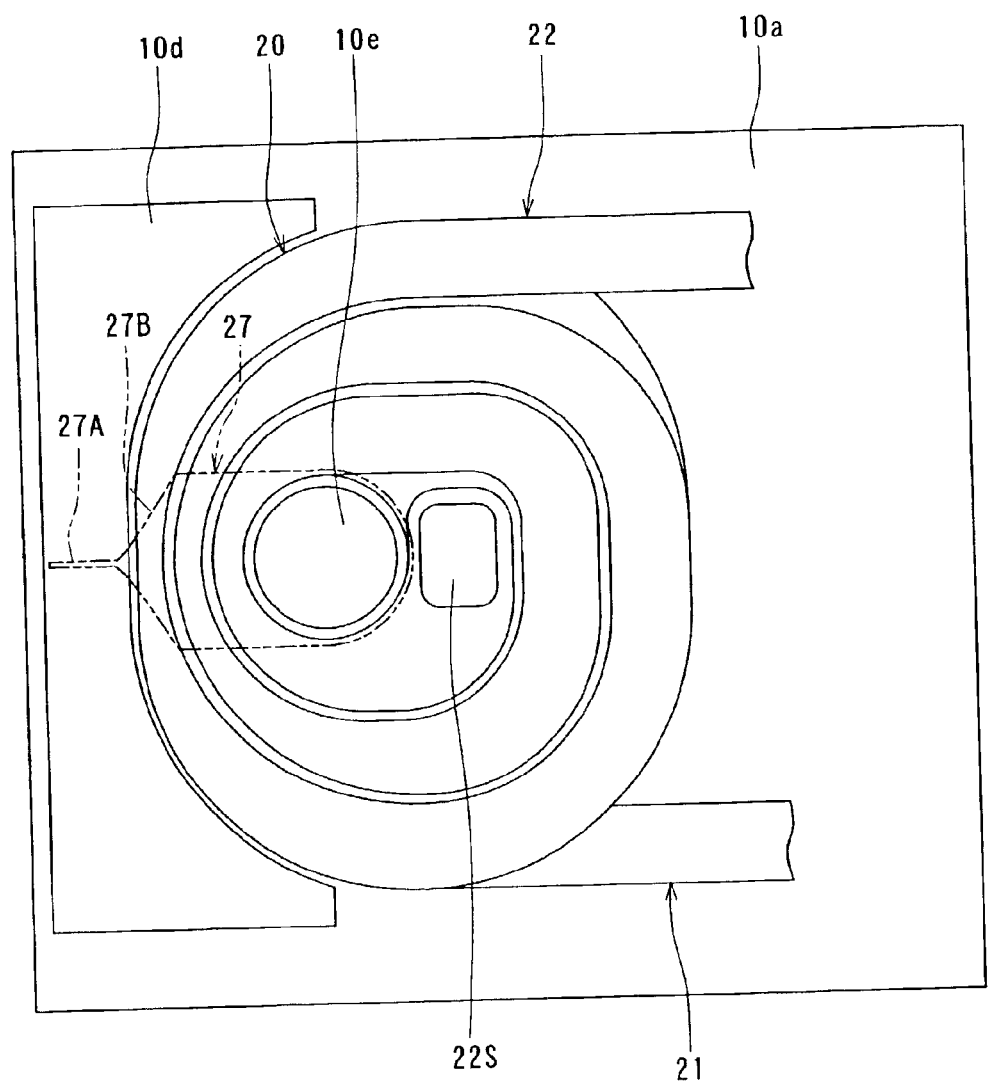
FIG. 15 is a plan view for illustrating the method of forming the thin-film coil in the first embodiment of the invention.

First, a method of manufacturing a thin-film magnetic head according to a first embodiment of the invention will be described with reference to FIGS. 1A to 13A, FIGS. 1B to 13B, FIG. 14, and FIG. 15. FIGS. 1A to 13A are cross sections each orthogonal to the air bearing surface and the top surface of the substrate. FIGS. 1B to 13B are cross sections of the magnetic pole portion each parallel to the air bearing surface. FIG. 14 and FIG. 15 are plan views for illustrating the method of forming a thin-film coil of the present embodiment.

In the method of manufacturing the thin-film magnetic head of the present embodiment, as shown in FIGS. 1A and 1B, an insulating layer 2 made of alumina ($Al_2O_3$), for example, is first deposited to a thickness of approximately 2 to 5 $\mu$m on a substrate 1 made of aluminum oxide and titanium carbide ($Al_2O_3$—TiC), for example. Next, a bottom shield layer 3 intended for a reproducing head, made of a magnetic material such as Permalloy, is formed to a thickness of approximately 2 to 3 $\mu$m on the insulating layer 102. The bottom shield layer 3 is selectively formed on the insulating layer 2 by plating using a photoresist film as a mask, for example. Then, although not shown, an insulating layer made of alumina, for example, is formed all over to a thickness of 3 to 4 $\mu$m, for example. The insulating layer is then polished by, for example, chemical mechanical polishing (hereinafter referred to as CMP), to expose the bottom shield layer 3 and to flatten the surface.

On the bottom shield layer 3, a bottom shield gap film 4 serving as an insulating film is formed to a thickness of approximately 20 to 40 nm, for example. On the bottom shield gap film 4, an MR element 5 for magnetic signal detection is formed to a thickness of tens of nanometers. For example, the MR element 5 may be formed by selectively etching an MR film formed by sputtering. The MR element 5 is located near a region where to form an air bearing surface to be described later. The MR element 5 may be an element utilizing a magnetosensitive film that exhibits magnetoresistivity, such as an AMR element, a GMR element or a TMR (tunnel magnetoresistive) element. Next, although not shown, a pair of electrode layers to be electrically connected to the MR element 5 are formed to a thickness of tens of nanometers on the bottom shield gap film 4. Then, a top shield gap film 7 serving as an insulating film is formed to a thickness of approximately 20 to 40 nm, for example, on the bottom shield gap film 4 and the MR element 5. The MR element 5 is embedded In the shield gap films 4 and 7. Examples of insulating materials to be used for the shield gap films 4 and 7 include alumina, aluminum nitride, and diamond-like carbon (DLC). The shield gap films 4 and 7 may be formed by sputtering or chemical vapor deposition (hereinafter referred to as CVD).

Next, a top shield layer 8 intended for the reproducing head, made of a magnetic material, is selectively formed on the top shield gap film 7 to a thickness of approximately 1.0 to 1.5 $\mu$m. Then, an insulating layer 9 made of alumina, for example, is formed to a thickness of approximately 0.15 to 0.2 $\mu$m over the entire top surface of the laminate obtained through the foregoing steps. On the insulating layer 9, a first layer 10a of a bottom pole layer 10 is formed to a thickness of approximately 0.5 to 0.8 $\mu$m. The bottom pole layer 10 includes the first layer 10a, and second to seventh layers 10b–10g to be described later.

The first layer 10a is formed by sputtering, using a high saturation flux density material such as FeAlN, FeN. FeCo, CoFeN, and FeZrN. The first layer 10a may also be formed by plating, using NiFe (Ni: 80 weight %; Fe: 20 weight %), or NiFe (Ni: 45 weight %; Fe: 55 weight %) that is a high saturation flux density material.

Next, as shown in FIGS. 2A and 2B, an insulating film 11 made of alumina, for example, is formed on the first layer 10a to a thickness of 0.2 μm. for example. The insulating film 11 is then selectively removed at portions corresponding to the regions where to form the second layer 10b and the third layer 10c.

Next, although not shown, an electrode film of a conductive material is formed to a thickness of 50 to 80 nm by sputtering, for example, so as to cover the first layer 10a and the insulating film 11. This electrode film functions as an electrode and a seed layer for plating. Then, although not shown, a frame to be used for forming a first layer portion 21 of a thin-film coil by frame plating is formed on the electrode film by photolithography.

Next, electroplating is performed using the electrode film, whereby the first layer portion 21 made of Cu, for example, is formed to a thickness of 1.5 to 2.0 μm, for example. The first layer portion 21 is located in a region where the insulating film 11 is formed. The first layer portion 21 is a flat conductive layer of three turns. The first layer portion 21 has a connecting portion 21E near its inner end, which is connected to a second layer portion 22 of the thin-film coil to be formed later. The outer end of the first layer portion 21 is connected to a single electrode pad to be described later. Next, the frame is removed, and then a portion of the electrode film other than the portion underlying the first layer portion 21 is removed by ion beam etching, for example.

FIG. 14 is a plan view showing the first layer portion 21. FIG. 14 also shows the second layer 10b and the third layer 10c to be formed later. The first layer portion 21 is wound clockwise from the outer end to the inner end, for example.

Next, although not shown, a frame to be used for forming the second layer 10b and the third layer 10c by frame plating is formed on the first layer 10a and the insulating film 11 by photolithography.

Next, as shown in FIGS. 3A and 3B, electroplating is performed to form the second layer 10b and the third layer 10c, each made of a magnetic material, on the first layer 10a to a thickness of, for example, 1.5 to 2.0 μm each. For example, the material of the second layer 10b and the third layer 10c may be CoNiFe (Co: 67 weight %, Ni: 15 weight %, Fe: 18 weight %) having a saturation flux density of 1.8 to 1.9 T, or FeCo (Fe: approximately 60 weight %, Co: approximately 40 weight %) having a saturation flux density of 2.4 T. In the present embodiment, when the second layer 10b and the third layer 10c are formed by plating, no special electrode film is used but the unpatterned first layer 10a is used as an electrode and a seed layer for plating.

The second layer 10b is disposed near the region where to form the air bearing surface described later. The third layer 10c is a portion for connecting the first layer 10a and a top pole layer to be described later to each other, and is disposed near the center of the first layer portion 21.

Next, a photoresist layer 12 is formed to cover the first layer portion 21, the second layer 10b and the third layer 10c. Using the photoresist layer 12 as a mask, the first layer 10a is selectively etched by ion beam etching, for example, to thereby pattern the first layer 10a.

Next, as shown in FIGS. 4A and 4B, the photoresist layer 12 is removed and then an insulating film 13 is formed to fill the winding gap of the first layer portion 21. This insulating film 13 preferably is a photoresist film or a spin-on-glass (SOG) film. Next, an insulating layer 14 made of alumina, for example, is formed to a thickness of 3 to 4 μm so as to cover the entire top surface of the laminate. The insulating layer 14 is then polished by, for example, CMP so that the second layer 10b and the third layer 10c are exposed and the top surfaces of the second layer 10b, the third layer 10c, the first layer portion 21 and the insulating layer 14 are flattened.

Figure 5A:
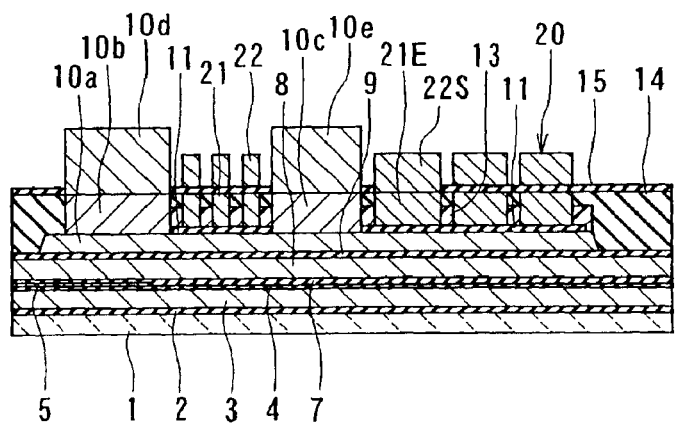
FIGS. 5A and 5B are cross sections for illustrating a step that follows FIGS. 4A and 4B.
Figure 5B:
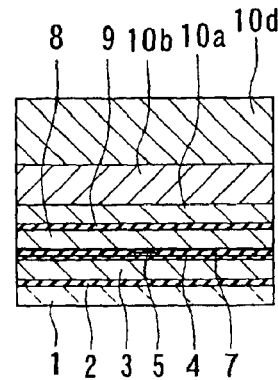

Next, as shown in FIGS. 5A and 5B, an insulating film 15 made of alumina, for example, is formed over the entire top surface of the laminate to a thickness of 0.2 μm. for example. The insulating film 15 is selectively removed at portions corresponding to the regions where to dispose the fourth layer 10d and the fifth layer 10e and at a portion lying over the connecting portion 21E. Consequently, a contact hole is formed over the connecting portion 21E.

Next, the second layer portion 22 is formed on the insulating film 15. The material, thickness, and forming method of the second layer portion 22 are the same as those of the first layer portion 21. The second layer portion 22 is a flat conductive layer of three turns. The second layer portion 22 has a connecting portion 22S near its inner end. The connecting portion 22S is connected to the connecting portion 21E of the first layer portion 21 through the contact hole. The outer end of the second layer portion 22 is connected to a single electrode pad to be described later. The first layer portion 21 and the second layer portion 22 constitute the thin-film coil 20.

FIG. 15 is a plan view showing the second layer portion 22. FIG. 15 also shows the fourth layer 10d, the fifth layer 10e, and a top pole layer 27 to be formed later. The second layer portion 22 is wound counterclockwise from the outer end to the inner end, for example.

Next, the fourth layer 10d is formed on the second layer 10b, and the fifth layer 10e on the third layer 10c. The material, thickness, and forming method of the fourth layer 10d and the fifth layer 10e are the same as those of the second layer 10b and the third layer 10c.

Figure 6A:
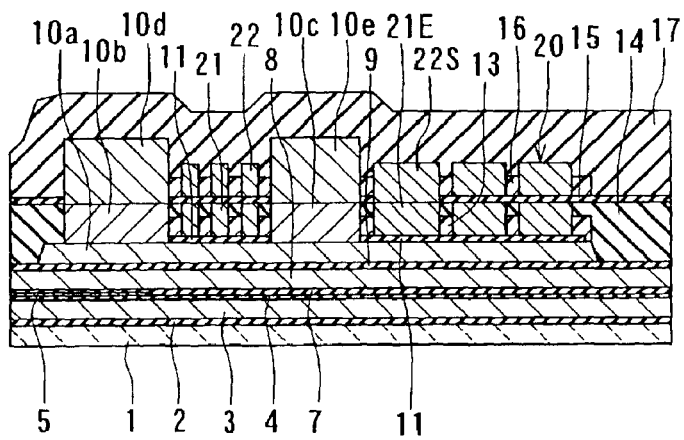
FIGS. 6A and 6B are cross sections for illustrating a step that follows FIGS. 5A and 5B.
Figure 6B:
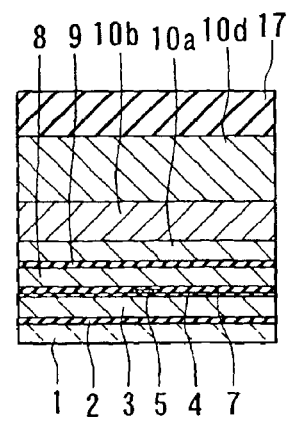

Next, as shown in FIGS. 6A and 6B, an insulating film 16 is formed to fill the winding gap of the second layer portion 22. An insulating layer 17 made of alumina, for example, is then formed to a thickness of 3 to 4 μm so as to cover the entire top surface of the laminate.

Next, as shown in FIGS. 7A and 7B, the insulating layer 17 is polished by, for example. CMP so that the fourth layer 10d and the fifth layer 10e are exposed and the top surfaces of the fourth layer 10d, the fifth layer 10e, the second layer portion 22 and the insulating layer 17 are flattened.

Next, as shown in FIGS. 8A and 8B, an insulating film 18 made of alumina, for example, is formed over the entire top surface of the laminate to a thickness of 0.2 μm, for example. The insulating film 18 is then selectively removed at portions corresponding to the regions where to form the sixth layer 10f and the seventh layer 10g.

Next, a magnetic layer 19 of a magnetic material is formed to a thickness of 0.8 to 1.2 μm by sputtering, so as to cover the entire top surface of the laminate. For example, the magnetic layer 19 is made of a metal magnetic material that contains at least iron among the group consisting of iron (Fe), nickel (Ni), and cobalt (Co). Such magnetic materials include NiFe, CoNiFe, FeCo, FeN, and CoFeN. Of these, Co-containing high saturation flux density materials such as CoNiFe having a saturation flux density of 1.8 to 1.9 T, and FeCo or CoFeN having a saturation flux density of 2.3 to 2.4 T are preferably used in the present embodiment.

Figures 9A, 9B:
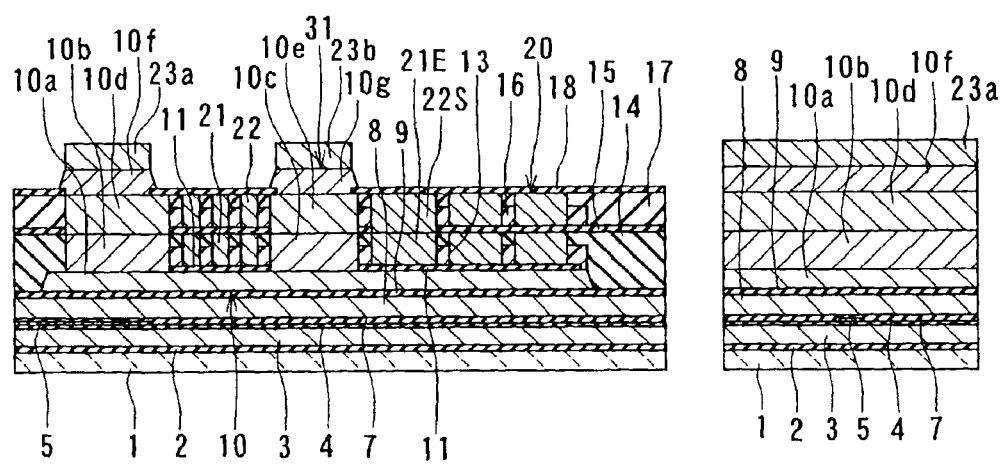
FIGS. 9A and 9B are cross sections for illustrating a step that follows FIGS. 8A and 8B.

Next, as shown in FIGS. 9A and 9B, etching masks 23a and 23b are formed to a thickness of 1 to 2 μm each on the magnetic layer 19 at the portions corresponding to the fourth layer 10d and the fifth layer 10e, respectively.

The above-mentioned etching masks may be made of a metal material. In this case, the etching masks may be formed by plating, or by frame plating in particular. The etching masks may also be made of a magnetic material different from the material constituting the magnetic layer 19. The magnetic material may be a Ni- or Fe-containing material such as NiFe and CoNiFe. The etching masks may also be made of a Ni-containing material such as Ni, NiCu, NiP, and NiB.

The material of the etching masks may also be an insulating material such as alumina. In this case, the etching masks are formed by sputtering, for example, using a photoresist layer as a mask.

Next, the magnetic layer 19 is etched by reactive ion etching (hereinafter referred to as RIE) using the abovementioned etching masks. Unetched portions of the magnetic layer 19 that remain under the etching masks 23a and 23b make the sixth layer 10f and the seventh layer 10g, respectively. The sixth layer 10f lies on the fourth layer 10d, and the seventh layer 10g lies on the fifth layer 10e. The etching of the magnetic layer 19 may be effected by ion beam etching instead of RIE.

In the present embodiment, after the etching of the magnetic layer 19 by RIE, at least part of the region, or the whole region for example, which has undergone the RIE, may be slightly etched by different dry etching, such as ion beam etching. This yields the following effects. First, etching residuals lying on the region having undergone the RIE can be eliminated to clean the surface of the region. Additionally, since the sidewalls that have been formed by the RIE are slightly etched, it is possible to clean the surfaces of those sidewalls. Furthermore, molecules of the halogen-type gas such as chlorine molecules which have adhered to those sidewalls during the RIE can be removed, so that it is possible to protect those sidewalls from corrosion.

Furthermore, as shown in FIGS. 9A and 9B, the sidewalls of the sixth layer 10f make inclined surfaces such that each of the sidewalls of the sixth layer 10f forms an angle of smaller than 90° with the top surface of the base of the sixth layer 10f. Consequently, it is possible to prevent the magnetic flux passing through the bottom pole layer 10 from being saturated on the way and to thereby introduce the magnetic flux to the vicinity of a recording gap layer to be described later.

The end of the sixth layer 10f located farther from the air bearing surface defines the throat height of the recording head. The throat height is the length (height) of the magnetic pole portions, that is, the portions of the two pole layers opposed to each other with the recording gap layer in between, as taken from the air-bearing-surface-side end to the other end.

The third layer 10c, the fifth layer 10e and the seventh layer 10g constitute a coupling portion 31 for establishing magnetic coupling between the bottom pole layer 10 and the top pole layer.

Figures 10A, 10B:
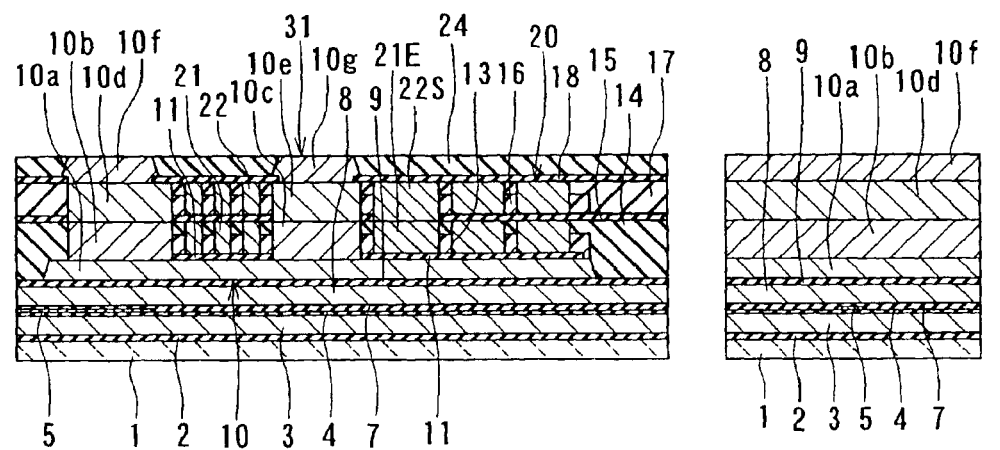
FIGS. 10A and 10B are cross sections for illustrating a step that follows FIGS. 9A and 9B.

Next, as shown in FIGS. 10A and 10B, an insulating layer 24 made of alumina, for example, is formed to a thickness of 1.5 to 2.0 $\mu$m so as to cover the entire top surface of the laminate. The insulating layer 24 is then polished by CMP, for example. This polishing is performed so as to remove the etching masks and to flatten the top surfaces of the sixth layer 10f, the seventh layer 10g, and the insulating layer 24.

Next, as shown in FIGS. 11A and 11B, the recording gap layer 25 is formed to a thickness of 0.06 to 0.08 $\mu$m so as to cover the entire top surface of the laminate. The recording gap layer 25 may be made of an insulating material such as alumina or a nonmagnetic metal material such as Ru, NiCu, and NiB. Then, a portion of the recording gap layer corresponding to the seventh layer 10g is selectively etched.

Next, a magnetic layer 26 made of a magnetic material is formed by sputtering, for example, to a thickness of 0.5 to 1.2 $\mu$m so as to cover the entire top surface of the laminate. For example, the magnetic layer 26 is made of a metal magnetic material that contains at least iron among the group consisting of iron, nickel, and cobalt. Such magnetic materials include NiFe, CoNiFe, FeCo, FeN, and CoFeN. Of these, Co-containing high saturation flux density materials such as CoNiFe having a saturation flux density of 1.8 to 1.9 T and FeCo or CoFeN having a saturation flux density of 2.3 to 2.4 T. for example, are preferably used in the present embodiment.

Next, a second layer 27b of the top pole layer 27 to be described later is formed to a thickness of 1 to 2 $\mu$m on the magnetic layer 26 by frame plating, for example. The second layer 27b is made of a metal magnetic material which is different from the material constituting the magnetic material 26, such as NiFe or CoNiFe. The second layer 27b is arranged to extend from a position corresponding to the sixth layer 10f of the bottom pole layer 10 to a position corresponding to the seventh layer 10g.

Next, as shown in FIGS. 12A and 12B, the magnetic layer 26 is selectively etched by RIE using the second layer 27b as an etching mask. Consequently, the portion of the magnetic layer 26 left unetched makes a first layer 27a of the top pole layer 27. The first layer 27a lies under the second layer 27b.

In the present embodiment, after the etching of the magnetic layer 26 by RIE, at least part of the region, or the whole region for example, which has undergone the RIE, may be slightly etched by different dry etching, such as ion beam etching. This yields the following effects. First, etching residuals lying on the region having undergone the RIE can be eliminated to clean the surface of the region. Additionally, since the sidewalls that have been formed by the RIE are slightly etched, it is possible to clean the surfaces of those sidewalls. Furthermore, molecules of the halogen-type gas such as chlorine molecules which have adhered to those sidewalls during the RIE can be removed, so that it is possible to protect those sidewalls from corrosion.

The top pole layer 27 has the first layer 27a that touches the recording gap layer 25, and the second layer 27b that is located on the first layer 27a. The top pole layer 27 includes: a track width defining portion 27A having an end located at the air bearing surface and the other end located away from the air bearing surface; and a yoke portion 27B (see FIG. 15) connected to the other end of the track width defining portion 27A. The yoke portion 27B has a width which is equal to that of the track width defining portion 27A at the interface with the track width defining portion 27A. The width of the yoke portion 27B gradually increases from this interface with an increase in distance from the track width defining portion 27A, and finally becomes constant. The track width defining portion 27A is the magnetic pole portion of the top pole layer 27, and defines the recording track width. When forming the first layer 27a by RIE, the track width defining portion 27A is given an initial width of the order of 0.1 to 0.2 $\mu$m. Here, by way of example, the track width defining portion 27A initially has a width of 0.15 $\mu$m.

Next, the sidewalls of the track width defining portion 27A of the top pole layer 27 are etched by, for example, ion beam etching, so that the width of the track width defining portion 27A is reduced to 0.1 $\mu$m, for example. For example, this etching is performed so that ion beams travel at an angle of 40 to 50° with respect to a direction perpendicular to the top surface of the second layer 27b.

Next, although not shown, a photoresist mask having an opening around the track width defining portion 27A is formed. Then, as shown in FIGS. 13A and 13B, the recording gap layer 25 around the track width defining portion 27A is etched by, for example, RIE with a mixed gas of $Cl_2$ and $BCl_3$ as the etching gas, or ion beam etching, using the abovementioned photoresist mask and the top pole layer 27 as masks.

Then, the top pole layer 27, the recording gap layer 25 lying below the same, and the above-mentioned photoresist mask are used as masks to etch part of the sixth layer 10f of the bottom pole layer 10 at around the track width defining portion 27A by ion beam etching, for example. The etching depth of the sixth layer 10f is 0.17 to 0.22 µm, for example. This etching may be effected by combining an ion beam etching in which ion beams travel at an angle of 0° with respect to the direction perpendicular to the top surface of the second layer 27b with an ion beam etching in which the above-mentioned angle is 45°. To etch the sixth layer 10f by focused ion beam etching, the ion beam etching may be performed so that the above-mentioned angle falls within the range of 40° to 75°. Also, for the purpose of slightly etching the sidewalls of the sixth layer 10f or eliminating etching residuals of FeCo and the like resulting from the RIE, ion beam etching may be performed so that the above-mentioned angle falls within the range of 40° to 75°. Here, by way of example, the ion beam etching is performed so that the above-mentioned angle falls within the range of 40° to 50°. To etch the sixth layer 10f, RIE may be employed under the same conditions as those for the magnetic layer 26, instead of the ion beam etching.

Figures 13A, 13B:
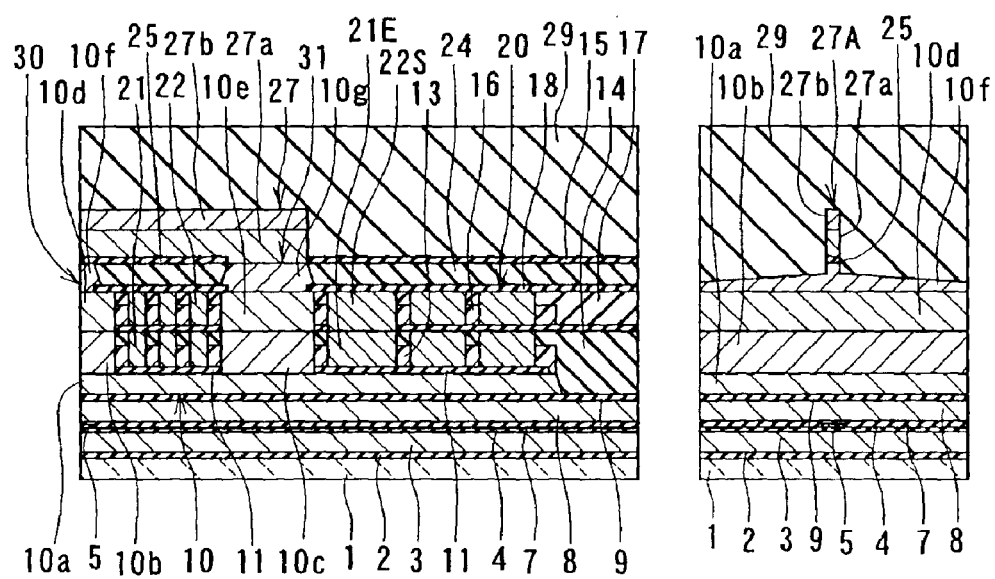
FIGS. 13A and 13B are cross sections for illustrating a step that follows FIGS. 12A and 12B.

A trim structure as shown in FIG. 13B is thereby formed. The trim structure suppresses an increase in the effective recording track width due to expansion of a magnetic flux generated during writing in a narrow track. A portion of the sixth layer 12f, the portion opposed to the track width defining portion 27A of the top pole layer 27 with the recording gap layer 25 in between, is the magnetic pole portion of the bottom pole layer 10.

The sixth layer of f yet to be etched has a thickness greater than the etching depth of the sixth layer 10f. Consequently, the trim structure can be formed while preventing the magnetic flux passing through the bottom pole layer 10 from being saturated before it reaches the air bearing surface.

Next, an overcoat layer 29 made of alumina, for example, is formed to a thickness of 20 to 30 µm so as to cover the entire top surface of the laminate. Its surface is flattened, and not-shown four electrode pads are formed thereon. Two out of the four electrode pads are connected to the thin-film coil 20. The other two are connected to the pair of electrode layers that are connected to the MR element 5. Finally, a slider including the foregoing layers is lapped to form the air bearing surface 30. This completes the thin-film magnetic head including the recording head and the reproducing head.

Now, description will be given In detail of the method of etching the magnetic layers 19 and 26 in the present embodiment. In-the present embodiment, the layers to be etched (magnetic layers 19 and 26) are etched by RIE using etching gas that contains halogen-type gas and $O_2$ or $CO_2$. Examples of halogen-type gas available include ones containing at least either of $Cl_2$ and $BCl_3$. Among examples of the etching gas are ones containing $Cl_2$ and $CO_2$, ones containing $BCl_3$, $Cl_2$ and $CO_2$, and ones containing $BCl_3$, $Cl_2$ and $O_2$.

During the etching, the layers to be etched are preferably kept at or above 50° C. in temperature for the sake of higher etching rates. If the MR element 5 is a spin-valve GMR element, the layers to be etched are preferably controlled to or below 350° C. in temperature during the etching in order to prevent deterioration in capability of an antiferromagnetic layer of the GMR element. It is particularly preferable that the layers to be etched fall within the range of 200 to 300° C. in temperature during the etching. When the RIE is performed at such high temperatures using etching masks made of Ni-containing material such as NiFe, it is possible to prevent adhesion of Ni molecules separating from the etching masks to the sidewalls of the layers to be etched.

According to the above-described etching method, it is possible to etch the magnetic layers 19 and 26 in a short time and to precisely control the profiles of the layers 10f and 27a that are made of the etched magnetic layers 19 and 26, respectively.

Etching of the sixth layer 10f of the bottom pole layer 10 for the purpose of forming the trim structure may be performed by the same method as that for etching the magnetic layers 19 and 26.

The thin-film magnetic head according to the present embodiment has the air bearing surface 30 serving as a medium facing surface that faces toward a recording medium, and the reproducing head and the recording head (induction-type electromagnetic transducer).

The reproducing head includes: the MR element 5 located near the air bearing surface 30; the bottom shield layer 3 and the top shield layer 8 for shielding the MR element 5; the bottom shield gap film 4 located between the MR element 5 and the bottom shield layer 3; and the top shield gap film 7 located between the MR element 5 and the top shield layer 8. Portions of the bottom and top shield layers 3 and 8 located on a side of the air bearing surface 30 are opposed to each other with the MR element 5 in between.

The recording head comprises: the bottom pole layer 10 and the top pole layer 27 that are magnetically coupled to each other and that includes the magnetic pole portions opposed to each other and located in regions of the pole layers on the side of the air bearing surface 30; the recording gap layer 25 interposed between the magnetic pole portion of the bottom pole layer 10 and the magnetic pole portion of the top pole layer 27; and the thin-film coil 20, at least part of which is disposed between the bottom and top pole layers 10 and 27 and insulated from the bottom and top pole layers 10 and 27. The bottom pole layer 10 and the top pole layer 27 of the present embodiment correspond to the first pole layer and the second pole layer of the invention, respectively.

The bottom pole layer 10 has the first to third layers 10a–10c. The first layer 10a is located opposite to the thin-film coil 20. The second layer 10b is located closer to the air bearing surface 30 than the thin-film coil 20 is, and connected to a surface of the first layer 10a that is closer to the recording gap layer 25. The third layer 10c is located on the first layer 10a at a position away from the air bearing surface 30. The bottom pole layer 10 further has: the fourth layer 10d and the sixth layer 10f that are laminated on the second layer lob in succession; and the fifth layer 10e and the seventh layer 10g that are laminated on the third layer 10c in succession. The third layer 10c, the fifth layer 10e, and the seventh layer 10g constitute the coupling portion 31 for establishing magnetic coupling between the bottom pole layer 10 and the top pole layer 27.

The top pole layer 27 has the first layer 27a and the second layer 27b both of which are flat. The top pole layer 27 includes the track width defining portion 27A and the yoke portion 27B. The track width defining portion 27A has one end located at the air bearing surface 30 and the other end located away from the air bearing surface 30. The yoke portion 27B is connected to the other end of the track width defining portion 27A. The track width defining portion 27A is the magnetic pole portion of the top pole layer 27, and defines the recording track width.

As shown in FIG. 14 and FIG. 15, the thin-film coil 20 according to the present embodiment has the first layer portion 21 and the second layer portion 22 each of which is made of a flat conductive layer of three turns. The first layer portion 21 and the second layer portion 22 are laminated, and electrically connected in series to each other. The first layer portion 21 and the second layer portion 22 are disposed around the third layer 10c and the fifth layer 10e that constitute the coupling portion 31. Part of the first layer portion 21 is interposed between the second layer lob and the third layer 10c. Part of the second layer portion 22 is interposed between the fourth layer 10d and the fifth layer 10e.

Now, the shape and arrangement of the coupling portion 31 and the thin-film coil 20 in the present embodiment will be described in conjunction with first to fourth examples thereof. FIG. 16 to FIG. 19 are plan views showing the first to fourth examples, respectively. In FIG. 16 to FIG. 19, the reference numeral 40 represents a conductive layer which typifies the first layer portion 21 and the second layer portion 22 of the thin-film coil 20. In each of the examples, the coupling portion 31 has an end face 32 that faces toward the air bearing surface 30 (not shown). The end face 32 includes a curved surface convex toward the air bearing surface 30. For example, the end face 32 has the shape of a part of a cylindrical surface.

In any one of the first to fourth examples, the conductive layer 40 has the first to third turns 41, 42, and 43 from the inner side. The turns 41, 42, and 43 include first to third portions 41a, 42a, and 43a, respectively, which are arranged between the end face 32 of the coupling portion 31 and the air bearing surface 30. In FIG. 16 to FIG. 19, the region designated by the reference numeral 60 is a region where the first to third portions 41a–43a are located. The inner periphery of the first portion 41a lies along the end face 32 of the coupling portion 31. Of the first to third portions 41a–43a, at least the first portion 41a has a minimum width of the conductive layer 40 at a position on a virtual line 50 that connects the end face 32 of the coupling portion 31 and the air bearing surface 30 in the shortest distance, and increases in width with distance from the virtual line 50. The minimum width of the conductive layer 40 is 0.3 to 0.5 $\mu$m, for example. The interval between adjoining turns is 0.3 $\mu$m, for example.

Figure 16:
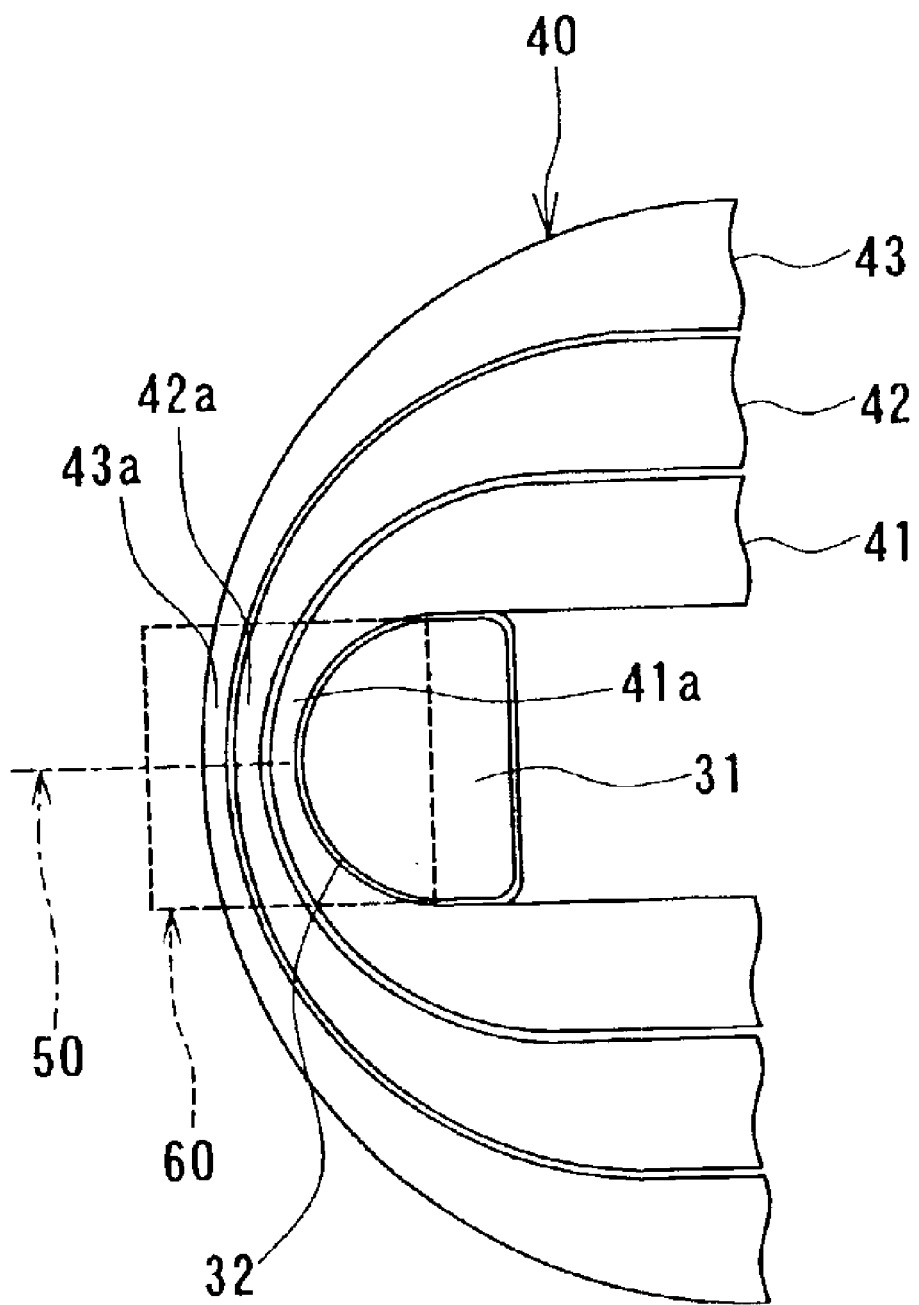
FIG. 16 is a plan view showing a first example of the shape of the thin-film coil in the first embodiment of the invention.

In the first example shown in FIG. 16, each of the first to third portions 41a–43a has a minimum width of the conductive layer 40 at the position on a virtual line 50 that connects the end face 32 of the coupling portion 31 and the air bearing surface 30 in the shortest distance, and increases in width with distance from the virtual line 50.

In the first example, the inner periphery of the first portion 41a is shaped into an arc having a first radius of curvature. The outer periphery of the first portion 41a is shaped into an arc having a second radius of curvature which is greater than the first radius of curvature. The inner periphery of the second portion 42a is shaped into an arc having a third radius of curvature which is greater than the second radius of curvature. The outer periphery of the second portion 42a is shaped into an arc having a fourth radius of curvature which is greater than the third radius of curvature. The inner periphery of the third portion 43a is shaped into an arc having a fifth radius of curvature which is greater than the fourth radius of curvature. The outer periphery of the third portion 43a is shaped into an arc having a sixth radius of curvature which is greater than the fifth radius of curvature.

For a part of each of the first to third turns 41–43 including the first to third portions 41a–43a, respectively, the inner and outer peripheries of the part are shaped into a semicircle, for example. In each of the turns 41–43, the center of the semicircle shaping the outer periphery of that part is located farther from the air bearing surface 30 than the center of the semicircle shaping the inner periphery is. Thus, those parts of the turns 41–43 increase in width with distance from the virtual line 50.

Figure 17:
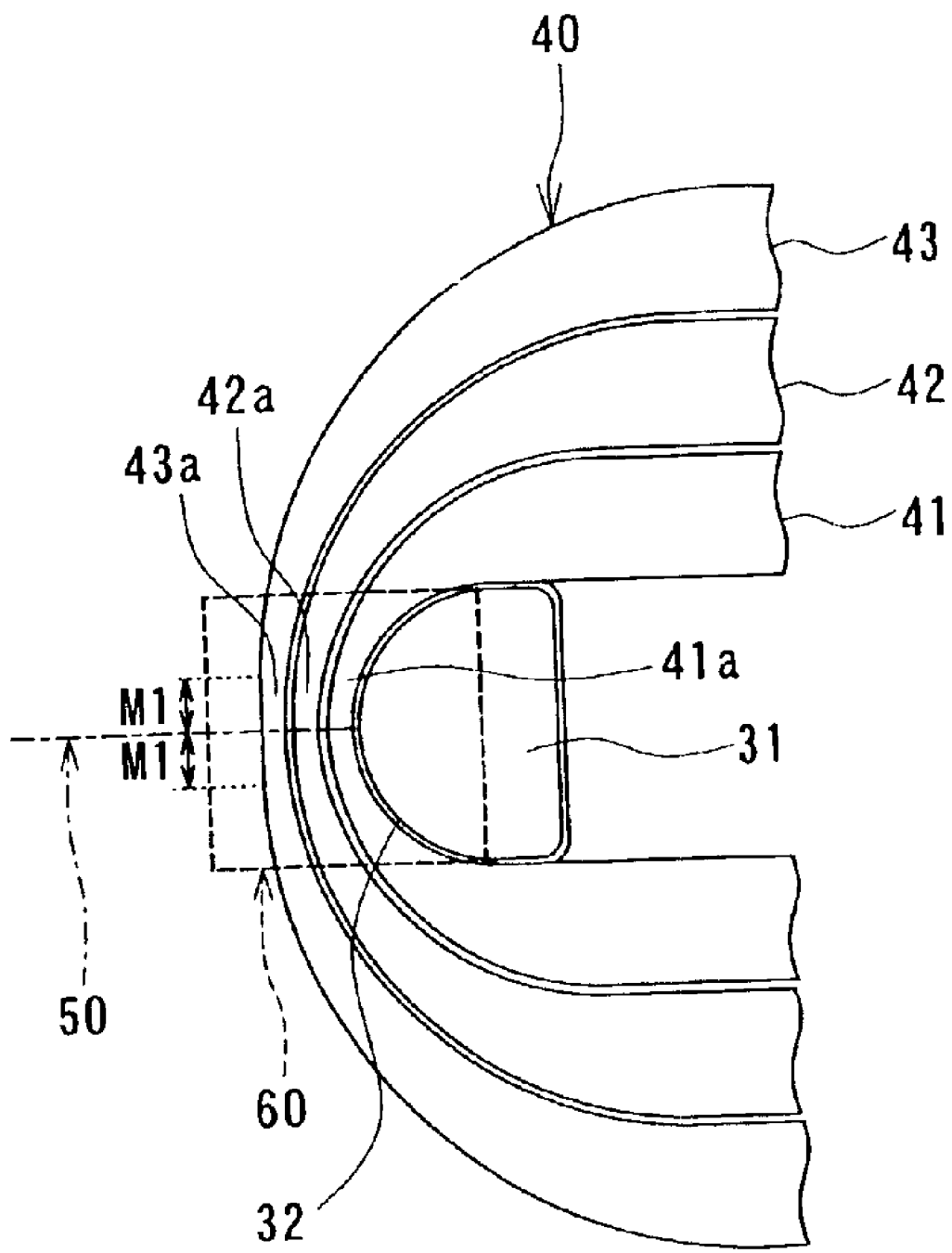
FIG. 17 is a plan view showing a second example of the shape of the thin-film coil in the first embodiment of the invention.

In the second example shown in FIG. 17, each of the first to third portions 41a–43a has a minimum width of the conductive layer 40 at a position on the virtual line 50 that connects the end face 32 of the coupling portion 31 and the air bearing surface 30 in the shortest distance, and increases in width with distance from the virtual line 50.

In the second example, the inner periphery of the first portion 41a is shaped into an arc having a first radius of curvature. The outer periphery of the first portion 41a is shaped into an arc having a second radius of curvature which is greater than the first radius of curvature. The inner periphery of the second portion 42a is shaped into an arc having a third radius of curvature which is greater than the second radius of curvature. The outer periphery of the second portion 42a is shaped into an arc having a fourth radius of curvature which is greater than the third radius of curvature. The inner periphery of a part of the third turn including the third portion 43a is shaped into an arc having a fifth radius of curvature which is greater than the fourth radius of curvature. The outer periphery of the part of the third turn includes a linear portion and two arc portions connected to respective ends of the linear portion. The linear portion is located in a predetermined region covering the position on the virtual line 50. The arc portions have a sixth radius of curvature which is greater than the fifth radius of curvature. The ends of the linear portion are located a length M1 away from the position on the virtual line 50 in opposite directions. The linear portion thus has a length of 2×M1.

In the second example, the inner and outer peripheries of part of the first turn 41 including the first portion 41a, the inner and outer peripheries of part of the second turn 42 including the second portion 42a, and the inner periphery of part of the third turn including the third portion 43a are all shaped into a semicircle, for example. In each of the first and second turns 41 and 42, the center of the semicircle shaping the outer periphery of that part is located farther from the air bearing surface 30 than the center of the semicircle shaping the inner periphery is. Thus, those parts of the first and second turns 41 and 42 increase in width with distance from the virtual line 50.

As described above, in the second example, the outer periphery of the part of the third turn 43 includes two arc portions connected to the respective ends of the linear portion. Each of these arc portions is an arc having a central angle of 90°, for example. In the part of the third turn 43, the centers of the arcs shaping the outer arc portions are located farther from the air bearing surface 30 than the center of the semicircle shaping the inner periphery is. Consequently, the part of the third turn 43 increases in width with distance from the virtual line 50.

Here, comparisons will be made between the cases where the outer periphery of part of the third turn 43 includes the linear portion and the two arc portions as described above and where the outer periphery of the part of the third turn has the shape of a semicircle. The radius of curvature of the arc portions in the former case can be made smaller than the radius of the semicircle in the latter case. As a result, in the former case, the arc portions can protrude more toward the air bearing surface 30 than the outer periphery in the latter case does. Consequently, in the former case, the width of the third turn 43 can be increased with distance from the virtual line 50 more drastically than in the latter case. This allows a reduction in the resistance of the part of the third turn 43.

Figure 18:
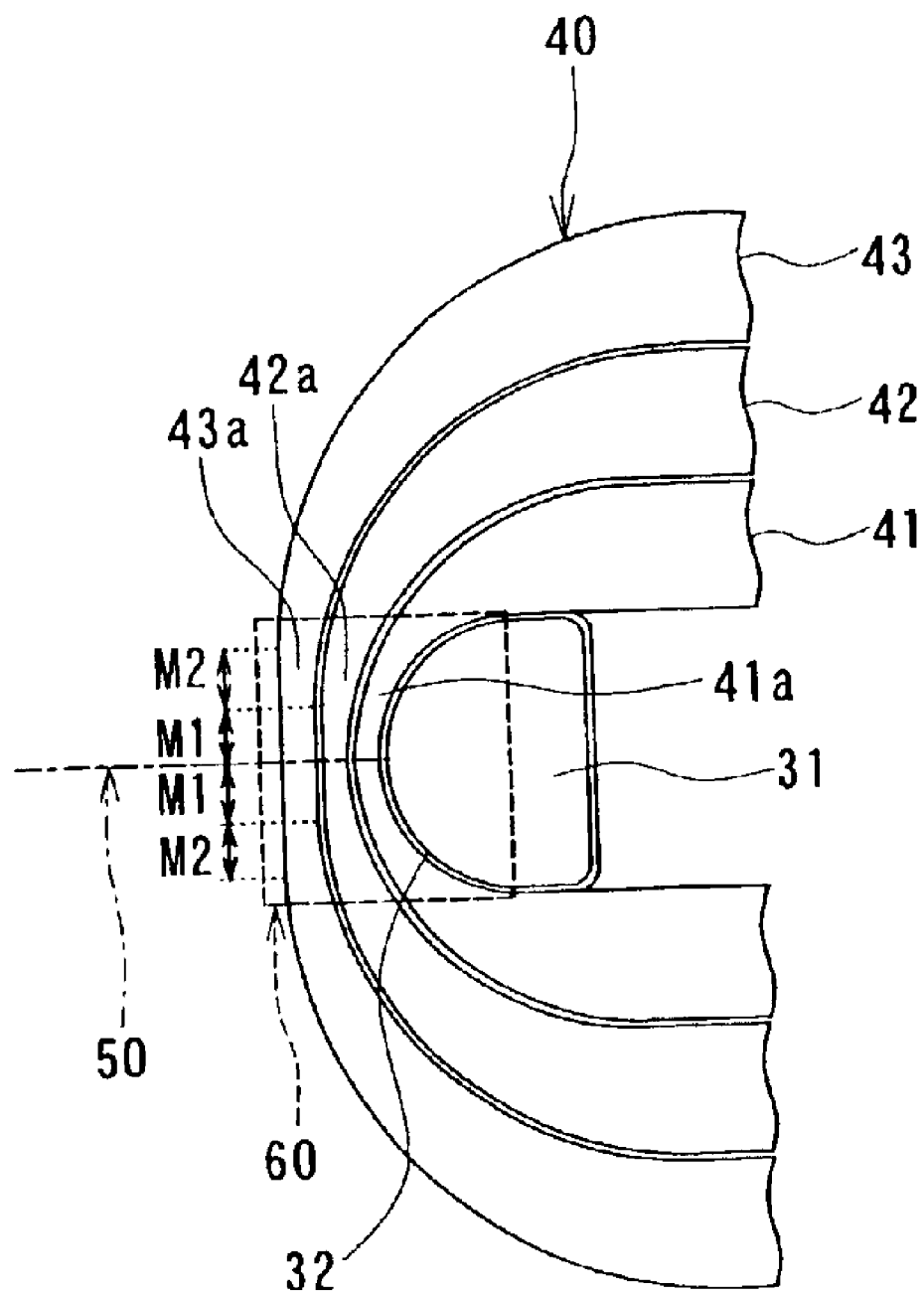
FIG. 18 is a plan view showing a third example of the shape of the thin-film coil in the first embodiment of the invention.

In the third example shown in FIG. 18, each of the first and second portions 41*a*, 42*a* has a minimum width of the conductive, layer 40 at a position on the virtual line 50 that connects the end face 32 of the coupling portion 31 and the air bearing surface 30 in the shortest distance, and increases in width with distance from the virtual line 50. The third portion 43*a* has a portion of constant width (hereinafter, referred to as a constant width portion) located in a predetermined region covering the position on the virtual line 50. The ends of the constant width portion of the third portion 43*a* are located a length M1 away from the position on the virtual line 50 in opposite directions. Thus, the constant width portion of the third portion 43*a* has a length of 2×M1. To the respective ends of the constant width portion of the third portion 43*a*, connected are variable width portions which increase in width with distance from the virtual line 50.

In the third example, the inner periphery of the first portion 41*a* is shaped into an arc having a first radius of curvature. The outer periphery of the first portion 41*a* is shaped into an arc having a second radius of curvature which is greater than the first radius of curvature. The inner periphery of the second portion 42*a* is shaped into an arc having a third radius of curvature which is greater than the second radius of curvature. The outer periphery of the second portion 42*a* includes a first linear portion and two arc portions connected to respective ends of this first linear portion. The first linear portion is located in a predetermined region covering the position on the virtual line 50. The arc portions have a fourth radius of curvature which is greater than the third radius of curvature. The ends of the first linear portion are located a length M1 away from the position on the virtual line 50 in opposite directions. The first linear portion thus has a length of 2×M1.

In the third example, the inner periphery of a part of the third turn 43 including the third portion 43*a* has a second linear portion and two arc portions connected to respective ends of the second linear portion. The second linear portion is located in a predetermined region covering the position on the virtual line 50. The arc portions have a fifth radius of curvature which is greater than the fourth radius of curvature. The length of the second linear portion is greater than or equal to that of the first linear portion. FIG. 18 shows the case where the first linear portion and the second linear portion both have a length of 2×M1. The outer periphery of the part of the third turn 43 includes a third linear portion and two arc portions connected to respective ends of this third linear portion. The third linear portion is located in a predetermined region covering the position on the virtual line 50. The arc portions have a sixth radius of curvature which is greater than the fifth radius of curvature. The third linear portion is greater than the second linear portion in length. The ends of the third linear portion are located a length M1+M2 away from the position on the virtual line 50 in opposite directions. The third linear portion thus has a length of 2×(M1+M2). The lengths M1 and M2 may be equal or different.

In the third example, the inner and outer peripheries of part of the first turn 41 including the first portion 41*a*, and the inner periphery of part of the second turn 42 including the second portion 42*a* are all shaped into a semicircle, for example. In the first turn 41, the center of the semicircle shaping the outer periphery of that part is located farther from the air bearing surface 30 than the center of the semicircle shaping the inner periphery is. Thus, the width of the part of the first turn 41 increases with distance from the virtual line 50.

As described above, in the third example, the outer periphery of the part of the second turn 42, and the inner and outer peripheries of part of the third turn 43 include the two arc portions each. Any of these arc portions is an arc having a central angle of 90°, for example. In the part of the second turn 42, the centers of the arcs shaping the outer arc portions are located farther from the air bearing surface 30 than the center of the semicircle shaping the inner periphery is. In the part of the third turn 43, the centers of the arcs shaping the outer arc portions are located farther from the air bearing surface 30 than the centers of the arcs shaping the inner arc portions are. Thus, the parts of the second and third turns 42, 43 increase in width with distance from the virtual line 50.

In the third example, the effect resulting from the fact that the outer periphery of the second portion 42*a* includes the first linear portion is the same as described in conjunction with the part of the third turn 43 in the second example. In the third example, the third linear portion of the outer periphery of the part of the third turn 43 is made longer than the second linear portion of the inner periphery thereof. This produces the same effect as the one resulting from the fact that the outer periphery of the second portion 42*a* includes the first linear portion.

Figure 19:
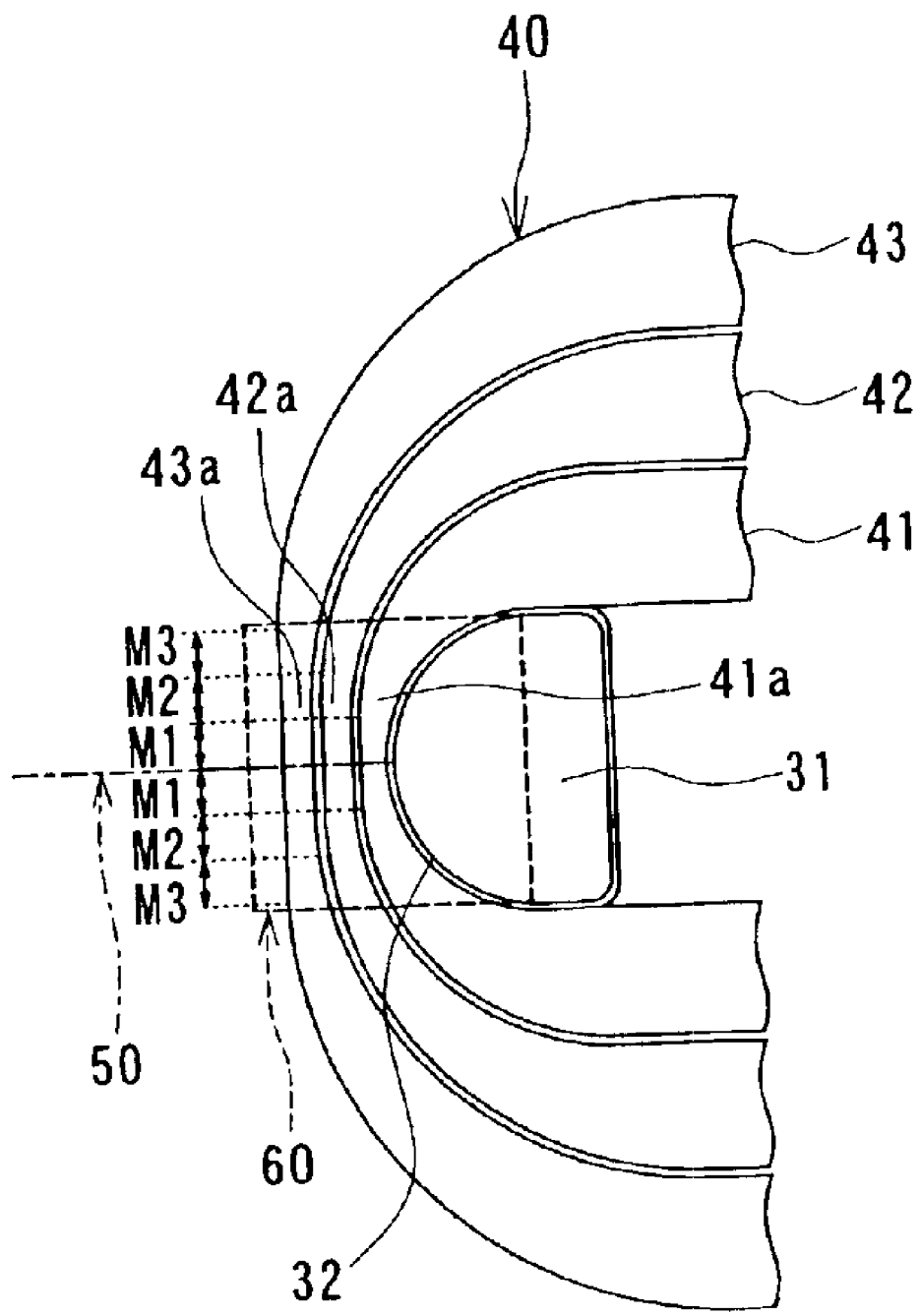
FIG. 19 is a plan view showing a fourth example of the shape of the thin-film coil in the first embodiment of the invention.

In the fourth example shown in FIG. 19, the first portion 41*a* has a minimum width of the conductive layer 40 at a position on the virtual line 50 that connects the end face 32 of the coupling portion 31 and the air bearing surface 30 in the shortest distance, and increases in width with distance from the virtual line 50. Each of the second and third portions 42*a*. 43*a* includes a constant width portion. The ends of the constant width portion of the second portion 42*a* are located a length M1 away from the position on the virtual line 50 in opposite directions. Thus, the constant width portion of the second portion 42*a* has a length of 2×M1. Variable width portions are connected to the respective ends of the constant width portion of the second portion 42*a*. The ends of the constant width portion of the third portion 43*a* are located a length M1+M2 away from the position on the virtual line 50 in opposite directions. Thus, the constant width portion of the third portion 43*a* has a length of 2×M1+M2). Variable width portions are connected to the respective ends of the constant width portion of the third portion 43*a*.

In the fourth example, the inner periphery of the first portion 41*a* is shaped into an arc having a first radius of curvature. The outer periphery of the first portion 41*a* includes a first linear portion and two arc portions connected to respective ends of the first linear portion. The first linear portion is located in a predetermined region covering the position on the virtual line 50. The arc portions have a second radius of curvature which is greater than the first radius of curvature. The ends of the first linear portion are located a length M1 away from the position on the virtual line 50 in opposite directions. The first linear portion thus has a length of 2×M1. The inner periphery of the second portion 42*a* has a second linear portion and two arc portions connected to respective ends of the second linear portion. The second linear portion is located in a predetermined region covering the position on the virtual line 50. The arc portions have a third radius of curvature which is greater than the second radius of curvature. The length of the second linear portion is greater than or equal to that of the first linear portion. FIG. 19 shows the case where the first linear portion and the second linear portion both have a length of 2×M1.

The outer periphery of the second portion 42a includes a third linear portion and two arc portions connected to respective ends of the third linear portion. The third linear portion is located in a predetermined region covering the position on the virtual line 50. The arc portions have a fourth radius of curvature which is greater than the third radius of curvature. The ends of the third linear portion are located a length M1+M2 away from the position on the virtual line 50 in opposite directions. The third linear portion thus has a length of 2×(M1+M2).

In the fourth example, the inner periphery of part of the third turn 43 including the third portion 43a has a fourth linear portion and two arc portions connected to respective ends of the fourth linear portion. The fourth linear portion is located in a predetermined region covering the position on the virtual line 50. The arc portions have a fifth radius of curvature which is greater than the fourth radius of curvature. The length of the fourth linear portion is greater than or equal to that of the third linear portion. FIG. 19 shows the case where the third linear portion and the fourth linear portion both have a length of 2×(M1+M2). The outer periphery of the part of the third turn 43 includes a fifth linear portion and two arc portions connected to respective ends of the fifth linear portion. The fifth linear portion is located in a predetermined region covering the position on the virtual line 50. The arc portions have a sixth radius of curvature which is greater than the fifth radius of curvature. The fifth linear portion is greater than the fourth linear portion in length. The ends of the fifth linear portion are located a length M1+M2+M3 away from the position on the virtual line 50 in opposite directions. The fifth linear portion thus has a length of 2×(M1+M2+M3). The lengths M1, M2 and M3 may be equal or different.

In the fourth example, the inner periphery of part of the first turn 41 including the first portion 41a is shaped into a semicircle, for example. As described above, in the fourth example, the outer periphery of the part of the first turn 41, the inner and outer peripheries of part of the second turn 42, and the inner and outer peripheries of part of the third turn 43 each include two arc portions. Any of these arc portions is an arc having a central angle of 90°, for example. In the part of the first turn 41, the centers of the arcs shaping the outer arc portions are located farther from the air bearing surface 30 than the center of the semicircle shaping the inner periphery is. In the part of each of the second turn 42 and the third turn 43, the centers of the arcs shaping the outer arc portions are located farther from the air bearing surface 30 than the centers of the arcs shaping the inner arc portions are. Thus, the parts of the first to third turns 41–43 increase in width with distance from the virtual line 50.

In the fourth example, the effect resulting from the fact that the outer periphery of the first portion 41a includes the first linear portion is the same as described in conjunction with the part of the third turn 43 in the second example. In the fourth example, the effects resulting from the facts that the third linear portion is longer than the second linear portion, and that the fifth linear portion is longer than the fourth linear portion are all the same as described in conjunction with the part of the third turn 43 in the third example.

Next, with reference to FIG. 20 to FIG. 27, the shape of the top surface of the coupling portion 31 will be described in conjunction with eight examples. FIG. 20 to FIG. 27 are plan views of the coupling portion 31. Note that any section of the coupling portion 31 taken in parallel with the top surface has the same shape as that of the top surface.

Figure 20:
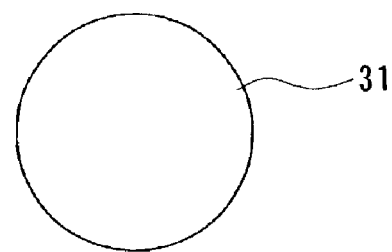
FIG. 20 is a plan view showing a first example of the shape of the top surface of the coupling portion in the first embodiment of the invention.

In the first example shown in FIG. 20, the top surface of the coupling portion 31 is circular in shape. In the second example shown in FIG. 21, the top surface of the coupling portion 31 has the shape of a semicircle. In this example, the arc of the semicircle faces toward the air bearing surface 30.

Figure 22:
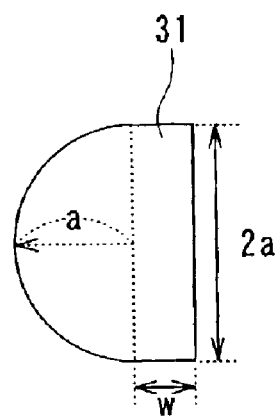
FIG. 22 is a plan view showing a third example of the shape of the top surface of the coupling portion in the first embodiment of the invention.

In the third example shown in FIG. 22, the top surface of the coupling portion 31 has the shape of a combination of a semicircle and a rectangle. The semicircle has a radius of a. The rectangle has long sides of 2a in length and short sides of W in length. The chord of the semicircle and one of the long sides of the rectangle are in contact with each other. In this example, the arc of the semicircle faces toward the air bearing surface 30.

Figure 23:
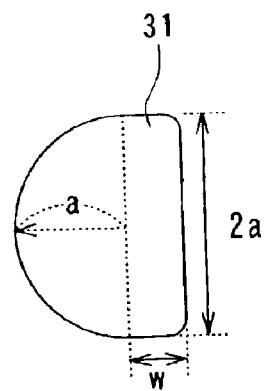
FIG. 23 is a plan view showing a fourth example of the shape of the top surface of the coupling portion in the first embodiment of the invention.

In the fourth example shown in FIG. 23, the top surface of the coupling portion 31 has the shape shown in FIG. 22 with the two corners rounded.

Figure 24:
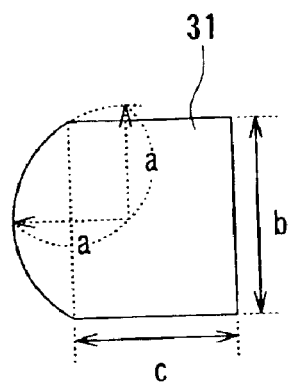
FIG. 24 is a plan view showing a fifth example of the shape of the top surface of the coupling portion in the first embodiment of the invention.

In the fifth example shown in FIG. 24, the top surface of the coupling portion 31 has the shape of a combination of a segment and a rectangle. The segment has a chord of b in length. The rectangle has two parallel sides of b in length and the other two parallel sides of c in length. The chord of the segment and one of the length-b sides of the rectangle are in contact with each other. The arc of the segment is a part of a circle having a radius of a with a central angle of less than 180°. In this example, the arc of the segment faces toward the air bearing surface 130.

Figure 25:
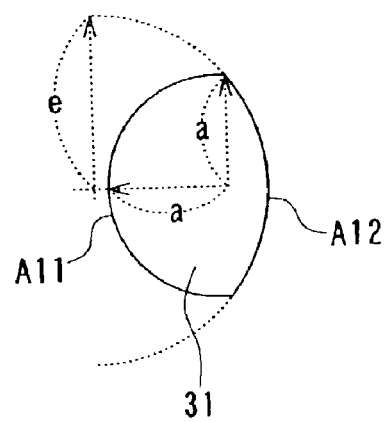
FIG. 25 is a plan view showing a sixth example of the shape of the top surface of the coupling portion in the first embodiment of the invention.

In the sixth example shown in FIG. 25, the top surface of the coupling portion 31 is shaped as if enclosed by arcs A11 and A12. The arc A11 has a radius of a and a central angle of 180°. The arc A12 has a radius of e. The radius e of the arc A12 is greater than the radius a of the arc A11. The central angle of the arc A12 is smaller than 1800. The arc A11 and the arc A12 are placed convex in opposite directions. In this example, the arc A11 faces toward the air bearing surface 30.

Figure 26:
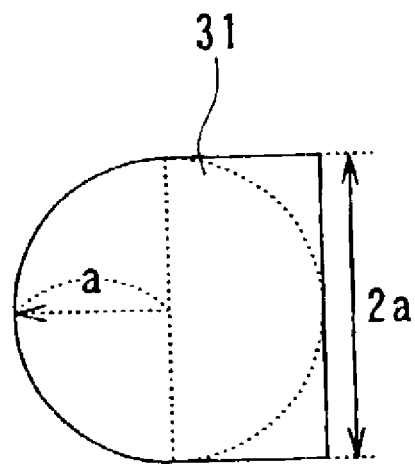
FIG. 26 is a plan view showing a seventh example of the shape of the top surface of the coupling portion in the first embodiment of the invention.

In the seventh example shown in FIG. 26, the top surface of the coupling portion 31 has the shape of a combination of a semicircle and a rectangle. The semicircle has a radius of a. The rectangle has long sides of 2a in length and short sides of a in length. The chord of the semicircle and one of the long sides of the rectangle are in contact with each other. In this example, the arc of the semicircle faces toward the air bearing surface 30.

Figure 27:
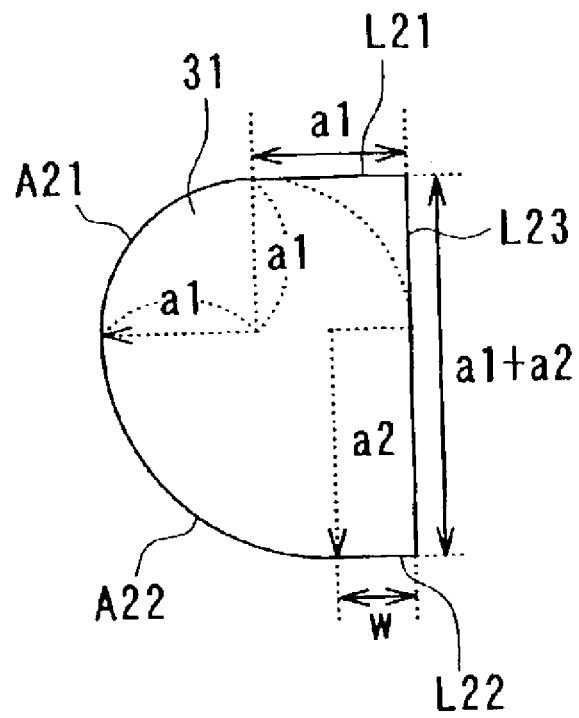
FIG. 27 is a plan view showing an eighth example of the shape of the top surface of the coupling portion in the first embodiment of the invention.

In the eighth example shown in FIG. 27, the shape of the top surface of the coupling portion 31 contains arcs A21 and A22. The arc A21 has a radius of a1 and a central angle of 90°. The arc A22 has a radius of a2 and a central angle of 90°. An end of the arc A21 and an end of the arc A22 are connected so that the arcs A21 and A22 form a smooth curve portion. The radius a2 is greater than the radius a1. The curve portion formed by the arcs A21 and A22 faces toward the air bearing surface 30. In the eighth example, the shape of the top surface of the coupling portion 31 also contains a linear portion L21 of a1 in length, a linear portion L22 of W in length, and a linear portion L23 of a1+a2 in length. The linear portion L21 is connected to the other end of the arc A21 at one end, and extends in a direction perpendicular to the air bearing surface 30. The linear portion L22 is connected to the other end of the arc A22 at one end, and extends in the direction perpendicular to the air bearing surface 30. The linear portion L23 connects the other end of the linear portion L21 and the other end of the linear portion L22. In this eighth example, the end face 32 of the coupling portion 31 is shaped as if portions of two cylindrical surfaces having different radii of curvature are connected to each other at a position on the virtual line 50 which connects the end face 32 and the air bearing surface 30 in the shortest distance.

Note that FIG. 14 and FIG. 15 show the case where the top surface of the coupling portion 31 is given the shape shown in FIG. 20, i.e., circular. Nevertheless, the shape of the top surface of the coupling portion 31 is not limited thereto. For example, the top surface of the coupling portion 31 may have any of the shapes shown in FIG. 21 to FIG. 27.

Figure 28:
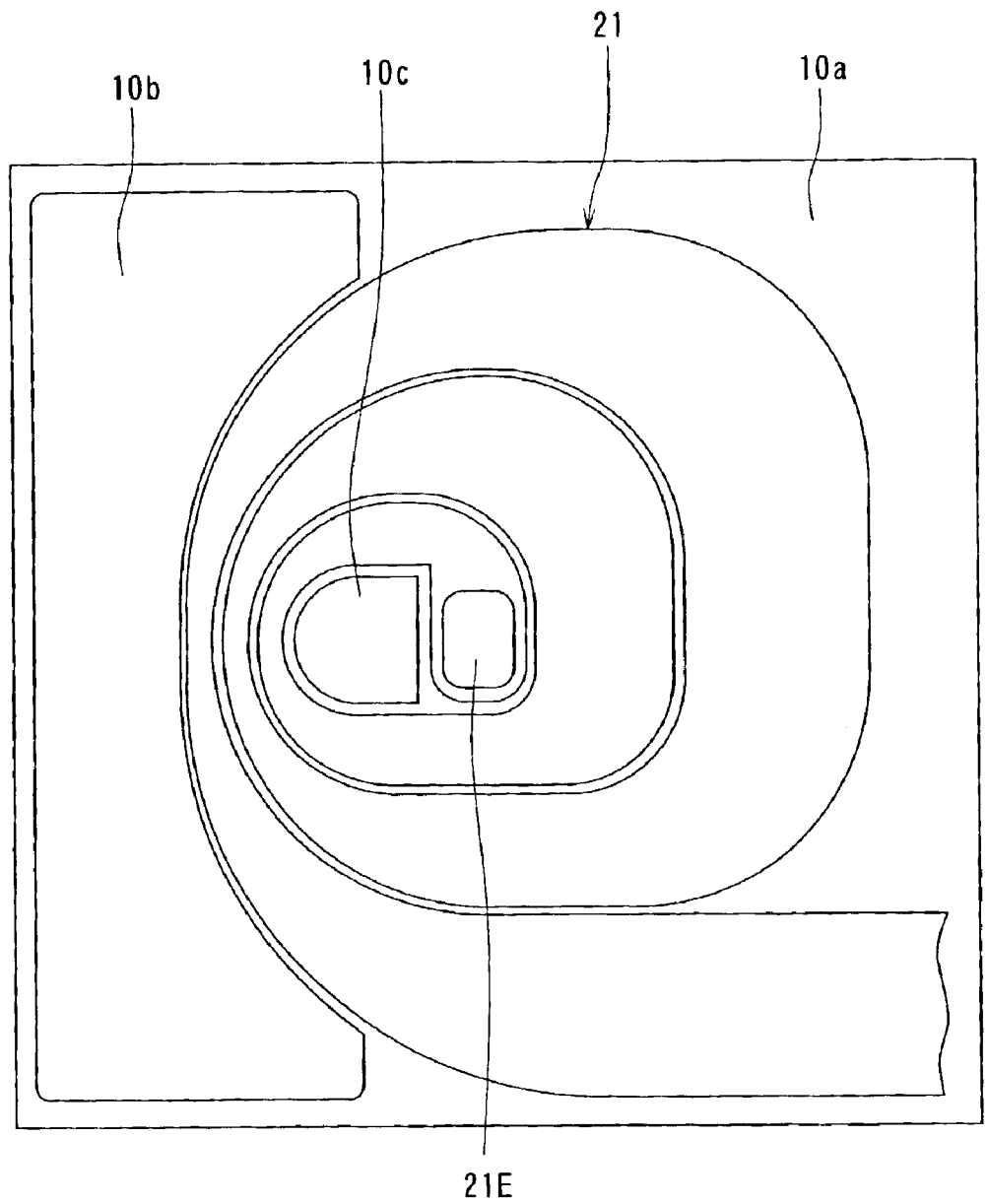
FIG. 28 is a plan view showing the shape of a coupling portion and a thin-film coil of a modified example of the first embodiment of the invention.
Figure 29:
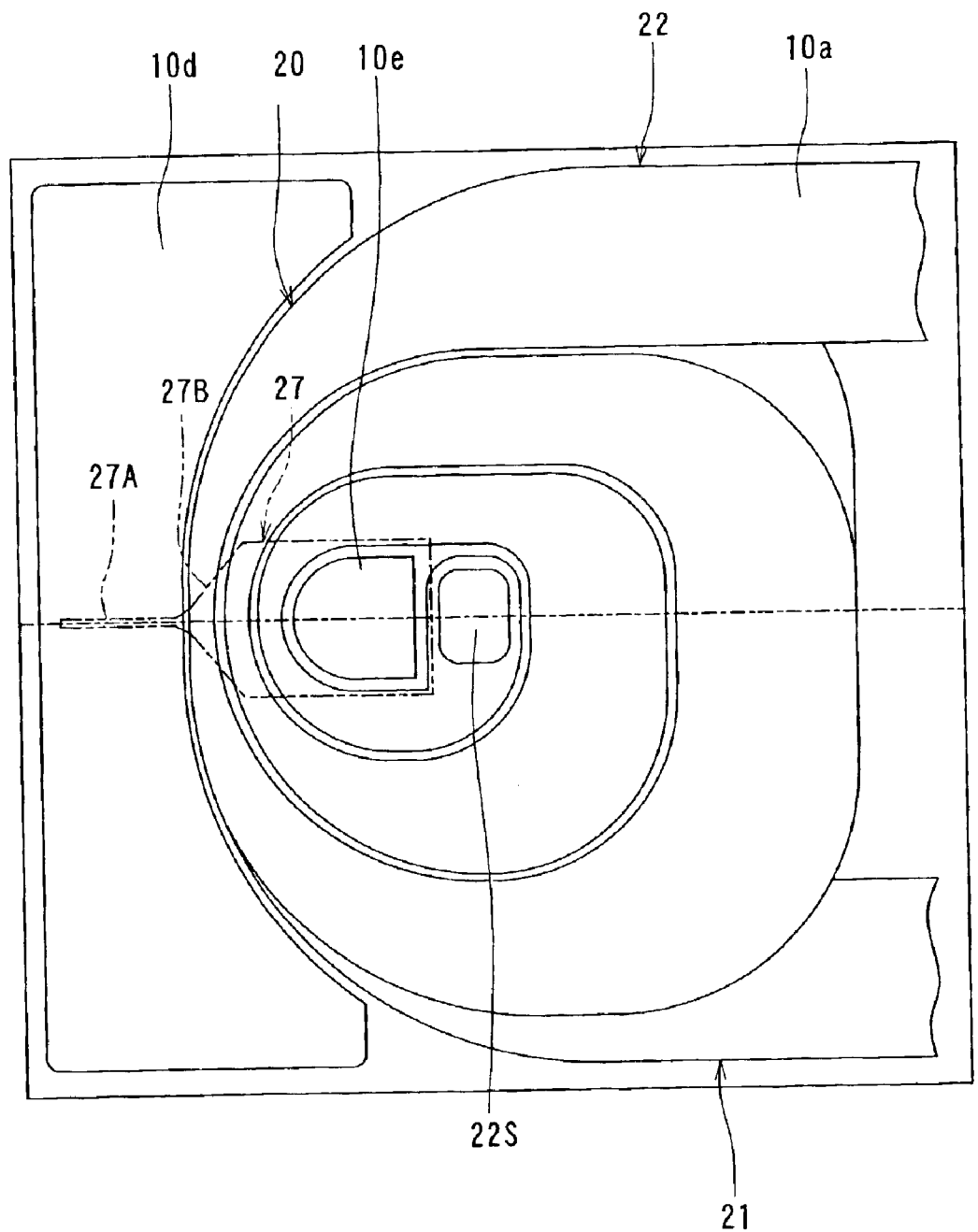
FIG. 29 is a plan view showing the shape of the coupling portion and the thin-film coil of the modified example of the first embodiment of the invention.

FIG. 28 and FIG. 29 show the case where the top surface of the coupling portion 31 is given the shape shown in FIG. 26. Like FIG. 14, FIG. 28 is a plan view showing the first layer portion 21. Like FIG. 15, FIG. 29 is a plan view showing the second layer portion 22.

As described above, in the thin-film magnetic head according to the present embodiment, the thin-film coil 20 has the first layer portion 21 and the second layer portion 22 each of which is made of the flat conductive layer 40 of three turns. In the present embodiment, the yoke length depends on three times the minimum width of each of the turns 41–43 of the conductive layer 40, irrespective of the total number of turns of the thin-film coil 20. The minimum width of each of the turns 41–43 is 0.3 to 0.5 μm, for example.

By the way, while a reduction in the number of turns per each single layer of the thin-film coil can reduce the yoke length, it can deteriorate the performance of the thin-film coil. On the other hand, when the number of turns per each single layer of the thin-film coil is increased without much increase in yoke length, the width of each turn becomes smaller and this causes an increase in the resistance of the thin-film coil.

In the present embodiment, the first layer portion 21 and the second layer portion 22 of the thin-film coil 20 are of three turns each. This makes it possible to reduce the yoke length while suppressing both a deterioration in the performance of the thin-film coil 20 and an increase in the resistance of the thin-film coil 20. In the present embodiment, two flat conductive layers 40 of three turns are laminated and connected in series to constitute the thin-film coil 20. As compared to the case where the thin-film coil is made up of a single conductive layer 40, the number of turns of the thin-film coil 20 can be doubled to improve the performance of the thin-film coil 20 without changing the yoke length. Consequently, according to the present embodiment, it is possible to reduce the resistance of the thin-film coil 20 while reducing the magnetic path length. According to the present embodiment, it is therefore possible to achieve a thin-film magnetic head which is small in magnetic path length and thus is excellent in recording characteristics at high frequency bands, and has the thin-film coil 20 of small resistance.

In the case where the end face of the coupling portion closer to the air bearing surface is a flat surface which is parallel to the air bearing surface and where the conductive layer of the thin-film coil has a constant width over the portion lying between the coupling portion and the air bearing surface, then a reduction in yoke length would inevitably require the portion lying between the coupling portion and the air bearing surface to be reduced in width. This would increase the total resistance of the thin-film coil.

In contrast, in the thin-film magnetic head according to the present embodiment, the coupling portion 31 has the end face 32 that faces toward the air bearing surface 30, and the end face 32 includes a curved surface convex toward the air bearing surface 30. The conductive layer 40 (the first layer portion 21 and the second layer portion 22) of the thin-film coil 20 has the first to third turns 41, 42, 43 from the inner side. The turns 41, 42, and 43 include the first to third portions 41a, 42a, and 43a, respectively, which lie between the end face 32 of the coupling portion 31 and the air bearing surface 30. Of the first to third portions 41a–43a, at least the first portion 41a has a minimum width of the conductive layer 40 at the position on the virtual line 50 that connects the end face 32 of the coupling portion 31 and the air bearing surface 30 in the shortest distance, and increases in width with distance from the virtual line 50. Consequently, according to the present embodiment, it is possible to reduce the resistance of the thin-film coil 20 while reducing the yoke length, i.e., the magnetic path length. According to the present embodiment, it is thus possible to achieve a thin-film magnetic head which has excellent recording characteristics at high frequency bands and has the thin-film coil 20 of smaller resistance, also because of the shape of the end face 32 of the coupling portion 31 and the shape of the conductive layer 40 of the thin-film coil 20.

According to the present embodiment, since the resistance of the thin-film coil 20 can be reduced, it is possible to prevent the magnetic pole portions from protruding toward the recording medium due to the heat caused by the thin-film coil 20.

According to the present embodiment, the area occupied by the thin-film coil 20 can be small. Thus, the present embodiment allows miniaturization of the thin-film magnetic head.

Figure 21:
FIG. 21 is a plan view showing a second example of the shape of the top surface of the coupling portion in the first embodiment of the invention.

The top surface of the coupling portion 31 shown in FIG. 22 to FIG. 26 has the shape of a semicircle or segment, with another figure such as a rectangle connected to the chord thereof. When the top surface of the coupling portion 31 has such a shape, the width of the coupling portion 31 (the vertical length of the coupling portion 31 in FIG. 21 to FIG. 26) can be made smaller without reducing the area of the top surface of the coupling portion 31, as compared with the case where the coupling portion 31 has a semicircular top surface as shown in FIG. 21. Consequently, the portions 41a–43a of the conductive layer 40 lying between the end face 32 of the coupling portion 31 and the air bearing surface 30 can be reduced in length to make the resistance of the thin-film coil 20 even smaller.

[Second Embodiment]

Now, a thin-film magnetic head and a method of manufacturing the same according to a second embodiment of the invention will be described with reference to FIGS. 30A to 45A, FIGS. 30B to 45B, and FIGS. 46 to 50. FIGS. 30A to 45A are cross sections each orthogonal to the air bearing surface and the top surface of the substrate. FIGS. 30B to 45B are cross sections of the magnetic pole portion each parallel to the air bearing surface. FIGS. 46 to 50 are plan views for illustrating the method of forming a thin-film coil of the present embodiment.

The manufacturing method of the present embodiment is the same as that of the first embodiment up to the step of forming the first layer 10a of the bottom pole layer 10. The bottom pole layer 10 includes the first layer 10a, and second to seventh layers 10b–10g to be described later.

Then, in the present embodiment, as shown in FIGS. 30A and 30B, an insulating film 11 made of alumina, for example, is formed on the first layer 10a to a thickness of 0.2 μm, for example. The insulating film 11 is then selectively removed at portions corresponding to the regions where to form the second layer 10b and the third layer 10c.

Next, although not shown, an electrode film of a conductive material is formed to a thickness of 50 to 80 nm by sputtering, for example, so as to cover the first layer 10a and the insulating film 11. This electrode film functions as an electrode and a seed layer for plating. Then, although not shown, a frame to be used for forming a first coil 71 by frame plating is formed on the electrode film by photolithography.

Figure 46:
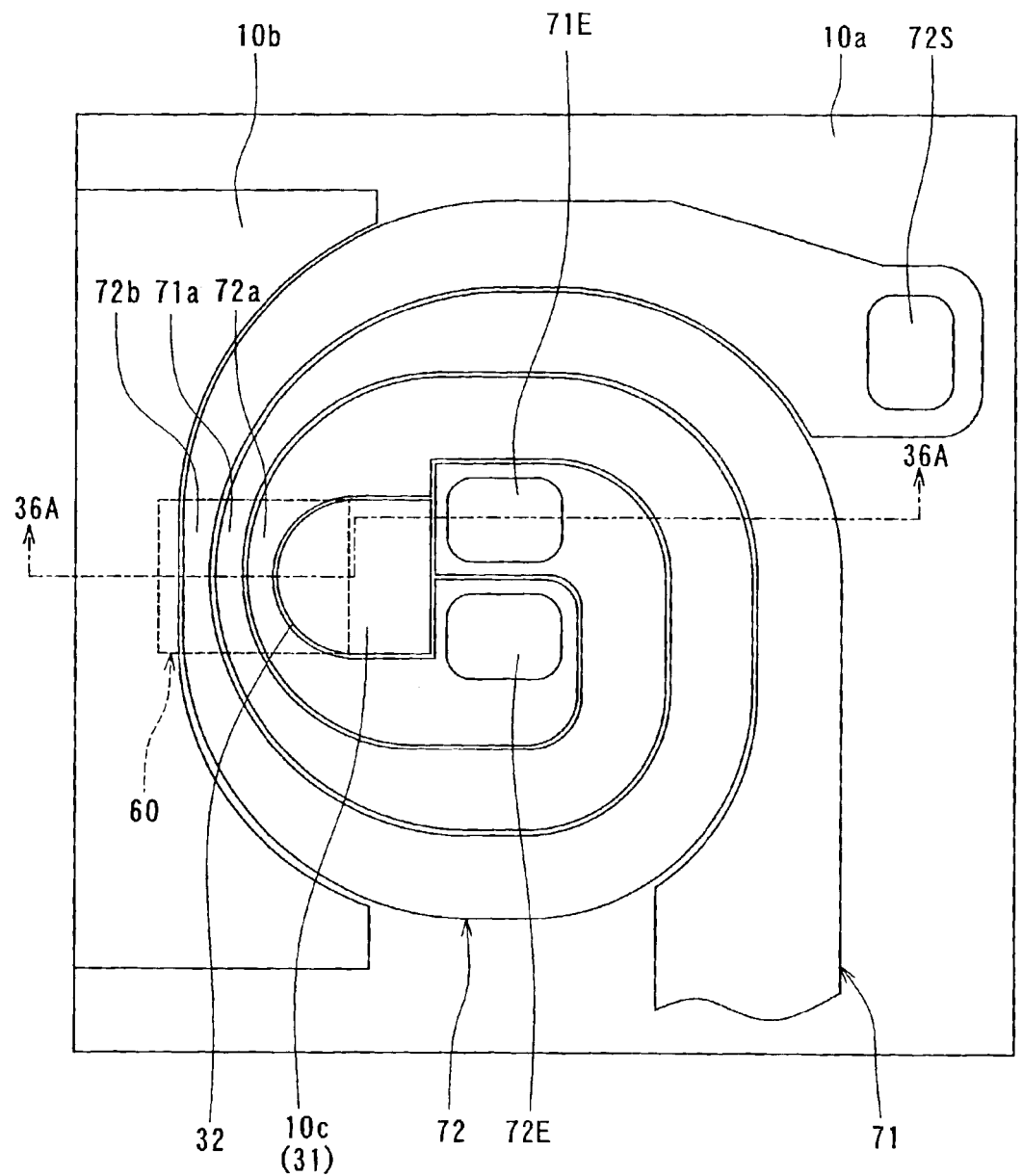
FIG. 46 is a plan view for illustrating a method of forming a thin-film coil of the second embodiment of the invention.

Next, electroplating is performed using the electrode film, whereby the first coil 71 made of Cu, for example, is formed to a thickness of 1.5 to 2.0 μm. for example. The first coil 71 is located in a region where the insulating film 11 is formed. As shown in FIG. 46, the first coil 71 is a flat conductive layer of a single turn. The first coil 71 is wound counterclockwise from the outer end to the inner end, for example. The first coil 71 has a connecting portion 71E near its inner end, which is connected to a fourth coil 74 to be formed later. The outer end of the first coil 71 is connected to a single electrode pad to be described later. Next, the frame is removed, and then a portion of the electrode film other than the portion underlying the first coil 71 is removed by ion beam etching, for example.

Next, although not shown, a frame to be used for forming the second layer 10b and the third layer 10c by frame plating is formed on the first layer 10a and the insulating film 11 by photolithography.

Next, as shown in FIGS. 31A and 31B, electroplating is performed to form the second layer 10b and the third layer 10c, each made of a magnetic material, on the first layer 10a to a thickness of, for example, 2.0 to 2.5 $\mu$m each. The material of the second layer lob and the third layer 10c may be the same as in the first embodiment. In the present embodiment, as in the first embodiment, no special electrode film is used when the second layer lob and the third layer 10c are formed by plating, but the unpatterned first layer 10a is used as an electrode and a seed layer for plating.

The second layer 10b is disposed near the region where to form the air bearing surface described later. The third layer 10c is a portion for connecting the first layer 10a and a top pole layer to be described later to each other, and is disposed near the center of the first coil 71.

Next, a photoresist layer 12 is formed to cover the first coil 71, the second layer 10b and the third layer 10c. The first layer 10a is selectively etched by, for example, ion beam etching, by using the photoresist layer 12 as a mask. The first layer 10a is thereby patterned.

Next, as shown in FIGS. 32A and 32B, after the photoresist layer 12 is removed, an insulating layer 81 made of photoresist, for example, is formed in a region where to form a second coil 72 to be described later. Then, an insulating layer 82 made of alumina, for example, is formed to a thickness of 3 to 4 $\mu$m so as to cover the entire top surface of the laminate.

Next, as shown in FIGS. 33A and 33B, the insulating layer 82 is polished by, for example, CMP, so that the second layer 10b and the third layer 10c are exposed and the top surfaces of the second layer 10b, the third layer 10c, and the insulating layers 81 and 82 are flattened.

Then, as shown in FIGS. 34A and 34B, after removing the insulating layer 81, an intercoil insulating film 83 made of alumina, for example, is formed to a thickness of 0.1 to 0.2 $\mu$m by CVD, for example, so as to cover the entire top surface of the laminate. The insulating film 83 may be a film formed by CVD, in which $H_2O$, $N_2$, $N_2O$, or $H_2O_2$ as a material for use in thin film formation and $Al(CH_3)$, or $AlC_3$ as a material for use in thin film formation are ejected alternately and intermittently under reduced pressure at temperatures of 100° C. or higher, for example. According to this forming method, a plurality of thin alumina films are laminated into the insulating film 83 of desired thickness.

Next, as shown in FIGS. 35A and 35B, a first conductive film of Ti or Ta is formed by, for example, sputtering, to a thickness of 10 to 20 nm so as to cover the entire top surface of the laminate. On the first conductive film, a second conductive film made of Cu, for example, is formed by sputtering to a thickness of 50 nm, for example. On the second conductive film, a third conductive film made of Cu, for example, is formed by CVD to a thickness of 50 nm, for example. The third conductive film is not intended to fill an entire groove in which the second coil 72 is to lie, but formed to cover the groove by making use of the excellent step coverage of CVD. The three conductive films mentioned above will be referred to collectively as an electrode film 84. The electrode film 84 functions as an electrode and a seed layer for plating. On the electrode film 84, a conductive layer 85 made of Cu, for example, is formed by plating to a thickness of 3 to 4 $\mu$m, for example.

Next, as shown in FIGS. 36A and 36B, the conductive layer 85 is polished by, for example, CMP so that the second layer 10b, the third layer 10c, and the first coil 71 are exposed. Consequently, the conductive layer 85 remaining in the groove makes the second coil 72. The foregoing polishing is performed so that the first coil 71 and the second coil 72 have a thickness of 1.0 to 1.5 $\mu$m, for example.

As shown in FIG. 46, the second coil 72 is a flat conductive layer of two turns. The second coil 72 is wound counterclockwise from the outer end to the inner end, for example. The second coil 72 has a connecting portion 72S near its outer end, and a connecting portion 72E near its inner end. The connecting portion 72S is connected to a fourth coil 74 to be formed later. The connecting portion 72E is connected to a third coil 73 to be formed later. FIG. 36A shows the section taken along the line 36A–36A in FIG. 46.

Next, as shown in FIGS. 37A and 37B, an insulating film 86 made of alumina, for example, is formed to cover the entire top surface of the laminate to a thickness of 0.2 $\mu$m, for example. The insulating film 86 is selectively removed at portions corresponding to the regions where to dispose the fourth layer 10d and the fifth layer 10e.

Next, the fourth layer 10d is formed on the second layer 10b, and the fifth layer 10e on the third layer 10c. The material, thickness, and forming method of the fourth layer 10d and the fifth layer 10e are the same as those of the second layer lob and the third layer 10c.

Next, an insulating film 87 made of alumina, for example, is formed to cover the entire top surface of the laminate to a thickness of 0.2 $\mu$m, for example.

Figure 47:
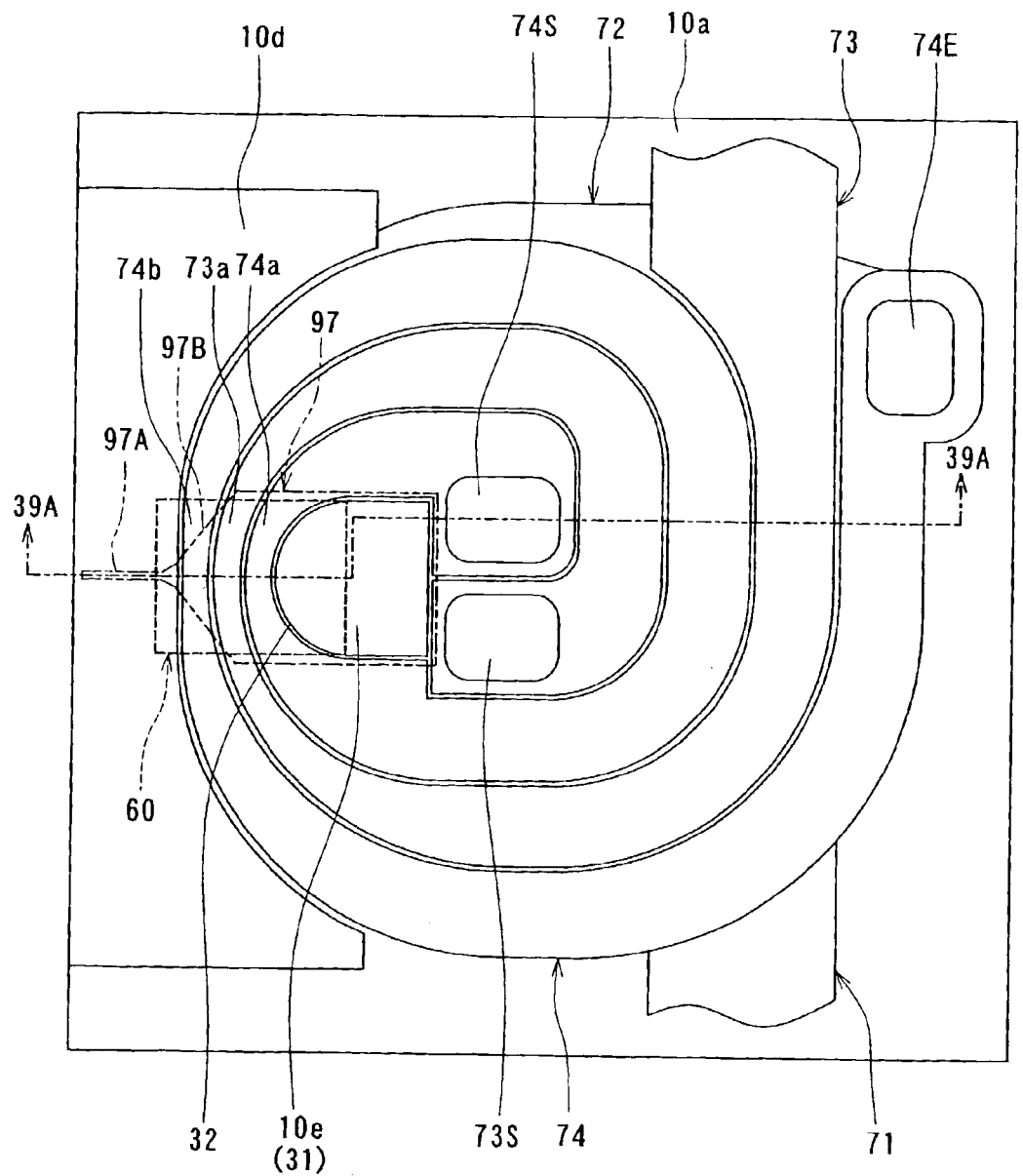
FIG. 47 is a plan view for illustrating the method of forming the thin-film coil of the second embodiment of the invention.

Next, as shown in FIGS. 38A and 38B, the third coil 73 is formed on the insulating film 87. The material, thickness, and forming method of the third coil 73 are the same as those of the first coil 71. As shown in FIG. 47, the third coil 73 is a flat conductive layer of a single turn. The third coil 73 is wound clockwise from the outer end to the inner end, for example. The third coil 73 has a connecting portion 73S near its inner end, which is connected to the connecting portion 72E of the second coil 72. The outer end of the third coil 73 is connected to a single electrode pad to be described later.

Next, the fourth coil 74 is formed as shown in FIGS. 39A and 39B. The fourth coil 74 is formed by the following steps. Initially, an insulating layer (not shown) made of a photoresist, for example, is formed on the laminate shown in FIGS. 38A and 38B at a position where to dispose the fourth coil 74. Then, an insulating layer 88 made of alumina, for example, is formed to a thickness of 3 to 4 $\mu$m so as to cover the entire top surface of the laminate. The insulating layer 88 is polished by, for example, CMP so that the fourth layer 10d and the fifth layer 10e are exposed and the top surfaces of the fourth layer 10b, the fifth layer 10e, and the insulating layer 88 are flattened. Next, the insulating layer formed in the position where to dispose the fourth coil 74 is removed. Then, an intercoil insulating film 89 made of alumina, for example, is formed to a thickness of 0.1 to 0.2 $\mu$m by CVD, for example, so as to cover the entire top surface of the laminate. The method for forming the intercoil insulating film 89 is the same as that for the insulating film 83. The insulating films 86, 87, and 89 are selectively removed at portions lying on the connecting portions 71E, 72S, and 72E, thereby forming three contact holes. An electrode film 90 is formed to cover the entire top surface of the laminate. The material, thickness, and forming method of the electrode film 90 are the same as those of the electrode film 84. Next, a conductive layer (not shown) made of Cu, for example, is formed on the electrode film 90 to a thickness of, for example, 3 to 4 $\mu$m by plating. The conductive layer is polished by, for example, CMP so that the fourth layer 10d, the fifth layer 10e, and the third coil 73 are exposed. Consequently, the conductive layer remaining in the groove makes the fourth coil 74. The foregoing polishing is performed so that the third coil 73 and the fourth coil 74 have a thickness of 1.0 to 1.5 $\mu$m, for example.

As shown in FIG. 47, the fourth coil 74 is a flat conductive layer of two turns. The fourth coil 74 is wound clockwise from the outer end to the inner end, for example. The fourth coil 74 has a connecting portion 74S near its inner end, and a connecting portion 74E near its outer end. The connecting portion 74S is connected to the connecting portion 71E of the fourth coil 71. The connecting portion 74E is connected to the connecting portion 72S of the second coil 72. FIG. 47 also shows a top pole layer 97 to be formed later. FIG. 39A shows the section taken along the line 39A–39A of FIG. 47.

Next, as shown in FIGS. 40A and 40B, an insulating film 91 made of alumina, for example, is formed to cover the entire top surface of the laminate to a thickness of 0.2 $\mu$m, for example. Then, the insulating film 91 is selectively removed at portions corresponding to the regions where to dispose the sixth layer 10f and the seventh layer 10g.

Next, a magnetic layer 92 made of a magnetic material is formed to a thickness of 0.8 to 1.2 $\mu$m by sputtering so as to cover the entire top surface of the laminate. The material of the magnetic layer 92 is the same as that of the magnetic layer 19 in the first embodiment.

Next, etching masks 93a and 93b having a thickness of 1 to 2 $\mu$m are formed on the magnetic layer 92 at portions corresponding to the fourth layer 10d and the fifth layer 10e, respectively. The material and forming method of the etching masks 93a and 93b are the same as those of the etching masks 23a and 23b in the first embodiment.

Next, as shown in FIGS. 41A and 41B, the magnetic layer 92 is etched by RIE using the above-mentioned etching masks 93a and 93b. The unetched portions of the magnetic layer 92 under the etching masks 93a and 93b make the sixth layer 10f and the seventh layer 10g. The sixth layer 10f lies on the fourth layer 10d, and the seventh layer 10g lies on the fifth layer 10e. The etching of the magnetic layer 92 may be effected by ion beam etching instead of RIE.

In the present embodiment, as in the first embodiment, after the etching of the magnetic layer 92 by RIE, at least part of the region, or the whole region for example, which has undergone the RIE, may be slightly etched by different dry etching, such as ion beam etching.

The end of the sixth layer 10f located farther from the air bearing surface defines the throat height of the recording head. The third layer 10c, the fifth layer 10e, and the seventh layer 10g constitute a coupling portion 31 for establishing magnetic coupling between the bottom pole layer 10 and the top pole layer.

Next, as shown in FIGS. 42A and 42B, an insulating layer 94 made of alumina, for example, is formed to a thickness of 1.5 to 2.0 $\mu$m so as to cover the entire top surface of the laminate. The insulating layer 94 is then polished by CMP, for example. This polishing is performed so as to remove the etching masks and to flatten the top surfaces of the sixth layer 10f, the seventh layer 10g, and the insulating layer 94.

Next, a recording gap layer 95 is formed to a thickness of 0.06 to 0.08 $\mu$m so as to cover the entire top surface of the laminate. The material of the recording gap layer 95 is the same as that of the recording gap layer 25 in the first embodiment. Then, a portion of the recording gap layer 95 corresponding to the seventh layer 10g is selectively etched.

Next, as shown in FIGS. 43A and 43B, a magnetic layer 96 made of a magnetic material is formed to a thickness of 0.5 to 1.2 $\mu$m by, e.g., sputtering so as to cover the entire top surface of the laminate. The material of the magnetic layer 96 is the same as that of the magnetic layer 26 in the first embodiment.

Next, a second layer 97b of the top pole layer 97 to be described later is formed to a thickness of 1 to 2 $\mu$m on the magnetic layer 96 by frame plating, for example. The material and shape of the second layer 97b are the same as those of the second layer 27b in the first embodiment.

Next, as shown in FIGS. 44A and 44B, the magnetic layer 96 is selectively etched by RIE using the second layer 97b as an etching mask. Consequently, the portion of the magnetic layer 96 left unetched makes a first layer 97a of the top pole layer 97. The first layer 97a lies under the second layer 97b.

In the present embodiment, as in the first embodiment, after the etching of the magnetic layer 96 by RIE, at least part of the region, or the whole region for example, which has undergone the RIE, may be slightly etched by different dry etching, such as ion beam etching.

The top pole layer 97 has the first layer 97a that touches the recording gap layer 95, and the second layer 97b that lies on the first layer 97a. The top pole layer 97 also includes: a track width defining portion 97A having an end located at the air bearing surface and the other end located away from the air bearing surface; and a yoke portion 97B (see FIG. 47) connected to the other end of the track width defining portion 97A. The yoke portion 97B has a width which is equal to that of the track width defining portion 97A at the interface with the track width defining portion 97A. The width of the yoke portion 97B gradually increases from this interface with an increase in distance from the track width defining portion 97A, and finally becomes constant. The track width defining portion 97A is the magnetic pole portion of the top pole layer 97, and defines the recording track width. When forming the first layer 97a by RIE, the track width defining portion 97A is given an initial width of the order of 0.1 to 0.2 $\mu$m. Here, by way of example, the track width defining portion 97A initially has a width of 0.15 $\mu$m.

Next, the sidewalls of the track width defining portion 97A of the top pole layer 97 are etched by, for example, ion beam etching, so that the width of the track width defining portion 97A is reduced to 0.1 $\mu$m, for example. For example, this etching is performed so that ion beams travel at an angle of 40 to 50° with respect to a direction perpendicular to the top surface of the second layer 97b.

Next, although not shown, a photoresist mask having an opening around the track width defining portion 97A is formed. Then, the recording gap layer 95 around the track width defining portion 97A is etched by, for example, RIE with a mixed gas of $Cl_2$ and $BCl_3$ as the etching gas, or ion beam etching, using the above-mentioned photoresist mask and the top pole layer 97 as masks.

Then, the top pole layer 97, the recording gap layer 95 lying below the same, and the above-mentioned photoresist mask are used as masks to etch part of the sixth layer 10f of the bottom pole layer 10 at around the track width defining portion 97A. The method for etching the sixth layer 10f is the same as in the first embodiment. A trim structure as shown in FIG. 44B is thereby formed. A portion of the sixth layer 10f, the portion being opposed to the track width defining portion 97A of the top pole layer 97 with the recording gap layer 95 in between, is the magnetic pole portion of the bottom pole layer 10.

Next, as shown in FIGS. 45A and 45B, an overcoat layer 99 made of alumina, for example, is formed to a thickness of 20 to 30 µm so as to cover the entire top surface of the laminate. Its surface is flattened, and not-shown four electrode pads are formed thereon. One of the four electrode pads is connected to the outer end of the first coil 71, another one is connected to the outer end of the third coil 73, and the other two are connected to the pair of electrode layers that are connected to the MR element 5. Finally, a slider including the foregoing layers is lapped to form the air bearing surface 30. This completes the thin-film magnetic head including the recording head and the reproducing head.

In the thin-film magnetic head according to the present embodiment, the recording head comprises: the bottom pole layer 10 and the top pole layer 97 that are magnetically coupled to each other and that include the magnetic pole portions opposed to each other and located in regions of the pole layers on the side of the air bearing surface 30; the recording gap layer 95 interposed between the magnetic pole portion of the bottom pole layer 10 and the magnetic pole portion of the top pole layer 97; and a thin-film coil, at least part of which is disposed between the bottom and top pole layers 10 and 97 and insulated from the bottom and top pole layers 10 and 97. The bottom pole layer 10 and the top pole layer 97 of the present embodiment correspond to the first pole layer and the second pole layer of the invention, respectively. The characteristics of the bottom pole layer 10 and the top pole layer 97 of present the embodiment are the same as those of the bottom pole layer 10 and the top pole layer 27 of the first embodiment.

The thin-film coil of the present embodiment is made up of the first to fourth coils 71–74. The following describes how the coils 71–74 are connected. The first coil 71 and the fourth coil 74 are connected in series via the connecting portion 71E and the connecting portion 74S. The first coil 71 and the fourth coil 74 constitute a first three-turn coil. The second coil 72 and the third coil 73 are connected in series via the connecting portion 72E and the connecting portion 73S. The second coil 72 and the third coil 73 constitute a second three-turn coil. The second coil 72 and the fourth coil 74 are connected in series via the connecting portion 72S and the connecting portion 74E. The first three-turn coil and the second three-turn coil are thus connected in series. Consequently, the coils 71 to 74 constitute a thin-film coil of six turns.

Here, the point where the connecting portion 71E of the first coil 71 and the connecting portion 74S of the fourth coil 74 are connected shall be referred to as a first connecting point. The point where the connecting portion 72E of the second coil 72 and the connecting portion 73S of the third coil 73 are connected shall be referred to as a second connecting point. The first connecting point and the second connecting point are located at two respective positions farther from the air bearing surface 30 than the coupling portion 31 is, the positions being adjacent to the coupling portion 31 and of the same distance from the air bearing surface 30.

In the examples shown in FIG. 46 and FIG. 47, the thin-film coil is wound counterclockwise from the end of the first coil 71 on the electrode-pad side to the end of the third coil 73 on the electrode-pad side.

Figure 48:
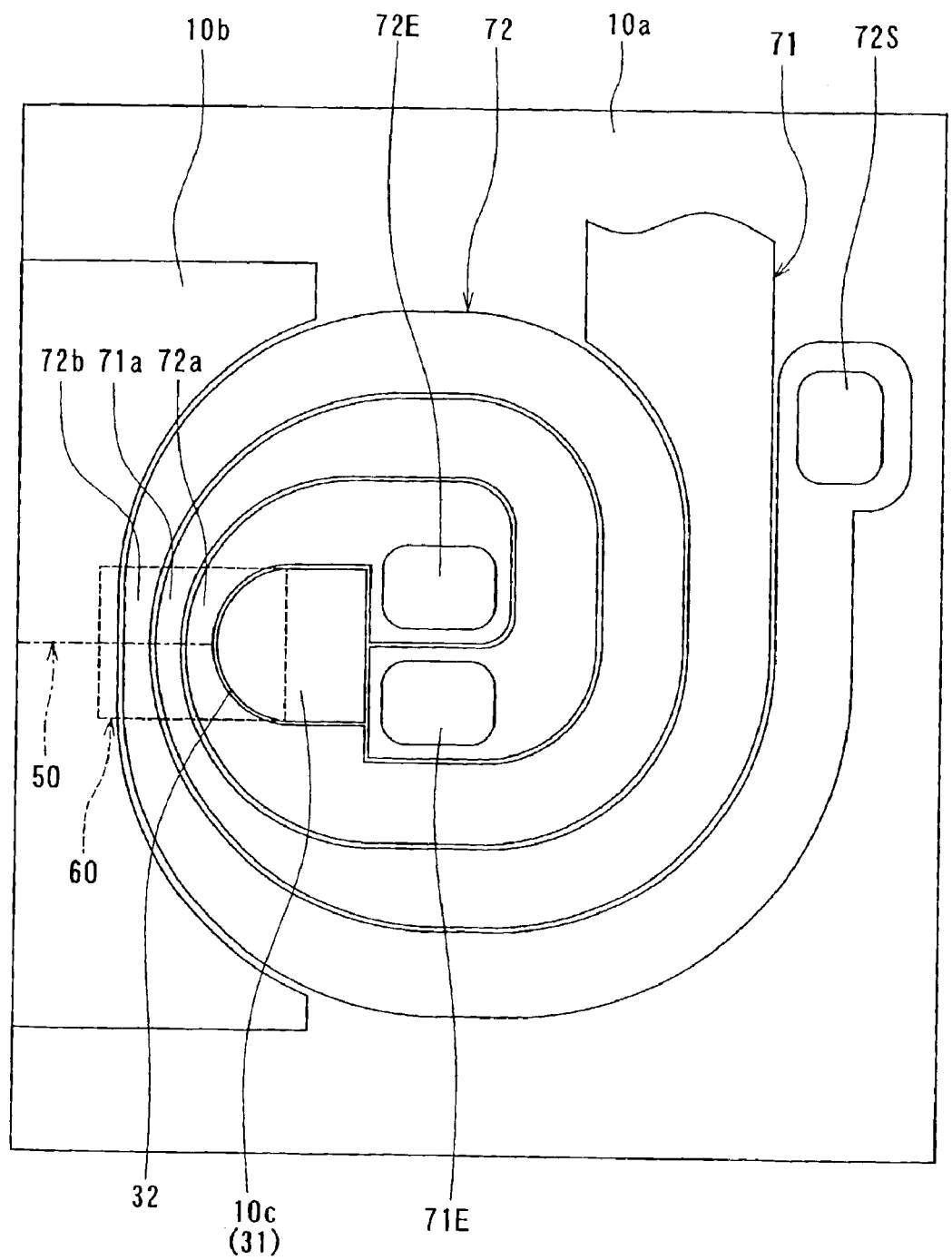
FIG. 48 is a plan view for illustrating a method of forming a thin-film coil of a modified example of the second embodiment of the invention.
Figure 49:
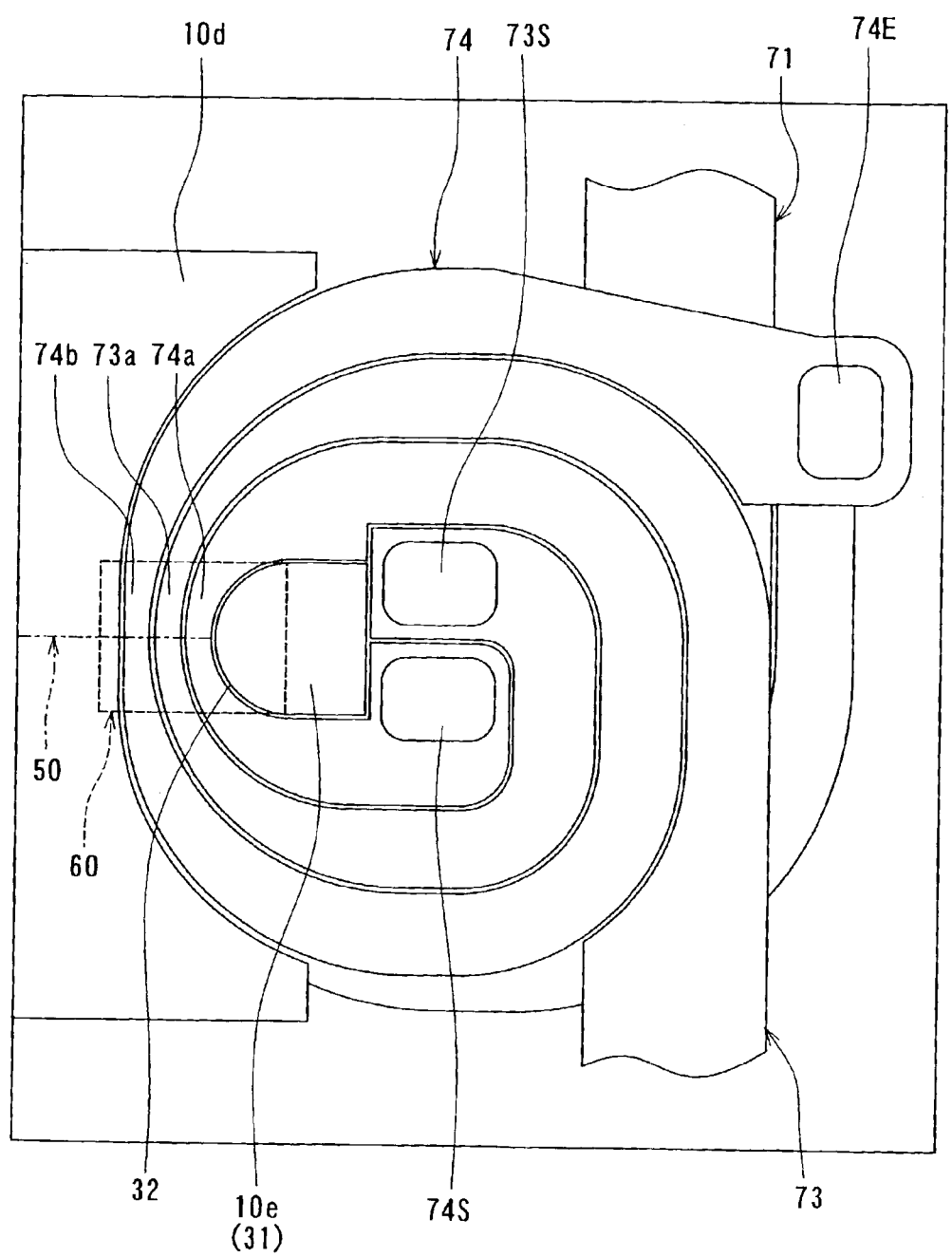
FIG. 49 is a plan view for illustrating the method of forming the thin-film coil of the modified example of the second embodiment of the invention.

FIG. 48 and FIG. 49 show an example of the thin-film coil which is wound clockwise from the end of the first coil 71 on the electrode-pad side to the end of the third coil 73 on the electrode-pad side. Like FIG. 46, FIG. 48 shows the first coil 71 and the second coil 72. Like FIG. 47, FIG. 49 shows the third coil 73 and the fourth coil 74.

The coupling portion 31 of the present embodiment has the same shape as in the first embodiment. That is, as shown in FIG. 46 to FIG. 49, the coupling portion 31 has an end face 32 that faces toward the air bearing surface 30 (not shown). This end face 32 includes a curved surface convex toward the air bearing surface 30. For example, this end face 32 has the shape of a part of a cylindrical surface. FIG. 46 to FIG. 49 show the cases where the top surface of the coupling portion 31 is given the shape shown in FIG. 26. Nevertheless, the shape of the top surface of the coupling portion 31 is not limited thereto. For example, the top surface of the coupling portion 31 may have any of the shapes shown in FIG. 20 to FIG. 25 and FIG. 27.

Figure 50:
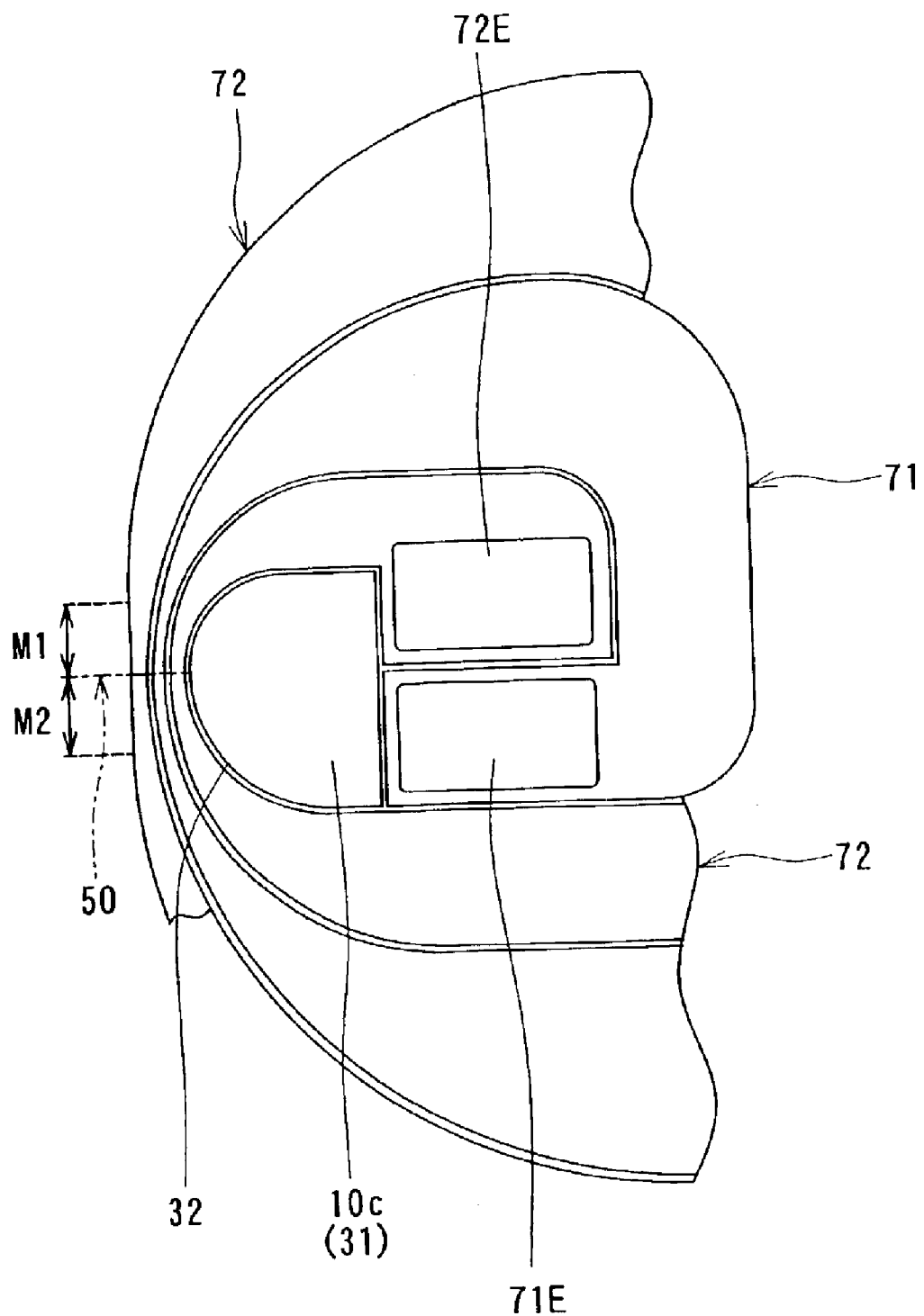
FIG. 50 is a plan view showing the shape of a coupling portion and a thin-film coil of another modified example of the second embodiment of the invention.

FIG. 50 shows the case where the top surface of the coupling portion 31 has the shape shown in FIG. 27. FIG. 50 is a plan view showing the third layer 10c (coupling portion 31) and the first and second coils 71 and 72 lying nearby. In the example shown in FIG. 50, the end face 32 of the coupling portion 31 is shaped as if portions of two cylindrical surfaces having different radii of curvature are connected to each other at a position on the virtual line 50 which connects the end face 32 and the air bearing surface 30 in the shortest distance. In this example, the connecting portion 72E of the second coil 72 is located above the virtual line 50 in FIG. 50. The inner turn of the second coil 72 is preferably shaped such that the inner periphery thereof decreases in the radius of curvature with decreasing distance from the connecting portion 72E. In the example shown in FIG. 50, out of the two cylindrical surfaces of the end face 32, the one lying above the virtual line 50 in FIG. 50 has a radius of curvature smaller than that of the other, which lies below the virtual line 50 in FIG. 50. Consequently, the inner periphery of the inner turn of the second coil 72 Is given the preferable shape mentioned above.

Moreover, in the example shown in FIG. 50, the outer periphery of the outer turn of the second coil 72 has a liner portion which is located in a predetermined region covering the position on the virtual line 50. A part of this linear portion that lies above the virtual line 50 in FIG. 50 shall have a length M1. The other part of the linear portion that lies below the virtual line 50 in FIG. 50 shall have a length M2. In the example shown in FIG. 50, M2 is greater than M1. However, M2 may be equal to M1. The outer periphery of the outer turn of the second coil 72 need not necessarily have a linear portion.

As shown in FIG. 46 and FIG. 48, the first and second turns from the inner side of the second coil 72 include first and second portions 72a and 72b, respectively, which lie between the end face 32 of the coupling portion 31 and the air bearing surface 30. The first coil 71 includes a portion 71a that lies between the end face 32 of the coupling portion 31 and the air bearing surface 30. In FIG. 46 and FIG. 48, the region designated by the reference numeral 60 is a region where the portions 71a, 72a, and 72b are located.

Of the first and second portions 72a and 72b, at least the first portion 72a has a minimum width of the second coil 72 at a position on the virtual line 50 (not shown in FIG. 46) that connects the end face 32 of the coupling portion 31 and the air bearing surface 30 in the shortest distance, and increases in width with distance from the virtual line 50. On the other hand, the portion 71a has a minimum width of the first coil 71 at the position on the virtual line 50 that connects the end face 32 of the coupling portion 31 and the air bearing surface 30 in the shortest distance, and increases in width with distance from the virtual line 50. The respective shapes of the portions 72a, 71a, and 72b may be the same as those of the first to third portions 41a–43a shown in FIG. 16 to FIG. 19.

As shown in FIG. 47 and FIG. 49, the first and second turns of the fourth coil 74 from the inner side include first and second portions 74a and 74b, respectively, which lie between the end face 32 of the coupling portion 31 and the air bearing surface 30. The third coil 73 includes a portion 73a lying between the end face 32 of the coupling portion 31 and the air bearing surface 30. In FIG. 47 and FIG. 49, the region designated by the reference numeral 60 is a region where the portions 73a, 74a, and 74b are located.

Of the first and second portions 74a and 74b, at least the first portion 74a has a minimum width of the fourth coil 74 at a position on the virtual line 50 (not shown in FIG. 47) that connects the end face 32 of the coupling portion 31 and the air bearing surface 30 in the shortest distance, and increases in width with distance from the virtual line 50. On the other hand, the portion 73a has a minimum width of the third coil 73 at the position on the virtual line 50 that connects the end face 32 of the coupling portion 31 and the air bearing surface 30 in the shortest distance, and increases in width with distance from the virtual line 50. The respective shapes of the portions 74a, 73a, and 74b may be the same as those of the first to third portions 41a–43a shown in FIG. 16 to FIG. 19.

The thin-film coil of the present embodiment has the flat first coil 71 of a single turn, the flat second coil 72 of two turns, the flat third coil 73 of a single turn, and the flat fourth coil 74 of two turns. The second coil 72 is arranged to sandwich the first coil 71 from the inner and outer sides. The third coil 73 is located above the first coil 71 and the second coil 72. The fourth coil 74 is arranged to sandwich the third coil 73 from the inner and outer sides. The first coil 71 and the fourth coil 74 are connected in series to constitute the first three-turn coil. The second coil 72 and the third coil 73 are connected in series to constitute the second three-turn coil. The first three-turn coil and the second three-turn coil are connected in series to constitute a thin-film coil of six turns. Part of the first coil 71 and part of the second coil 72 are located between the second layer 10b and the third layer 10c. Part of the third coil 73 and part of the fourth coil 74 are located between the fourth layer 10d and the fifth layer 10e.

In the present embodiment, conductive layers of three turns are arranged around the coupling portion 31 as in the first embodiment. According to the present embodiment, it is therefore possible to achieve a thin-film magnetic head which is small in magnetic path length and thus is excellent in recording characteristics at high frequency bands, and has the thin-film coil of small resistance, as with the first embodiment.

In the present embodiment, the first coil 71 and the second coil 72 are separated from each other by the thin intercoil insulating film 83. Likewise, the third coil 73 and the fourth coil 74 are separated from each other by the thin intercoil insulating film 89. This allows an extremely small spacing between the first coil 71 and the second coil 72, and between the third coil 73 and the fourth coil 74. Consequently, according to the present embodiment, it is possible to reduce the winding pitches of the coils 71–74 significantly while making the coils 71–74 thick. According to the present embodiment, it is therefore possible to shorten the magnetic path length and reduce the resistance of the thin-film coil as compared with the first embodiment.

According to the present embodiment, the first to fourth coils 71–74 can be connected directly without using any special layers for interconnecting these coils.

The remainder of the configuration, functions and effects of the present embodiment are the same as those of the first embodiment.

[Third Embodiment]

Now, a thin-film magnetic head and a method of manufacturing the same according to a third embodiment of the invention will be described with reference to FIGS. 51A to 62A and FIGS. 51B to 62B. FIGS. 51A to 62A are cross sections each orthogonal to the air bearing surface and the top surface of the substrate. FIGS. 51B to 62B are cross sections of the magnetic pole portion each parallel to the air bearing surface.

The manufacturing method of the present embodiment is the same as that of the second embodiment up to the step of patterning the first layer 10a by selectively etching the first layer 10a using the photoresist layer 12 as a mask, as shown in FIGS. 31A and 31B.

Figure 51A:
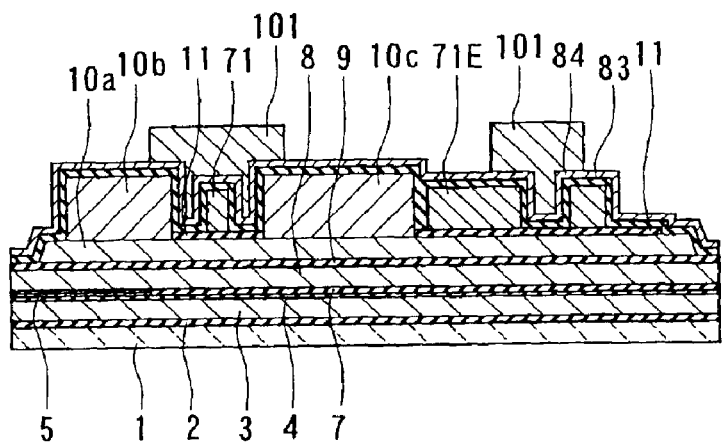
FIGS. 51A and 51B are cross sections for illustrating a step in a method of manufacturing a thin-film magnetic head according to a third embodiment of the invention.
Figure 51B:
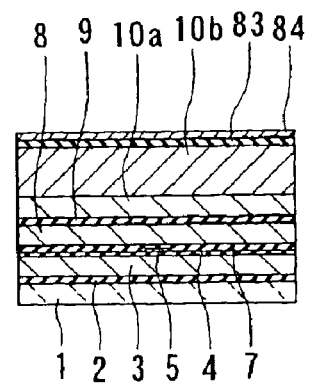

Then, in the present embodiment, as shown in FIGS. 51A and 51B, after removing the photoresist layer 12, an intercoil insulating film 83 is formed to cover the entire top surface of the laminate. The material, thickness and forming method of the intercoil insulating film 83 of this embodiment are the same as those of the intercoil insulating film 83 of the second embodiment.

Next, an electrode film 84 is formed to cover the entire top surface of the laminate. The material, thickness and forming method of the electrode film 84 of this embodiment are the same as those of the electrode film 84 of the second embodiment.

On the electrode film 84, a conductive layer 101 made of Cu, for example, is formed to a thickness of, for example, 3 to 4 $\mu$m by frame plating in a region where to form the second coil 72.

Figure 52A:
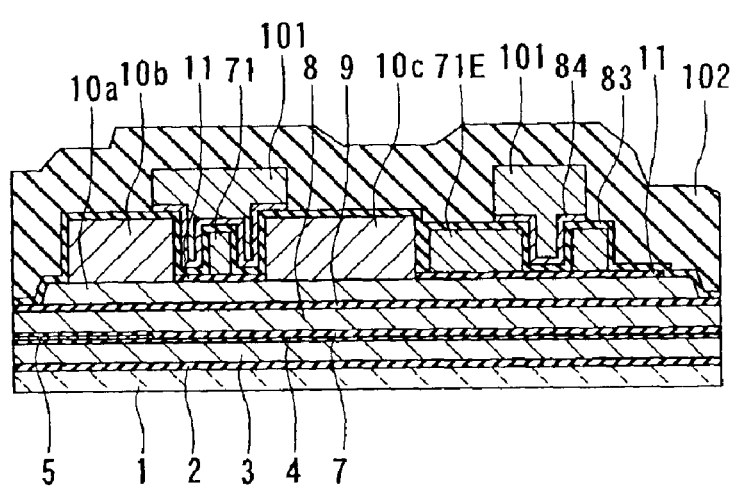
FIGS. 52A and 52B are cross sections for illustrating a step that follows FIGS. 51A and 51B.
Figure 52B:
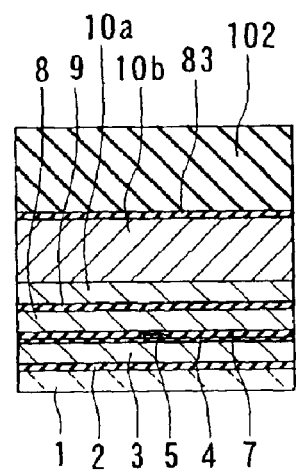

Next, as shown in FIGS. 52A and 52B, an insulating layer 102 made of alumina, for example, is formed to a thickness of 3 to 4 $\mu$m so as to cover the entire top surface of the laminate.

Figure 53A:
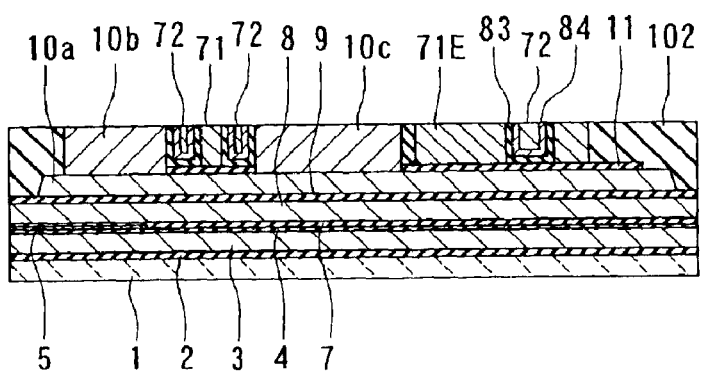
FIGS. 53A and 53B are cross sections for illustrating a step that follows FIGS. 52A and 52B.
Figure 53B:
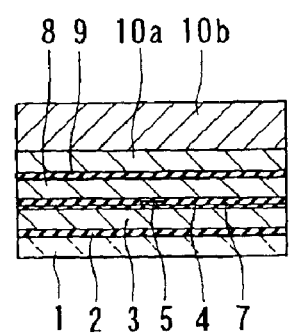

Next, as shown in FIGS. 53A and 53B, the insulating layer 102 is polished by, for example, CMP, so that the second layer 10b and the third layer 10c are exposed and the top surfaces of the second layer 10b, the third layer 10c, and the insulating layer 102 are flattened. Consequently, the conductive layer 101 remaining in the groove makes the second coil 72.

Figure 54A:
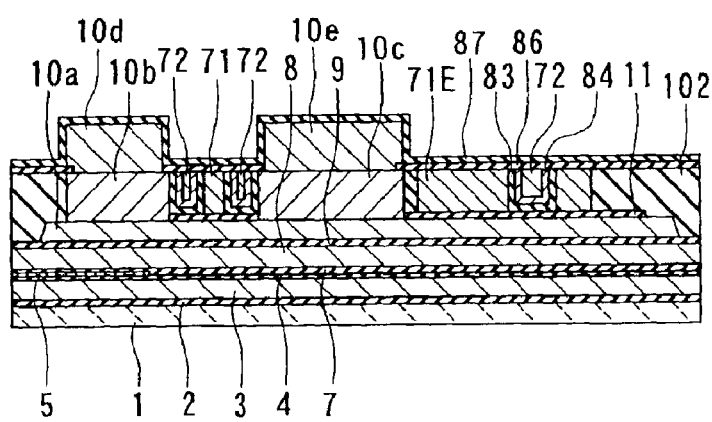
FIGS. 54A and 54B are cross sections for illustrating a step that follows FIGS. 53A and 53B.
Figure 54B:
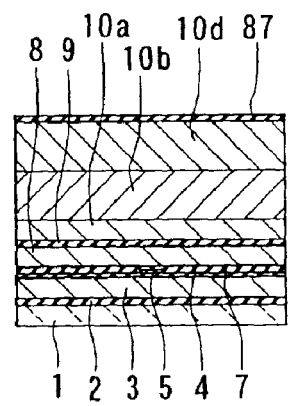

Next, as shown in FIGS. 54A and 54B, an insulating film 86 made of alumina, for example, is formed to cover the entire top surface of the laminate to a thickness of 0.2 $\mu$m, for example. The subsequent steps are the same as in the second embodiment. That is, the insulating film 86 is selectively removed at portions corresponding to the regions where to dispose the fourth layer 10d and the fifth layer 10e. Then, the fourth layer 10d is formed on the second layer 10b, and the fifth layer 10e on the third layer 10c. Next, the insulating film 87 made of alumina, for example, is formed to cover the entire top surface of the laminate.

Figure 55A:
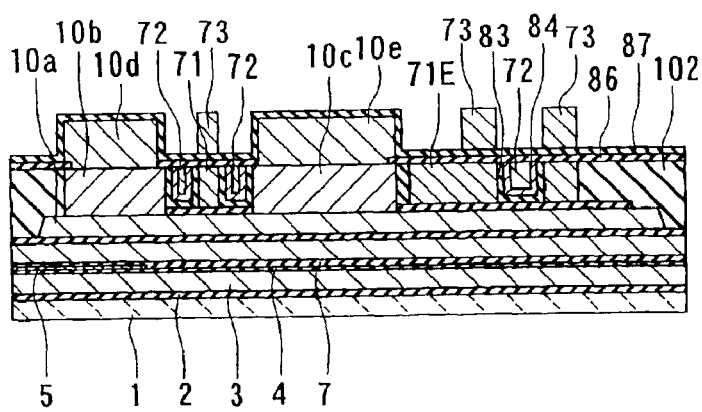
FIGS. 55A and 55B are cross sections for illustrating a step that follows FIGS. 54A and 54B.
Figure 55B:
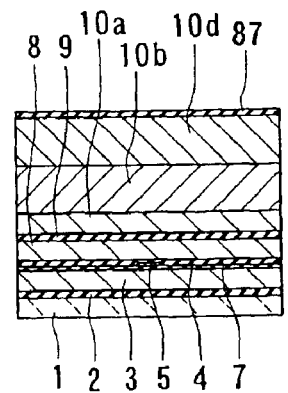
Figure 56A:
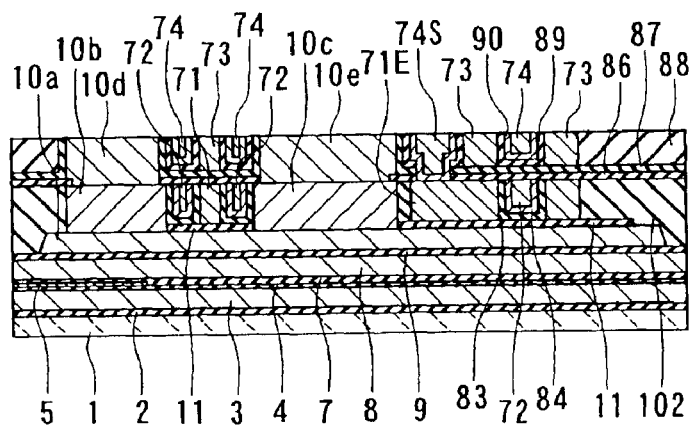
FIGS. 56A and 56B are cross sections for illustrating a step that follows FIGS. 55A and 55B.
Figure 56B:
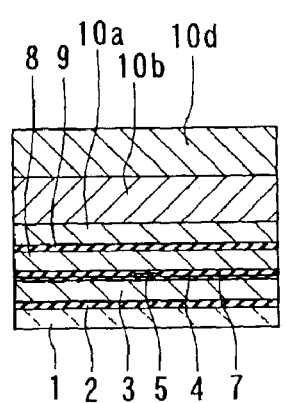

Next, as shown in FIGS. 55A and 55B, the third coil 73 is formed on the insulating film 87. Then, as shown in FIGS. 56A and 56B, the fourth coil 74 is formed in the same manner as in the second embodiment.

Figure 57A:
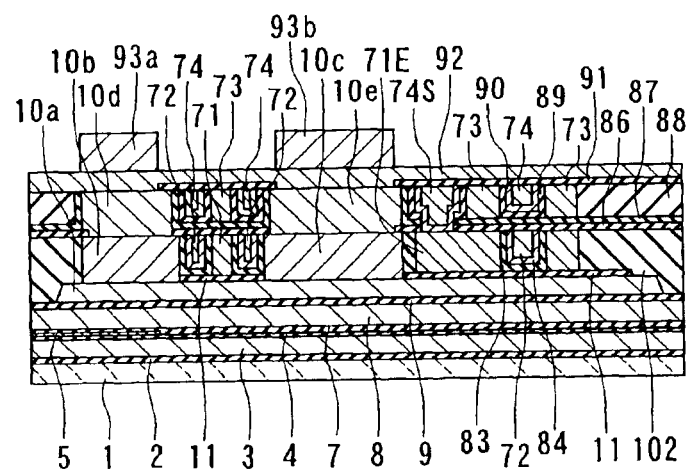
FIGS. 57A and 57B are cross sections for illustrating a step that follows FIGS. 56A and 56B.
Figure 57B:
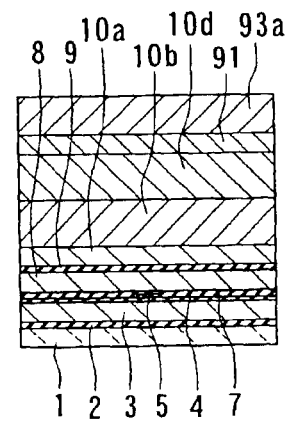

Next, as shown in FIGS. 57A and 57B, an insulating film 91 made of alumina, for example, is formed to cover the entire top surface of the laminate. The insulating film 91 is selectively removed at portions corresponding to the regions where to dispose the sixth layer 10f and the seventh layer 10g. Next, a magnetic layer 92 is formed so as to cover the entire top surface of the laminate. Next, etching masks 93a and 93b are formed on the magnetic layer 92 at portions corresponding to the fourth layer 10d and the fifth layer 10e, respectively.

Figure 58A:
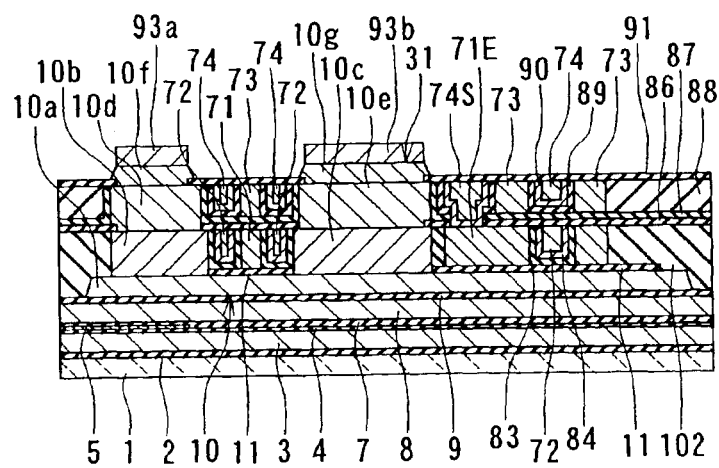
FIGS. 58A and 58B are cross sections for illustrating a step that follows FIGS. 57A and 57B.
Figure 58B:
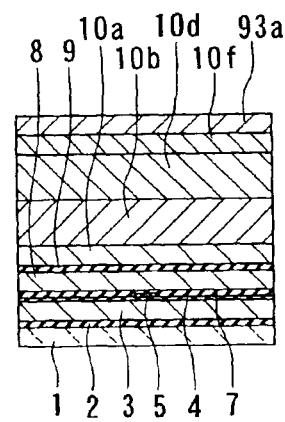

Next, as shown in FIGS. 58A and 58B, the magnetic layer 92 is etched by RIE using the above-mentioned etching masks 93a and 93b. The unetched portions of the magnetic layer 92 under the etching masks 93a and 93b make the sixth layer 10f and the seventh layer 10g. The end of the sixth layer 10f located farther from the air bearing surface defines the throat height of the recording head. The third layer 10c, the fifth layer 10e, and the seventh layer 10g constitute the coupling portion 31 for establishing magnetic coupling between the bottom pole layer 10 and the top pole layer.

Next, as shown in FIGS. 59A and 59B, an insulating layer 94 is formed so as to cover the entire top surface of the laminate. The insulating layer 94 is then polished by CMP, for example. This polishing is performed so as to remove the etching masks and to flatten the top surfaces of the sixth layer 10f, the seventh layer 10g, and the insulating layer 94. Next, a recording gap layer 95 is formed so as to cover the entire top surface of the laminate. Then, a portion of the recording gap layer 95 corresponding to the seventh layer 10g is selectively etched.

Next, as shown in FIGS. 60A and 60B, a magnetic layer 96 is formed so as to cover the entire top surface of the laminate. Then, a second layer 97b of the top pole layer 97 is formed on the magnetic layer 96.

Figure 61A:
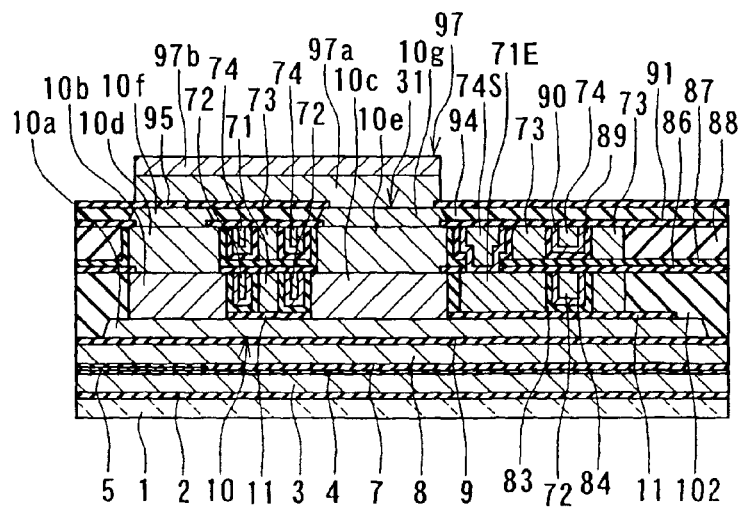
FIGS. 61A and 61B are cross sections for illustrating a step that follows FIGS. 60A and 60B.
Figure 61B:
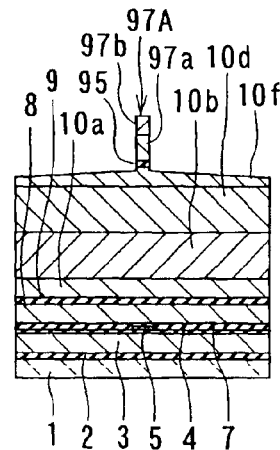

Next, as shown in FIGS. 61A and 61B, the magnetic layer 96 is selectively etched by using the second layer 97b as an etching mask. Consequently, the portion of the magnetic layer 96 left unetched makes a first layer 97a of the top pole layer 97.

Next, the sidewalls of the track width defining portion 97A of the top pole layer 97 are etched by, for example, ion beam etching, so that the width of the track width defining portion 97A is reduced to 0.1μm, for example.

Next, although not shown, a photoresist mask having an opening around the track width defining portion 97A is formed. Then, the recording gap layer 95 around the track width defining portion 97A is etched by using the above-mentioned photoresist mask and the top pole layer 97 as masks.

Then, the top pole layer 97, the recording gap layer 95 lying below the same, and the above-mentioned photoresist mask are used as masks to etch part of the sixth layer 10f of the bottom pole layer 10 at around the track width defining portion 97A.

Figure 62A:
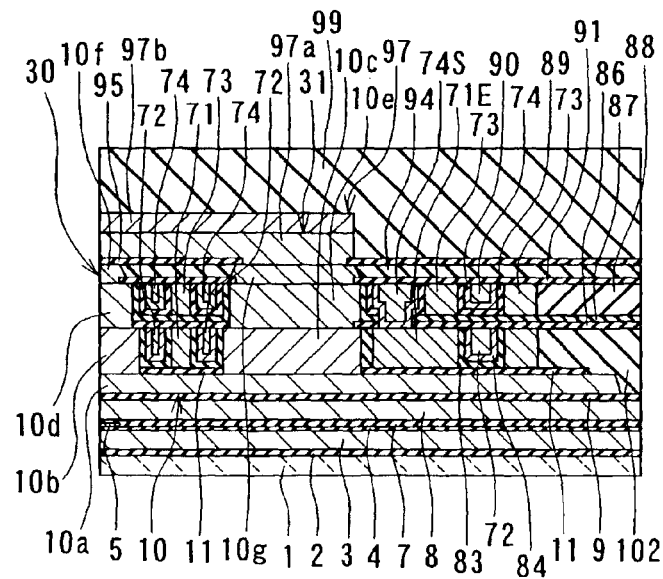
FIGS. 62A and 62B are cross sections for illustrating a step that follows FIGS. 61A and 61B.
Figure 62B:
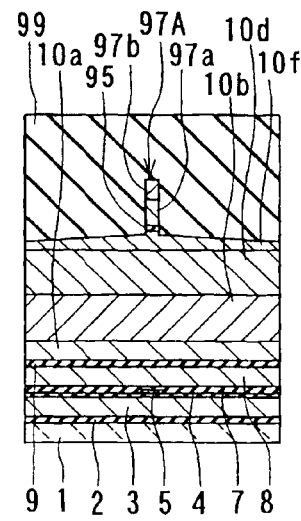

Next, as shown in FIGS. 62A and 62B, an overcoat layer 99 is formed so as to cover the entire top surface of the laminate. Its surface is flattened, and not-shown four electrode pads are formed thereon. Finally, a slider including the foregoing layers is lapped to form the air bearing surface 30. This completes the thin-film magnetic head including the recording head and the reproducing head.

The remainder of the configuration, functions and effects of the present embodiment are the same as those of the second embodiment.

The present invention is not limited to the foregoing embodiments but may be practiced in still other ways. For example, the invention is also applicable to a thin-film magnetic head dedicated to recording that has an induction-type electromagnetic transducer only, or a thin-film magnetic head that performs recording and reproducing operations with an induction-type electromagnetic transducer.

As has been described, in the first thin-film magnetic head or the method of manufacturing the same of the invention, the coupling portion for establishing magnetic coupling between the first pole layer and the second pole layer has an end face facing toward the medium facing surface. The end face includes a curved surface convex toward the medium facing surface. The thin-film coil has a flat conductive layer of three turns. The first turn, the second turn, and the third turn of the conductive layer from the inner side include a first portion, a second portion, and a third portion, respectively. Those portions lie between the end face of the coupling portion and the medium facing surface. Of the first, second and third portions, at least the first portion has a minimum width of the conductive layer at a position on a virtual line connecting the end face of the coupling portion and the medium facing surface in the shortest distance, and increases in width with distance from the virtual line. Consequently, according to the invention it is possible to reduce the resistance of the thin-film coil while reducing the magnetic path length of the thin-film magnetic head. The invention thus makes it possible to achieve a thin-film magnetic head which is small in magnetic path length and thus is excellent in recording characteristics at high frequency bands, and has a thin-film coil of small resistance.

In the second thin-film magnetic head or the method of manufacturing the same of the invention, the thin-film coil has: a flat first coil of a single turn; a flat second coil of two turns arranged to sandwich the first coil from inner and outer sides thereof; a flat third coil of a single turn located above the first coil and the second coil; and a flat fourth coil of two turns arranged to sandwich the third coil from inner and outer sides thereof. The first coil and the fourth coil are connected in series to constitute a first three-turn coil, while the second coil and the third coil are connected in series to constitute a second three-turn coil. The first three-turn coil and the second three-turn coil are connected in series. Consequently, according to the invention it is possible to reduce the resistance of the thin-film coil while reducing the magnetic path length of the thin-film magnetic head. The invention thus makes it possible to achieve a thin-film magnetic head which is small in magnetic path length and thus is excellent in recording characteristics at high frequency bands, and has a thin-film coil of small resistance.

In the second thin-film magnetic head or the method of manufacturing the same of the invention, the coupling portion for establishing magnetic coupling between the first pole layer and the second pole layer may have an end face facing toward the medium facing surface, and this end face may include a curved surface convex toward the medium facing surface. From these respects, too, the invention makes it possible to reduce the resistance of the thin-film coil while reducing the magnetic path length of the thin-film magnetic head.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces toward a recording medium;
   first and second pole layers that include magnetic pole portions opposed to each other and located in regions of the pole layers on a side of the medium facing surface;
   a coupling portion for establishing magnetic coupling between the first pole layer and the second pole layer, the coupling portion being located away from the medium facing surface and including at least either one of a part of the first pole layer and a part of the second pole layer;

a gap layer interposed between the magnetic pole portion of the first pole layer and the magnetic pole portion of the second pole layer; and a thin-film coil disposed around the coupling portion, at least part of the thin-film coil being interposed between the first and second pole layers and insulated from the first and second pole layers, wherein:

the coupling portion has an end face facing toward the medium facing surface, the end face including a curved surface convex toward the medium facing surface;

the thin-film coil has a flat conductive layer of three turns;

the first turn, the second turn, and the third turn of the conductive layer from an inner side thereof include a first portion, a second portion, and a third portion, respectively, the first to third portions lying between the end face of the coupling portion and the medium facing surface; and of the first, second and third portions, at least the first portion has a minimum width of the conductive layer at a position on a virtual line connecting the end face of the coupling portion and the medium facing surface in the shortest distance, and increases in width with distance from the virtual line.

2. A thin-film magnetic head according to claim 1, wherein the end face of the coupling portion has a shape of a part of a cylindrical surface.

3. A thin-film magnetic head according to claim 1, wherein:

an inner periphery of the first portion has a shape of an arc having a first radius of curvature;

an outer periphery of the first portion has a shape of an arc having a second radius of curvature greater than the first radius of curvature;

an inner periphery of the second portion has a shape of an arc having a third radius of curvature greater than the second radius of curvature;

an outer periphery of the second portion has a shape of an arc having a fourth radius of curvature greater than the third radius of curvature;

an inner periphery of the third portion has a shape of an arc having a fifth radius of curvature greater than the fourth radius of curvature; and an outer periphery of the third portion has a shape of an arc having a sixth radius of curvature greater than the fifth radius of curvature.

4. A thin-film magnetic head according to claim 1, wherein:

an inner periphery of the first portion has a shape of an arc having a first radius of curvature;

an outer periphery of the first portion has a shape of an arc having a second radius of curvature greater than the first radius of curvature;

an inner periphery of the second portion has a shape of an arc having a third radius of curvature greater than the second radius of curvature;

an outer periphery of the second portion has a shape of an arc having a fourth radius of curvature greater than the third radius of curvature;

an inner periphery of part of the third turn including the third portion has a shape of an arc having a fifth radius of curvature greater than the fourth radius of curvature; and an outer periphery of the part of the third turn includes a linear portion and two arc portions connected to respective ends of the linear portion, the linear portion being located in a predetermined region covering the position on the virtual line, the two arc portions having a sixth radius of curvature greater than the fifth radius of curvature.

5. A thin-film magnetic head according to claim 1, wherein:

an inner periphery of the first portion has a shape of an arc having a first radius of curvature;

an outer periphery of the first portion has a shape of an arc having a second radius of curvature greater than the first radius of curvature;

an inner periphery of the second portion has a shape of an arc having a third radius of curvature greater than the second radius of curvature;

an outer periphery of the second portion includes a first linear portion and two arc portions connected to respective ends of the first linear portion, the first linear portion being located in a predetermined region covering the position on the virtual line, the two arc portions having a fourth radius of curvature greater than the third radius of curvature;

an inner periphery of part of the third turn including the third portion includes a second linear portion and two arc portions connected to respective ends of the second linear portion, the second linear portion being located in a predetermined region covering the position on the virtual line, the two arc portions having a fifth radius of curvature greater than the fourth radius of curvature;

an outer periphery of the part of the third turn includes a third linear portion and two arc portions connected to respective ends of the third linear portion, the third linear portion being located in a predetermined region covering the position on the virtual line, the two arc portions having a sixth radius of curvature greater than the fifth radius of curvature; and the second linear portion has a length greater than or equal to that of the first linear portion, and the third linear portion is longer than the second linear portion.

6. A thin-film magnetic head according to claim 1, wherein:

an inner periphery of the first portion has a shape of an arc having a first radius of curvature;

an outer periphery of the first portion includes a first linear portion and two arc portions connected to respective ends of the first linear portion, the first linear portion being located in a predetermined region covering the position on the virtual line, the two arc portions having a second radius of curvature greater than the first radius of curvature;

an inner periphery of the second portion includes a second linear portion and two arc portions connected to respective ends of the second linear portion, the second linear portion being located in a predetermined region covering the position on the virtual line, the two arc portions having a third radius of curvature greater than the second radius of curvature;

an outer periphery of the second portion includes a third linear portion and two arc portions connected to respective ends of the third linear portion, the third linear portion being located in a predetermined region covering the position on the virtual line, the two arc portions having a fourth radius of curvature greater than the third radius of curvature;

an inner periphery of part of the third turn including the third portion includes a fourth linear portion and two arc portions connected to respective ends of the fourth linear portion, the fourth linear portion being located in a predetermined region covering the position on the virtual line, the two arc portions having a fifth radius of curvature greater than the fourth radius of curvature;

an outer periphery of the part of the third turn includes a fifth linear portion and two arc portions connected to respective ends of the fifth linear portion, the fifth linear portion being located in a predetermined region covering the position on the virtual line, the two arc portions having a sixth radius of curvature greater than the fifth radius of curvature; and the second linear portion has a length greater than or equal to that of the first linear portion, the third linear portion is longer than the second linear portion, the fourth linear portion has a length greater than or equal to that of the third linear portion, and the fifth linear portion is longer than the fourth linear portion.

7. A thin-film magnetic head according to claim 1, wherein the thin-film coil has two conductive layers that are laminated and electrically connected to each other.

8. A thin-film magnetic head according to claim 1, wherein:

the first pole layer has a first layer opposed to the thin-film coil, a second layer connected to the first layer near the medium facing surface, and a third layer connected to the first layer, the third layer including at least part of the coupling portion; and part of the conductive layer is disposed between the second layer and the third layer.

9. A thin-film magnetic head according to claim 8, wherein the second pole layer is a flat layer.

10. A thin-film magnetic head comprising:

a medium facing surface that faces toward a recording medium;

first and second pole layers that include magnetic pole portions opposed to each other and located in regions of the pole layers on a side of the medium facing surface;

a coupling portion for establishing magnetic coupling between the first pole layer and the second pole layer, the coupling portion being located away from the medium facing surface and including at least either one of a part of the first pole layer and a part of the second pole layer, a gap layer interposed between the magnetic pole portion of the first pole layer and the magnetic pole portion of the second pole layer; and a thin-film coil disposed around the coupling portion, at least part of the thin-film coil being interposed between the first and second pole layers and insulated from the first and second pole layers, wherein:

the thin-film coil has: a flat first coil of a single turn; a flat second coil of two turns arranged to sandwich the first coil from inner and outer sides thereof; a flat third coil of a single turn located above the first coil and the second coil; and a flat fourth coil of two turns arranged to sandwich the third coil from inner and outer sides thereof;

the first coil and the fourth coil are connected in series to constitute a first three-turn coil;

the second coil and the third coil are connected in series to constitute a second three-turn coil; and the first three-turn coil and the second three-turn coil are connected in series.

11. A thin-film magnetic head according to claim 10, wherein:

the first pole layer has a first layer opposed to the thin-film coil, a second layer connected to the first layer near the medium facing surface, and a third layer connected to the first layer, the third layer including part of the coupling portion; and part of the first coil and part of the second coil are located between the second layer and the third layer.

12. A thin-film magnetic head according to claim 11, wherein:

the first pole layer further has a fourth layer connected to the second layer near the medium facing surface, and a fifth layer connected to the third layer, the fifth layer including part of the coupling portion; and part of the third coil and part of the fourth coil are located between the fourth layer and the fifth layer.

13. A thin-film magnetic head according to claim 10, wherein:

an inner end of the first coil and an inner end of the fourth coil are connected to each other at a first connecting point;

an inner end of the second coil and an inner end of the third coil are connected to each other at a second connecting point; and the first connecting point and the second connecting point are located at two respective positions farther from the medium facing surface than the coupling portion is, the positions being adjacent to the coupling portion and of the same distance from the medium facing surface.

14. A thin-film magnetic head according to claim 10, wherein the coupling portion has an end face facing toward the medium facing surface, the end face including a curved surface convex toward the medium facing surface.

15. A thin-film magnetic head according to claim 14, wherein:

the first turn and the second turn of the second coil from an inner side thereof include a first portion and a second portion, respectively, the first and second portions lying between the end face of the coupling portion and the medium facing surface; and of the first portion and the second portion, at least the first portion has a minimum width of the second coil at a position on a virtual line connecting the end face of the coupling portion and the medium facing surface in the shortest distance, and increases in width with distance from the virtual line.

16. A thin-film magnetic head according to claim 15, wherein:

the first coil includes a single portion lying between the end face of the coupling portion and the medium facing surface; and the portion has a minimum width of the first coil at the position on the virtual line connecting the end face of the coupling portion and the medium facing surface in the shortest distance, and increases in width with distance from the virtual line.

17. A thin-film magnetic head according to claim 14, wherein:

the first turn and the second turn of the fourth coil from an inner side thereof include a first portion and a second portion, respectively, the first and second portions lying between the end face of the coupling portion and the medium facing surface; and of the first portion and the second portion, at least the first portion has a minimum width of the fourth coil at a position on a virtual line connecting the end face of the coupling portion and the medium facing surface in the shortest distance, and increases in width with distance from the virtual line.

18. A thin-film magnetic head according to claim 17, wherein:

the third coil includes a single portion lying between the end face of the coupling portion and the medium facing surface; and the portion has a minimum width of the third coil at the position on the virtual line connecting the end face of the coupling portion and the medium facing surface in the shortest distance, and increases in width with distance from the virtual line.

19. A thin-film magnetic head according to claim 14, wherein the end face of the coupling portion has a shape of a part of a cylindrical surface.

20. A thin-film magnetic head according to claim 14, wherein the end face of the coupling portion is shaped as if portions of two cylindrical surfaces having different radii of curvature are connected to each other at a position on a virtual line connecting the end face coupling portion and the medium facing surface in the shortest distance.

* * * * *